(12) United States Patent
Zhong

(10) Patent No.: US 12,452,325 B1
(45) Date of Patent: Oct. 21, 2025

(54) MULTI-TERMINAL CONFERENCE SYSTEM AND CONFERENCE MULTI-TERMINAL COLLABORATION METHOD FOR MULTI-TERMINAL REMOTE CONFERENCE WITHOUT DOWNLOADING AND RUNNING DRIVER SOFTWARE AND/OR APPLICATION

(71) Applicant: Shenzhen Viewplay Co., Ltd., Shenzhen (CN)

(72) Inventor: Yi Zhong, Shenzhen (CN)

(73) Assignee: Shenzhen Viewplay Co., Ltd., Shenzhen (CN)

( * ) Notice: Subject to any disclaimer, the term of this patent is extended or adjusted under 35 U.S.C. 154(b) by 0 days.

(21) Appl. No.: 19/024,348

(22) Filed: Jan. 16, 2025

Related U.S. Application Data

(63) Continuation-in-part of application No. 18/983,251, filed on Dec. 16, 2024.

(51) Int. Cl.
  *H04L 65/403* (2022.01)
  *H04L 12/18* (2006.01)
  *H04L 65/1094* (2022.01)

(52) U.S. Cl.
  CPC ........ *H04L 65/403* (2013.01); *H04L 12/1831* (2013.01); *H04L 65/1094* (2022.05)

(58) Field of Classification Search
  None
  See application file for complete search history.

(56) References Cited

U.S. PATENT DOCUMENTS

| | | | |
|---|---|---|---|
| 11,381,411 B1* | 7/2022 | Gale | H04L 12/1831 |
| 11,817,964 B1* | 11/2023 | Ayyagari | H04L 65/80 |
| 2022/0321376 A1* | 10/2022 | Lin | H04L 65/4038 |
| 2023/0074738 A1* | 3/2023 | Zhong | H04L 12/1827 |
| 2023/0185423 A1* | 6/2023 | Wang | G06F 3/011 |
| 2023/0273720 A1* | 8/2023 | Silverstein | H04L 65/4015 715/753 |

* cited by examiner

*Primary Examiner* — Raqiul A Choudhury
(74) *Attorney, Agent, or Firm* — David & Raymond Patent Firm; Raymond Y Chan

(57) ABSTRACT

A multi-terminal conference system includes a receiving device connected with a camera and a display terminal, wherein the receiving device is configured to receive a recording content of the camera through a wireless mode so that the recording content can be used as a real-time capture image for uploading to a remote conference. The receiving device further receives a data information of the audio-visual signal corresponding to the remote conference program, decodes the data information to obtain the audio-visual signal corresponding to the data information, and transmits it to the display terminal to display the remote conference, so that the display terminal does not need to install and run any conference program and driver software while ensuring the effect and experience of the conference.

11 Claims, 35 Drawing Sheets

MULTI-TERMINAL CONFERENCE SYSTEM AND CONFERENCE MULTI-TERMINAL COLLABORATION METHOD FOR MULTI-TERMINAL REMOTE CONFERENCE WITHOUT DOWNLOADING AND RUNNING DRIVER SOFTWARE AND/OR APPLICATION

CROSS REFERENCE OF RELATED APPLICATION

This application is Continuation-In-Part application that claims the benefit of priority under 35U.S.C. § 120 to a non-provisional application, application Ser. No. 18/983,251, filed Dec. 16, 2024, which claims the benefit of priority under 35U.S.C. § 119 to a Chinese application, application No. 2024111899683, filed Aug. 28, 2024, which are incorporated herewith by references in their entireties.

BACKGROUND OF THE PRESENT INVENTION

Field of Invention

The present invention relates to the field of communication technology, and more particularly to a multi-terminal conference system and a conference multi-terminal collaboration method.

Description of Related Arts

With the development of information technology, how to more effectively transmit information between devices becomes a common concern to the public. For example, in a conference scenario, participants often need to project the display information from the personal computer to the large screen in the conference room for presentation, so the stability of information transmission between the personal computer and the large screen of the conference room is particularly important. Due to the shortcomings of traditional wired connection methods, such as difficult wiring and cluttered wiring harnesses, many participants are more inclined to use wireless connections. For example, by connecting the personal computer with the large screen in the same network, the wireless screen projection function is achieved through the network. However, due to the fact that most devices are limited by the different wireless transmission protocols, many computers fail to normally connect to the large screen. In addition, due to the limitation by the influence of network quality, many devices suffer with different degrees of delay jamming during wireless transmission, resulting in a poor experience of wireless transmission. Also, when the personal computer is directly connected to the large screen through the network, there is a risk of virus transmission. Due to the particularity of the conference scenario, for example, when entity A needs to present a program demonstration in the office of entity B, there is a risk of information leakage if it is directly connected to the entity B's Party B's large screen, wherein commercial security cannot be guaranteed.

In view of above, an information transmission system that adopts wireless transmission mode has appeared on the market, which comprises a sending terminal and a receiving terminal wirelessly connected with the sending terminal. The sending terminal utilizes USB interface to connect with the participant's computer, such that the information on the participant's computer is transmitted to the receiving terminal through wireless mode, and then the receiving terminal transmits the received information to the large screen used in the conference through the HDMI interface after processing. Accordingly, the information on the participant's computer is shared to the large screen or other large display terminal of the conference, achieving the screen projection effect. Such independent wireless connection established between the transmitter and receiver substantially avoids the impact of network quality problems and overcomes the limitation of wireless transmission protocols between devices.

However, under the development of the Internet, many offline activities have evolved into network-based online forms, such as in the conference scenario, the Internet-based video remote conference allows the participants to have the meeting or conference thousands of miles apart without gathering in a conference room, which greatly improves the timeliness and the convenience of the meeting or conference. But, in the current use scenario, the vast majority of remote meetings or conferences are combined with offline meetings or conference, such as the company conference room as an offline venue, while the remote participants who reside in the field join the meeting or conference via video conferencing, so that the information transmission system is required to also take into account remote network connectivity and information sharing. As shown in FIG. 1, the Chinese patent application, publication number CN103931175A, discloses an information transmission system for each offline participant 37, which is capable of connecting a network, comprising a first connecting unit 47 connected to a processing device 31 of the offline participant 37. The first connecting unit 47 is wirelessly connected to a second connecting unit 49 which is connected to a display node 36. The display node 36 is connected to a display screen 44, each participant 37 can put the content of the processing device 31 to the display screen 44. The display node 36 can be connected to an Internet 43 through a router 42. Cameras 39, 40, 41 and etc. can be connected to router 42 and the display node 36 through a local area network 51. It is apparent that, in addition to being connected to the Internet 43 for remote video conferencing, it is also necessary to use a corresponding remote conference program which requires the remote users to join only after opening a conference number of a remote meeting/conference room in the remote conference program and logging in the corresponding account. Therefore, according to the technical solution published in the above-mentioned patent application, it also requires the installation of the remote conference program on the display node 36. In other words, the display node 36 needs to put the content transmitted by the processing device 31 to the display screen 44. On the one hand, the conferencing program using must be connected to the remote meeting/conference room.

Generally speaking, the display terminal, such as a display screen like television, projector screen and monitor, equipped in most of the offline meeting/conference room is configured to merely display casting contents so that the processing ability and performance thereof is relatively weak, and thus the processing ability and performance of the display screen do not able to process the projection task, the remote conferencing task and the split-screen real-time display task of the display delivery interface and the remote conference interface at the same time, that results adverse influence and effect to the meeting/conference progress, including situations such as jamming, delay and the like. In addition, when the pictures and audio information of the remote conference room are transmitted to the display screen through the network, the display screen also needs to decode the corresponding information and convert them into audio-visual signals before they can be displayed. But, the general-purpose CPU equipped in the display screen has limited encoding and decoding ability, especially to the audio and video signals, and thus when the corresponding audio-visual information is decoded, the display screen would suffer a decrease in picture clarity, a decrease in sound quality, etc. as well as delaying easily, causing phenomena like jamming during the real-time dynamic projection of the remote meeting/conference, that adversely affects the performance and experience of the remote meeting/conference. At the same time, based on the consideration of information security protection and the trade secret protection, the user has to log in his or her private account on the display screen when the user is having a presentation in an unfamiliar company and required to start a remote meeting/conference. Since most private accounts still have records of previous meetings or conference and even meeting/conference recordings, logging in to their accounts in an unfamiliar environment obviously poses business security risks.

U.S. Pat. No. 10,684,972 discloses a method and system for making functional devices available to participants of meetings, as shown in FIG. 1A, wherein each user can install a software to his or her user's computer for connecting the computer to a meeting dongle D1. The large screen of the meeting host is connected to a meeting main device D2 which is connected to a conference room camera D3 for wirelessly transmitting the image of the conference room camera to the conference dongles D1. Each of the dongles D1 receives the image content of the camera and transmits to the user's computer wirely through a USB cable of the dongle D1 or wirelessly through WIFI such that the user's computer will recognize the dongle D1 connected thereto as the camera of the user's computer.

In addition, each of the user's computer is required to install a driver which emulates two wireless display ports on the user's computer. Such that, when the user opens a conference program such as ZOOM and selects the connected dongle D1 as the camera of the user's computer, ZOOM will recognize the two simulated wireless display ports by the driver and utilize the dual screen mode of ZOOM to transmit the video conference content C1 to one screen S1 and the PPT content C2 to another screen S2.

However, like the conventional remote conference that requires the host's conference machine has a built-in system, or a display device thereof with the built-in system, to connect with the camera and transmit the conference content directly on the large screen of the display device, the above conventional arrangement is inconvenient for the user. Each meeting participant is required to enter the conference/meeting account or link on the conference device such as his or her computer for every remote conference that significantly increases the risk of leakage of the user's account or privacy. Also, it is very inconvenient for the meeting participants to share their content from their personal computers to the large screen S1, S2 of the display device of the host's conference machine.

SUMMARY OF THE PRESENT INVENTION

The invention is advantageous in that it provides a multi-terminal conference system and a conference multi-terminal collaboration method, wherein the multi-terminal conference system is configured to allow the offline display terminal thereof to only share the display task without the need to run any remote conference program and to perform any split-screen processing task and encoding/decoding task, so as to effectively guarantee a normal operation of the display terminal.

Another advantageous of the invention is to provide a multi-terminal conference system and a conference multi-terminal collaboration method, which allow the user to log in the remote conference according to his or her own device terminal based on the multi-terminal conference system, so that commercial information security can be guaranteed.

Another advantageous of the present invention is to provide a multi-terminal conference system and a conference multi-terminal collaboration method, wherein the multi-terminal conference system comprises at least a display terminal, a receiving device and a camera, wherein the display terminal and the camera are connected to the receiving device, wherein the receiving device is configured to wirelessly send a recording content of the camera so that the recording content of the camera is uploaded as a real-time videography to the corresponding remote conference program, wherein the receiving device further receives a data information of the audio-visual signal corresponding to the remote conference program, decodes the data information to obtain the audio-visual signal corresponding to the data information, and transmits the decoded data information to the display terminal for casting the remote conference on the display terminal, so that the conference program is avoided from running on the display terminal to guarantee the effect and experience of the conference.

Another advantageous of the present invention is to provide a multi-terminal conference system and a conference multi-terminal collaboration method, wherein the multi-terminal conference system comprises a network terminal and a transmission device, wherein the network terminal is connected to the transmission device while the display terminal is connected to the receiving device and the transmission device is wirelessly connected with the receiving device, so as for transmitting the audio-visual signal of the network terminal to the display terminal for projection, wherein the receiving device is configured to transmit the recording content of the camera to the transmission device, wherein the network terminal is configured to run the remote conference program and be able to input the corresponding remote conference based on the remote conference program, wherein the network terminal inputs the recorded content from the transmission device and is a real-time videography uploaded to the remote conference program with the recorded content, wherein the transmission device directly transmits the audio-visual signal generated based on the built-in audio-visual transmission protocol of the networked terminal from the network terminal, wherein the audio-visual signal is a screen picture signal and/or an audio signal corresponding to the network terminal, which is wirelessly transmitted to the receiving device after being encoded into corresponding data information, wherein the receiving device decodes the data information to obtain the audio-visual signal corresponding to the data information and transmits to the display terminal, wherein the audio-visual signal is displayed by the display terminal for casting the remote conference on the display terminal. Accordingly, the conference program can be avoided from running on the display terminal and the effect and experience of the conference can be guaranteed.

Another advantageous of the present invention is to provide a multi-terminal conference system and a conference multi-terminal collaboration method, wherein the multi-terminal conference system comprises a mobile terminal, wherein the mobile terminal can run a remote conference program and can input the corresponding remote conference based on the remote conference program, wherein the mobile terminal is wirelessly connected to the receiving device based on its own screen projection protocol and receives the recorded content from the receiving device as a real-time videography uploaded to the remote conference program, wherein the mobile terminal transmits the data information corresponding to the audio-visual signal thereof to the receiving device based on its own screen projection protocol, wherein the receiving device decodes the data information to obtain the audio-visual signal corresponding to the data information and transmits the audio-visual signal to the display terminal for displaying the audio-visual signal by the display terminal, so that the remote conference is projected on the display terminal so as to avoid the conference program from running on the display termina and guarantee the effect and experience of the conference.

Another advantageous of the present invention is to provide a multi-terminal conference system and a conference multi-terminal collaboration method, wherein the transmission device comprises an audio-visual signal transmission terminal, wherein the transmission device is connected with the device terminal of the device with built-in corresponding audio-visual transmission protocol through the audio-visual signal transmission terminal, so as to directly input the audio-visual signal generated from the device terminal based on the built-in audio-visual transmission protocol thereof, and/or transmit the corresponding camera signal to the device terminal, corresponding to the state that the transmission device is connected to the network terminal at the audio-visual signal transmission terminal. The transmission device can transmit the camera signal corresponding to a real-time video recording screen of the camera to the network terminal and directly input the audio-visual signal from the network terminal, without the need to encode by any codec software for driving the processor of the network terminal to be installed on the network terminal, such that the present invention avoids the deceasing of clarity and sound quality of the camera signal and the audio-visual signal due to the encoding and decoding processing of the processor of the network terminal, and prevents any delay generated during the encoding by the processor of the network terminal so as to accomplished a real-time acquisition of information that improves the timeliness and fluency of information transmission to ensure a pleasant using experience for the users.

Another advantageous of the present invention is to provide a multi-terminal conference system and a conference multi-terminal collaboration method, wherein the transmission device comprises a encoding module, which is configured to encode the audio-visual signal inputted by the audio-visual signal transmission terminal, wherein the encoding module generates a data information by means of a special encoder to encode the audio-visual signal, wherein the special encoder is specially designed for encoding to ensure good encoding performance, so that the quality and fluency of the signals are guaranteed, so as to ensure a pleasant using experience for the user, while there is no need to use the processor of the device terminal, connected with the audio-visual signal transmission terminal, to conduct encoding and decoding, and thus the effect and experience of the conference are guaranteed.

Another advantageous of the present invention is to provide a multi-terminal conference system and a conference multi-terminal collaboration method, wherein after the receiving device receives and inputs the recording content from the camera, the receiving device is configured to encode and process the recording content to generate a recording information, thereby reducing the amount of data to be sent by the receiving device wirelessly that facilitates the enhancement of the information transmission efficiency of the multi-terminal conference system.

Another advantageous of the present invention is to provide a multi-terminal conference system and a conference multi-terminal collaboration method, wherein the multi-terminal conference system transmits the recording information of the camera to the transmission device for decoding and processing, thereby avoiding the need to be decoded by the network terminal and install additional codec processing software on the network terminal, that ensures the quality of the camera signal. At the same time, the risk of information leakage caused by the installation of codec processing software is prevented while saving the time for installing the codec processing software, so as to ensure the users' good operating experience.

Another advantageous of the present invention is to provide a multi-terminal conference system and a conference multi-terminal collaboration method, wherein the receiving device comprises a decoding module and at least one audio-visual signal output terminal, wherein the decoding module performs decoding processing on the data information received from the transmission device to obtain the audio-visual signal corresponding to the data information, wherein the receiving device is connected to the display terminal at the audio-visual signal output terminal, so as to transmit the audio-visual signal to the display terminal. Thereby the audio-visual signal of the corresponding device terminal connected to the transmission device can be projected to the display terminal.

Another advantageous of the present invention is to provide a multi-terminal conference system and a conference multi-terminal collaboration method, wherein the multi-terminal conference system further comprises at least one presentation terminal and at least one transmission device, wherein the presentation terminal is connected to the transmission device, which is wirelessly connected to the receiving device. The receiving device transmits the audio and video signal of the network terminal and the audio and video signal of the presentation terminal to the display terminal, so that the display terminal is able to display both the corresponding remote conference and the presentation content at the same time, so as to coordinate the online and offline conference.

Another advantageous of the present invention is to provide a multi-terminal conference system and a conference multi-terminal collaboration method, which is configured to be an intuitive wireless presentation and collaboration system, allowing each participant to wirelessly share content from his or her conference device, such as personal computer, laptop, notebook, smart device, and etc., to a display terminal such as television, display screen, projector screen, and the like without the need for APPs, setup, or cables.

Another advantageous of the present invention is to provide a multi-terminal conference system and a conference multi-terminal collaboration method, which supports multiple participants to use at the same time with one-click screen sharing, dual-screen display, and multicast mode, as well as smart device casting.

Another advantageous of the present invention is to provide a multi-terminal conference system and a conference multi-terminal collaboration method, which can display contents from multiple users on a single screen simultaneously, significantly enhancing corporate efficiency and productivity.

Another advantageous of the present invention is to provide a multi-terminal conference system and a conference multi-terminal collaboration method, which supports video conferencing through third-party tools such as ZOOM, TEAMS and etc., with no need for any software installation or setup, wherein the dual-screen mode enables user participants to display camera content on one screen and shared content on another screen, that significantly improves the conference efficiency.

Another advantageous of the present invention is to provide a multi-terminal conference system and a conference multi-terminal collaboration method, which does not require any software configuration and IT support and allows the user having no concerns about compatibility and WIFI or network setup, providing a powerful and straightforward solution for the users to immediately use the system for collaborative presentations.

Additional advantages and features of the invention will become apparent from the description which follows, and may be realized by means of the instrumentalities and combinations particular point out in the appended claims.

According to the present invention, the foregoing and other objects and advantages are attained by a multi-terminal conference system, comprising:

at least one display terminal;

a camera configured for recoding a scene content where the multi-terminal conference system is located;

at least one receiving device, which comprises a wireless transceiver module, a decoding module, at least one audio-visual signal output terminal, and a camera input terminal, wherein the wireless transceiver module is connected to the decoding module, the audio-visual signal output terminal and the camera input terminal, wherein the camera input terminal is configured for connecting with the camera to input a corresponding recording content from the camera and transmit the corresponding recording content wirelessly through the wireless transceiver module, so as to use the recording content as a real-time capture image uploading to the remote conference program, wherein the wireless transceiver module further receives a data information of the audio-visual signal corresponding to the remote conference, wherein the decoding module is arranged to decode the data information received by the wireless transceiver module to obtain the audio-visual signal corresponding to the data information, wherein the audio-visual signal output terminal is configured for connecting with the display terminal to transmit the audio-visual signal to the display terminal so as for displaying the remote conference on the display terminal.

In one embodiment, the multi-terminal conference system further comprises a transmission device, wherein while a network terminal is arranged to run a remote conference program and input the corresponding remote conference based on the remote conference program, the transmission device comprises an audio-visual signal transmission terminal, an encoding module and a communication module, wherein the audio-visual signal transmission terminal is configured for connecting with the network terminal, and the encoding module is connected to the audio-visual signal transmission terminal and the communication module, wherein the wireless transceiver module is wirelessly connected with the communication module, the communication module of the transmission device is configured to input the data information wirelessly transmitted by the wireless transceiver module. The network terminal inputs the data information from the audio-visual signal transmission terminal while the recording content is used as the real-time capture image uploading to the remote conference program, wherein the transmission device inputs the audio-visual signal of the network terminal from the network terminal at the audio-visual signal transmission terminal. The encoding module encodes and processes the audio and video signal inputted by the audio and video signal transmission terminal and generates the data information, wherein the communication module transmits the data information in a wireless mode and the wireless transceiver module receives the data information.

In one embodiment, the multi-terminal conference system further comprises a mobile terminal, which is configured to run the remote conference program and input the corresponding remote conference based on the remote conference program, wherein the mobile terminal is wirelessly connected to the wireless transceiver module of the receiving device based on its own screen projection protocol to receive the data information transmitted by the wireless transceiver module while the recording content is used as the real-time capture image uploading to the remote conference program, wherein the mobile terminal transmits the data information corresponding to its audio-visual signal to the receiving device based on its own projection protocol.

In one embodiment, the receiving device further comprises a receiving terminal encoding module and the transmission device further comprises a transmitting terminal decoding module, wherein the receiving terminal encoding module is connected to the camera input terminal and the wireless transceiver module and configured to encode and process the recording content inputted from the camera input terminal to generate a recording information. The wireless transceiver module wirelessly transmits the recording information, wherein the transmitting terminal decoding module is connected to the communication module and the audio-visual signal transmission terminal and configured to decode the recording information to obtain the recording content corresponding to the recording information, wherein the audio-visual signal transmission terminal transmits the recording content to the network terminal.

In one embodiment, the receiving device further comprises a receiving terminal encoding module, wherein the receiving terminal encoding module is connected to the camera input terminal and the wireless transceiver module, and configured to encode and process the recording content inputted from the camera input terminal to generate the recording information. The wireless transceiver module wirelessly transmits the recording information. The mobile terminal receives the recording information and decodes the recording information to obtain the recording content corresponding to the recording information.

In one embodiment, the transmission device further comprises an audio recorder module, which is connected to the audio-visual signal transmission terminal and is used to record a sound of the scene where the multi-terminal conference system is located. The audio-visual signal transmission terminal transmits an audio content of the sound corresponding to the sound recorded by the audio recorder module to the network terminal, wherein the network terminal uses the audio content as a real-time audio uploading to the remote conference program.

In one embodiment, the multi-terminal conference system further comprises at least one presentation terminal and at least one other transmission device, wherein an audio-visual transmission terminal of the other transmission device is configured to connect with the presentation terminal to input the audio-visual signal for the presentation terminal from the presentation terminal, wherein the encoding module of the other transmission device is configured to be able to encode and process the audio-visual signal inputted through the audio-visual signal transmission terminal to generate the data information, wherein the communication module of the another transmitting device is wirelessly connected to the wireless transceiver module of the receiving device and is arranged to transmit the data information in a wireless manner, wherein the wireless transceiver module receives the data information, and the decoding module is arranged to decode the data information received by the wireless transceiver module to obtain the audio-visual signal of the presentation terminal corresponding to the data information, wherein the audio-visual signal output terminal transmits the audio-visual signal of the network terminal and the audio-visual signal of the presentation terminal to the display terminal, thereby the display terminal displays both the corresponding remote conference and the presentation content at the same time.

In one embodiment, the transmission device comprises a control module, which is connected to the encoding module and used to control the encoding module to encode the audio-visual signal. The encoding module is in a dormant state by default and is arranged in such a manner that, when the control module is operated once, the encoding module begins to encode the audio-visual signal, and when the control module is operated again, the encoding module switches back to the dormant state and stops encoding. Accordingly, the audio-visual signal of the network terminal and the audio-visual signal of the presentation terminal are selectively transmitted to the display terminal.

In one embodiment, the multi-terminal conference system further comprises at least one mobile terminal, wherein the mobile terminal is wirelessly connected to the wireless transceiver module of the receiving device, wherein the mobile terminal is configured to encode and process corresponding audio-visual signal thereof to generate corresponding data information, and to wirelessly transmit to the wireless transceiver module, wherein the decoding module is arranged to decode the data information received by the wireless transceiver module to obtain the audio-visual signal of the mobile terminal corresponding to the data information, wherein the audio-visual signal output terminal is adapted to transmit the audio-visual signal of the mobile terminal to the display terminal, thereby the display terminal displays the presentation content corresponding to the mobile terminal, wherein based on the operation of the control module of the other transmission device, the audio-visual signal of the presentation terminal and/or the audio-visual signal of the mobile terminal can be selectively displayed to the display terminal.

In one embodiment, the multi-terminal conference system further comprises at least one mobile terminal, wherein the mobile terminal is wirelessly connected to the wireless transceiver module of the receiving device, wherein the mobile terminal is configured to encode and process corresponding audio-visual signals thereof to generate corresponding data information, and to wirelessly transmit to the wireless transceiver module, wherein the decoding module is arranged to decode the data information received by the wireless transceiver module to obtain the audio-visual signal of the mobile terminal corresponding to the data information, wherein the audio-visual signal output terminal transmits the audio-visual signal of the network terminal and the audio-visual signal of the mobile terminal to the display terminal, thereby the display terminal displays the corresponding remote conference and presentation content simultaneously.

In one embodiment, the number of the display terminal is two, and the number of the audio-visual signal output terminal of the receiving device is two, wherein the two audio-visual signal output terminals are correspondingly connected with the two display terminals, wherein the receiving device transmits the audio-visual signal of the network terminal to one of the display terminals and transmits the audio-visual signal of the presentation terminal to the other display terminal.

In one embodiment, the number of the display terminal is two and the number of the audio-visual signal output terminal of the receiving device is two, wherein the two audio-visual signal output terminals are correspondingly connected with the two display terminals, wherein the receiving device transmits the audio-visual signal of the network terminal to one of the display terminals and transmits the audio-visual signal of the presentation terminal and/or the audio-visual signal of the mobile terminal to the other display terminal.

In one embodiment, the number of the display terminal is two and the number of the audio-visual signal output terminal of the receiving equipment is two, wherein the two audio-visual signal output terminals are correspondingly connected with the two display terminals, wherein the receiving device transmits the audio-visual signal of the network terminal to one of the display terminals and transmits the audio-visual signal of the mobile terminal to the other display terminal.

In accordance with another aspect of the invention, the present invention provides a conference multi-terminal collaboration method which comprises steps of:

S1: inputting a recording content of a camera via a camera input terminal of a receiving device connected with the camera;

S2: wirelessly transmitting a corresponding data of the recording content by a wireless transceiver module of the receiving device;

S3: receiving the data transmitted by the wireless transceiver module and uploading the recording content as a real-time capture image of a corresponding remote conference;

S4: encoding and processing an audio-visual signal of the remote conference to generate a data information and transmitting the data information wirelessly; and S5: inputting the data information by the wireless transceiver module of the receiving device, decoding the data information by a decoding module of the receiving device to obtain the audio-visual signal corresponding to the data information, transmitting the audio-visual signal outputted from the decoding module at an audio-visual signal output terminal of the receiving device to a display terminal, and displaying the remote conference on the display terminal.

In one embodiment, before the step S2, a receiving terminal encoding module of the receiving device encodes the recording content and generates a recording information, wherein in the step S2, the wireless transceiver module wirelessly transmits the data information.

In one embodiment, the step S3 comprises steps of:

S31: receiving the recording information by a communication module of a transmission device;

S32: decoding the recording information received from the communication module by an encoding module of the transmission device to obtain the recording content corresponding to the recording information;

S33: transmitting the recording content by an audio-visual signal transmission terminal of the transmission device to a network terminal; and S34: running a remote conference program by the network terminal, inputting the corresponding remote conference based on the remote conference program, and inputting the recording content from the transmission device, and using the recording content as a real-time capture image uploading to the remote conference program.

In one embodiment, the step S4 comprises steps of:

S41: inputting the audio-visual signal of the network terminal by an audio-visual signal transmission terminal of the transmission device from the network terminal;

S42: encoding and processing the audio-visual signal inputted through the audio-visual signal transmission terminal by the encoding module to generate the data information; and S43: transmitting the data information by the communication module in a wireless manner.

In one embodiment, the step S3 comprises steps of:

S31': receiving the recording information by a mobile terminal from the receiving device based on the mobile terminal's own projection protocol;

S32': decoding and processing the recording information by the mobile terminal to obtain the recording content corresponding to the recording information; and S33': operating a remote conference program in the mobile terminal, inputting the corresponding remote conference based on the remote conference program, and using the recording content as a real-time capture image uploading to the remote conference program.

In one embodiment, the conference multi-terminal collaboration method further comprises steps of:

S6: inputting an audio-visual signal of a presentation terminal by an audio-visual signal transmission terminal of other transmission device from the presentation terminal, coding and processing the audio-visual signal inputted through the audio-visual signal transmission terminal by an encoding module of the other transmission device to generate a data information, and transmitting the data information by the communication module of the other transmission device in a wireless manner; and S7: inputting the data information from the communication module of the other transmission device by the wireless transceiver module of the receiving device, decoding the data information received from the wireless transceiver module by the decoding module to obtain the audio-visual signal of the presentation terminal corresponding to the data information, transmitting the audio-visual signal of the network terminal and the audio-visual signal of the presentation terminal to the display terminal by the audio-visual transmission terminal, and displaying the corresponding remote conference and the presentation content on the display terminal at the same time.

In one embodiment, the step S6 further comprises steps of: when a control module of the transmission device is operated once, beginning to encode the audio-visual signal by the encoding module, and when the control module is operated again, switching back the encoding module to a dormant state and stopping encoding.

In one embodiment, the conference multi-terminal collaboration method further comprises steps of:

S8: encoding and processing the corresponding audio-visual signal by a mobile terminal which is connected with the wireless transceiver module of the receiving device to generate the corresponding data information, and wirelessly transmitting the corresponding data information to the wireless transceiver module; and S9: decoding the data information received by the wireless transceiver module by the decoding module of the receiving device to obtain the audio-visual signal of the mobile terminal corresponding to the data information, and transmitting the audio-visual signal of the presentation terminal and the audio-visual signal of the mobile terminal to the display terminal, displaying both the corresponding remote conference and the presentation content in the display terminal simultaneously.

In one embodiment, in the step S9, the number of the display terminal is two and the number of the audio-visual signal output terminal of the receiving device is two, wherein the receiving device transmits the audio-visual signal of the network terminal to one of the display terminals, and transmits the audio-visual signal of the presentation terminal to the other display terminal.

In one embodiment, in the step S9, the number of the display terminal is two and the number of the audio-visual signal output terminal of the receiving device is two, wherein the receiving device transmits the audio-visual signal of the network terminal 30 to one of the display terminals, and transmits the audio-visual signal of the presentation terminal and/or the audio-visual signal of the mobile terminal to the other display terminal.

In one embodiment, in the step S9, the number of the display terminal is two and the number of the audio-visual signal output terminal of the receiving device is two, wherein the receiving device transmits the audio-visual signal of the presentation terminal to one of the display terminals, and transmits the audio-visual signal of the mobile terminal to the other display terminal.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1A:
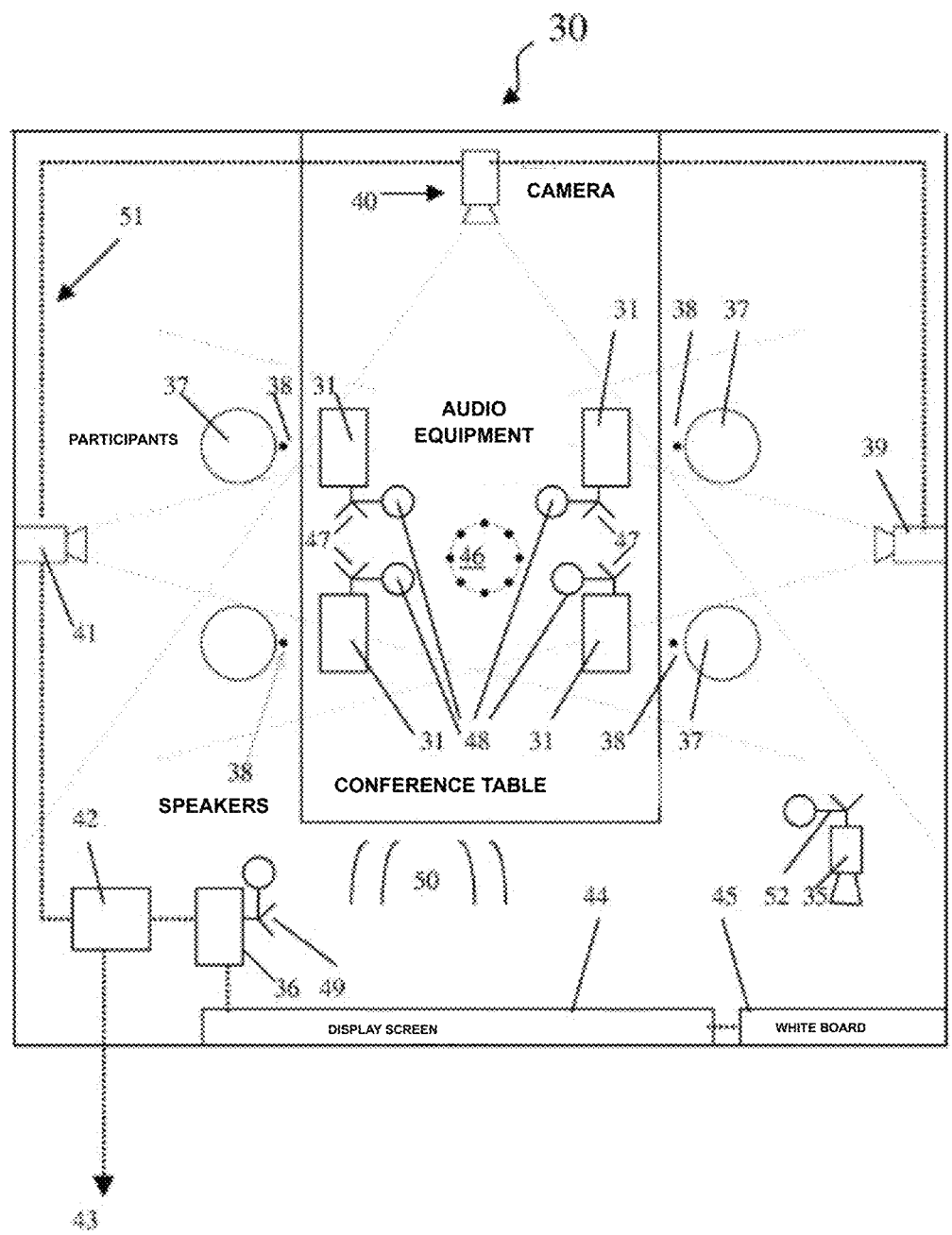
FIG. 1A is a schematic view illustrating a conventional signal transmission system.
Figure 1B:
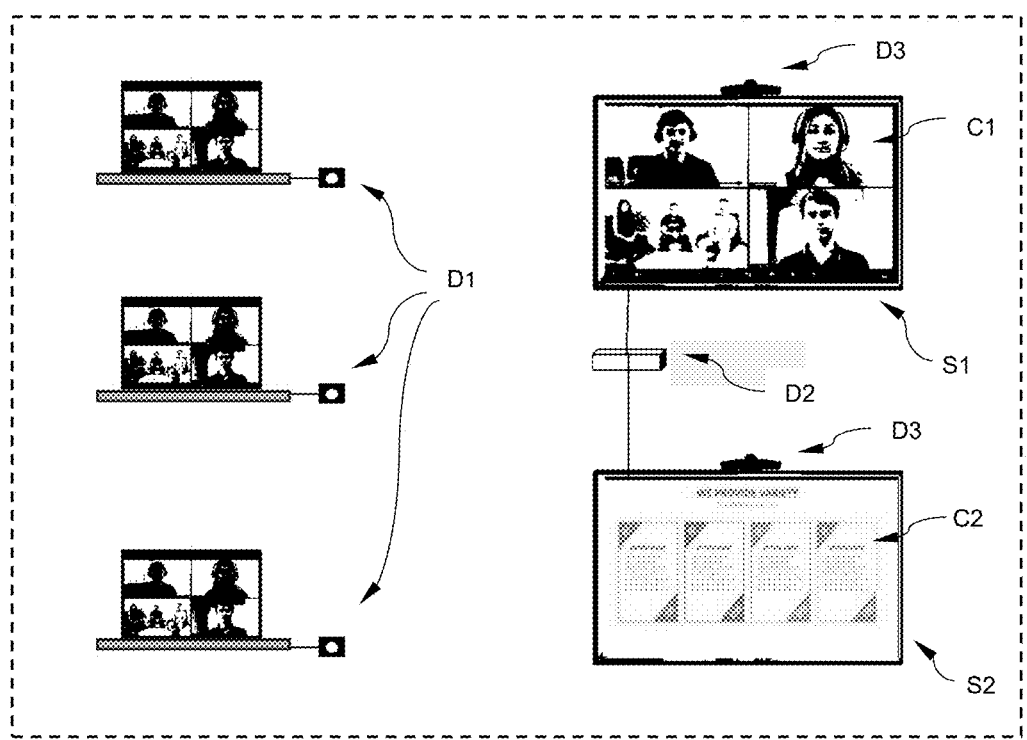
FIG. 1B is a schematic view illustrating another conventional signal transmission system.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

In the description of the present invention, unless explicitly stated otherwise and qualified, terms such as "connected," "attached," and "fixed" should be construed broadly. For instance, these terms may indicate a permanent connection or a detachable one, or they may refer to a whole unit. They can signify a mechanical linkage, an electrical connection, direct coupling, or indirect interaction through an intermediary medium. Whether these terms imply an internal connection between two elements or an interactive relationship between them will depend on the specific context and the understanding of those skilled in the art. The broken-line arrows in the drawings illustrate wireless connections.

Throughout this invention, unless explicitly stated otherwise and qualified, when the first feature is described as being "above" or "below" the second feature, this may entail direct physical contact between the two features. Alternatively, it may signify that the first and second features are not in direct contact but are linked through the involvement of additional features. Additionally, the description of the first feature being "above," "over," or "on top of" the second feature includes scenarios where the first feature is positioned directly above or diagonally above the second feature or simply means that the first feature is situated at a higher horizontal level than the second feature. Conversely, when the first feature is referred to as "below," "under," or "beneath" the second feature, it encompasses cases where the first feature is directly below or diagonally below the second feature or simply implies that the first feature's horizontal height is less than that of the second feature.

In this embodiment's description, terms such as "up," "down," "right," and "left" are used to describe orientations or positional relationships. These descriptions are based on the orientations or positions depicted in the drawings and are employed for ease of explanation and simplification of operation. They should not be construed as indications or implications that the device or element being discussed must possess a specific orientation, be constructed in a particular manner, or operate exclusively in a certain orientation. Furthermore, terms such as "first" and "second" are employed solely for the purpose of distinction in the description and do not carry any particular significance.

Referring to FIG. 2 to FIG. 5 and FIG. 9 of the drawings, a multi-terminal conference system and a conference multi-terminal collaboration method according to the present invention are illustrated. The multi-terminal conference system, adapted for an online remote conference, comprises at least a receiving device 20, at least one display terminal 40, and at least a camera 50, wherein the display terminal 40 and the camera 50 are connected to the receiving device 20, wherein the receiving device 20 is configured to wirelessly transmit data corresponding to a recording content of the camera 50 such that the recording content is used as a real-time capture image uploading to a corresponding remote conference program, wherein the receiving device 20 is further arranged to receive a data information of an audio-visual signal corresponding to the remote conference program, to decode the data information to obtain the audio-visual signal corresponding to the data information, and to transmit the audio-visual signal to the display terminal 40 for displaying the remote conference on the display terminal 40, without the need to install and run any conference program on the display terminal 40, while ensuring the operative effect and experience of the conference.

It is worth mentioning that the recording content of the camera 50 includes image/video information of the scene where the multi-terminal conference system is located, and may also include audio information of the scene where the multi-terminal conference system is located.

Figure 2:
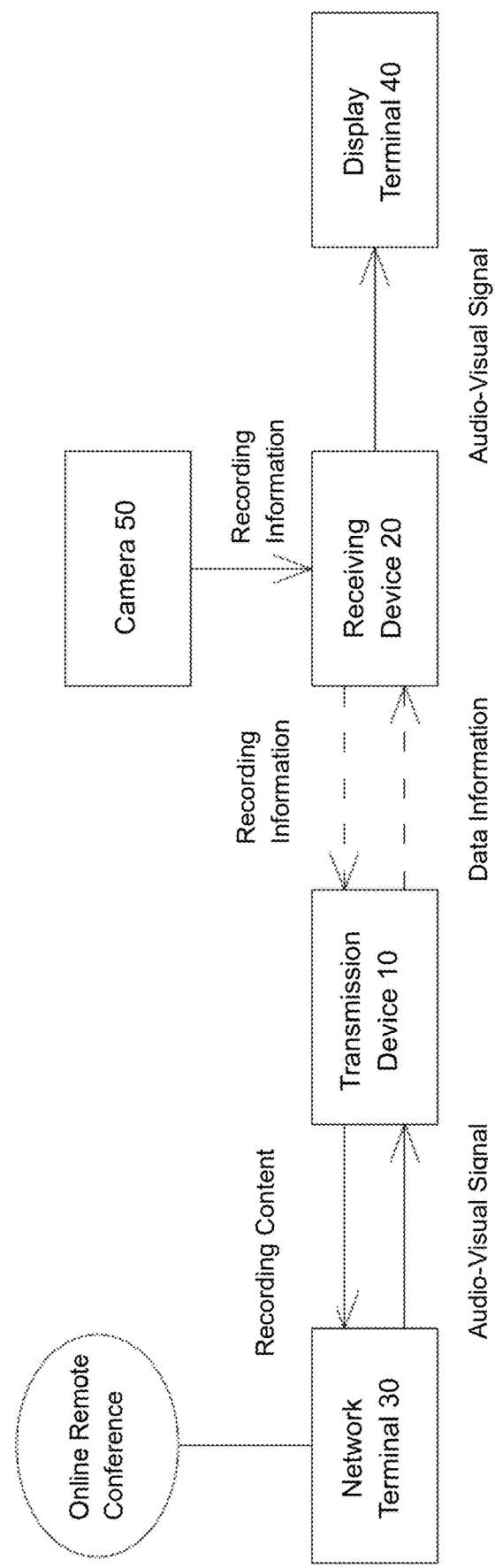
FIG. 2 is a block diagram illustrating a multi-terminal conference system according to a preferred embodiment of the present invention.

Referring to FIG. 2, the multi-terminal conference system further comprises a transmission device 10 and a network terminal 30 which is connected to the transmission device 10, wherein the transmission device 10 is wirelessly connected with the receiving device 20 in such a manner that the audio-visual signal of the network terminal 30 is able to transmit to the display terminal 40 for displaying. The receiving device 20 is configured to be able to transmit the recording information corresponding to the recording content of the camera 50 to the transmission device 10. The network terminal 30 is arranged to run a remote conference program, such as conference program, remote conference websites, and etc., and to input a remote conference correspondingly based on the remote conference program, wherein the network terminal 30 inputs the recording content from the transmission device 10 which is used as a real-time capture image uploading to the remote conference program. That is, the transmission device 10 works as an equivalent camera when the network terminal 30 joins the remote conference.

Further, the transmission device 10 directly inputs the audio-visual signal generated based on the audio-visual transmission protocol built in the network terminal 30 from the network terminal 30. The audio-visual signal is a screen image signal corresponding to the network terminal 30 and/or audio signal for wirelessly transmitting to the receiving device 20 after being encoded into corresponding data information. The receiving device 20 is configured to decode the data information to obtain the audio-visual signal corresponding to the data information, which is transmitted to the display terminal 40, wherein the audio-visual signal is displayed by the display terminal 40, so as for displaying the remote conference on the display terminal 40, that avoids the running of any conference program on the display terminal 40 while ensuring the effect and experience of the conference.

It is appreciated that the multi-terminal conference system inputs the remote conference through the network terminal 30 but not through the large screen of the display terminal 40 in the conference room, such that the user can access the remote conference via the network terminal 30 of his or her own, such as a laptop computer and the like, and project on the large screen in the conference room, especially when conducting a presentation in location of others company without the need to log in the user's conference account on the unfamiliar device, that is conducive to ensuring the security of commercial and private information.

In addition, the user does not need to install any driver software on the network terminal 30, but is able to utilize the camera in the conference room to capture and record the images of the conference room as the real-time capture image to upload to the remote conference program, as well as to costing the content of the remote conference to the display terminal 40 in the conference room.

Figure 4:
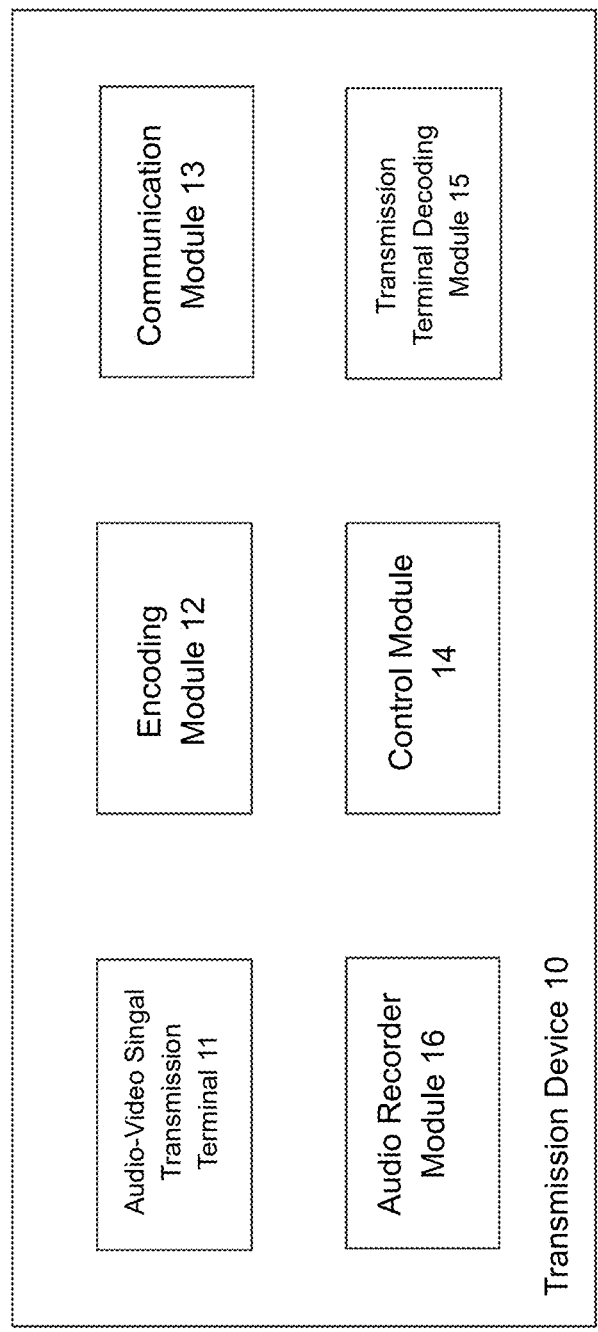
FIG. 4 is a block diagram illustrating a transmission device of the multi-terminal conference system according to the above preferred embodiment of the present invention.

In particular, as shown in FIG. 4, the transmission device 10 comprises an audio-visual signal transmission terminal 11, an encoding module 12 and a communication module 13, wherein the transmission device 10 is connected with a device terminal with the built-in corresponding audio-visual transmission protocol through the audio-visual signal transmission terminal 11, so as to directly input the audio-visual signal generated based on the built-in audio-visual transmission protocol of the device terminal from the device terminal, and/or to transmit the corresponding recording content to the device terminal. Corresponding to the state that the transmission device 10 is connected to the network terminal 30 at the audio-visual signal transmission terminal 11, the transmission device 10 is able to directly transmit the recording content of the real-time capture image of the camera 50 to the network terminal 30, as well as to directly input the audio-visual signal from the network terminal 30 without the need to install any codec software on the network terminal 30 to drive the processor of the network terminal 30 for encoding, that not only significantly avoids adverse situations like decreasing in image resolution and appearance definition and declining in sound quality due to the encoding processing of the capturing signal and the audio-visual signal by the processor of the network terminal 30, but also prevents real-time acquisition of information during the encoding processing by the processor of the network terminal 30, so as to ensure the timeliness and fluency of information transmission and guarantee the user having a good experience feeling.

It is worth mentioning that the transmission device 10 is configured to directly input the audio-visual signal from the network terminal 30, so that the transmission device does not require to install and run any driver software, neither the steps of installing the driver software on the network terminal 30 while connecting the transmission device 10 to the network terminal 30, nor the steps of running any driver while connecting the transmission device 10 to the network terminal 30. In order words, the transmission device 10 of the present invention does not have to store a driver software as well as to set up any storage module.

Further, the encoding module 12 is connected to the audio-visual signal transmission terminal 11 and the communication module 13, wherein the encoding module 12 is configured to encode the audio-visual signal inputted through the audio-visual signal transmission terminal 11, wherein the encoding module 12 encodes the audio-visual signal based on a specific encoder to generate the data information. The specific encoder is specifically designed for encoding so that it has good coding performance to ensure the quality and fluency of the signal. Thereby, the user's good experience feeling is guaranteed while no processor of the device terminal is required to be connected with the audio-visual signal transmission terminal 11 for encoding and decoding processing, that guarantees the effect and experience of the conference.

Figure 5:
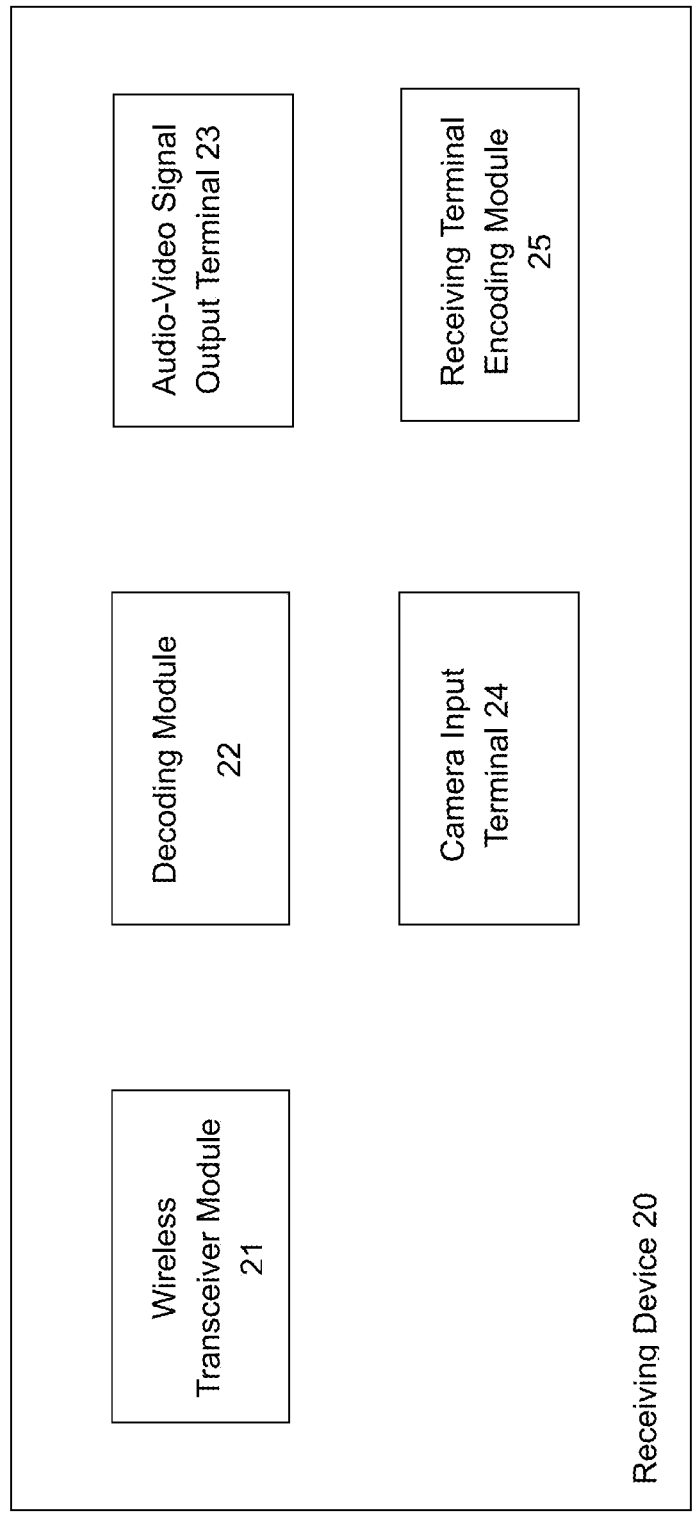
FIG. 5 is a block diagram illustrating a receiving device of the multi-terminal conference system according to the above preferred embodiment of the present invention.

Further, as shown in FIG. 5, the receiving device 20 comprises a wireless transceiver module 21, a decoding module 22, at least one audio-visual signal output terminal 23, and a camera input terminal 24, wherein the wireless transceiver module 21 is connected to the decoding module 22, the audio-visual signal output terminal 23 and the camera input terminal 24. The wireless transceiver module 21 is wirelessly connected with the communication module 13. The camera input terminal 24 is configured for connecting with the camera 50 and inputting the corresponding recording content from the camera 50. The wireless transceiver module 21 is arranged to transmit the data corresponding to the recording content in a wireless manner, wherein the communication module 13 of the transmission device 10 is configured to receive the data transmitted by the wireless transceiver module 21, and the audio-visual signal transmission terminal 11 is configured to transmit the recording content to the network terminal 30, wherein the network terminal 30 is configured to input the recording content from the transmission device 10 and the recording content is used as a real-time capture image to be uploaded to the remote conference program. The transmission device 10 is configured to input the audio-visual signal from the network terminal 30 at the audio-visual signal transmission terminal 11 thereof, and the encoding module 12 is configured to encode and process the audio-visual signal inputted by the audio-visual signal transmission terminal 11 and generates the data information. The communication module 13 is configured to transmit the data information in a wireless manner. The wireless transceiver module 21 is configured to receive the data information and the decoding module 22 is arranged to decode the data information received by the wireless transceiver module 21 to obtain the audio-visual signal corresponding to the data information, wherein the audio-visual signal output terminal 23 is arranged for connecting with the display terminal 40 to transmit the audio-visual signal to the display terminal 40, so that the remote conference is casted on the display terminal 40 and the display terminal 40 is only used as a casting and projection display without processing complex multi-operative tasks, that is conducive to ensuring the normal operation of the conference. The user does not need to install nay program on his or her own terminal device, avoiding the risk of information leakage during installing software on the device terminal to guarantee information security and, at the same time, saving the time of installing software when conducting an online remote conference by the user. The effectiveness and timeliness of information transmission is further enhanced.

Figure 3:
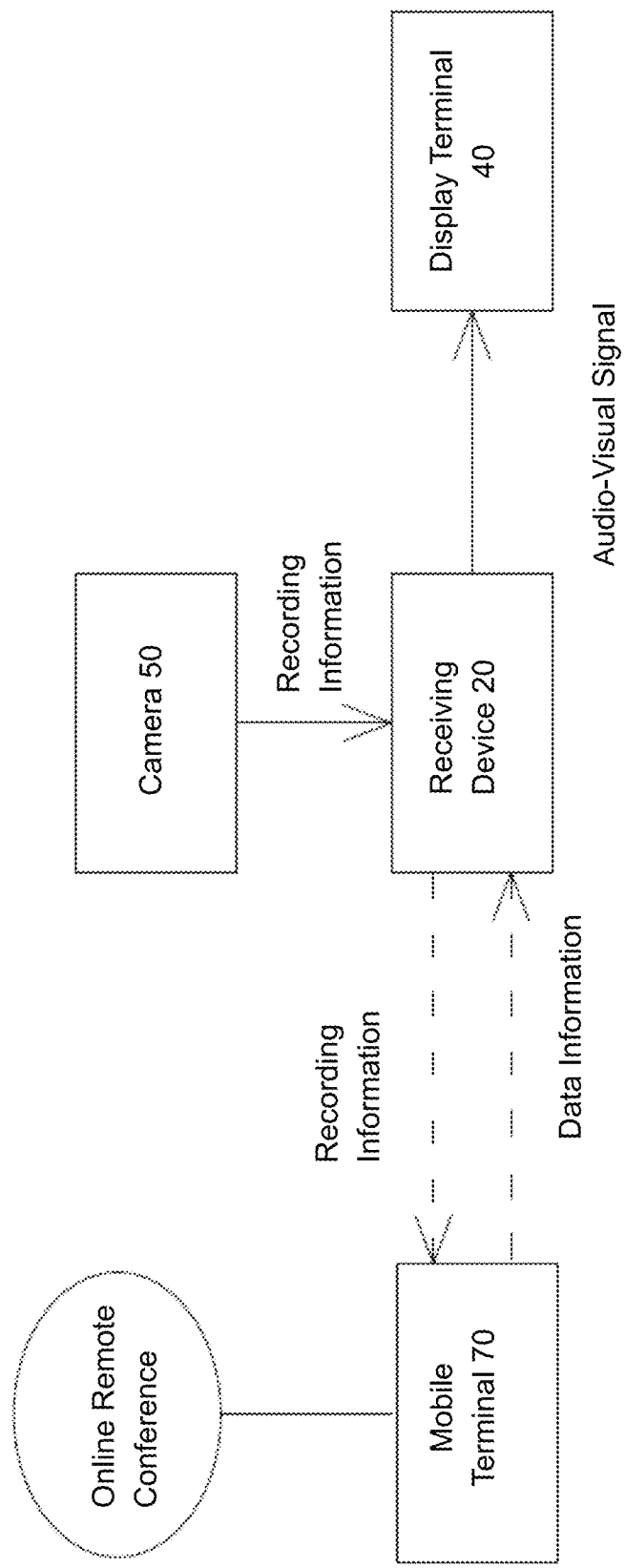
FIG. 3 is a block diagram illustrating the multi-terminal conference system according to the above preferred embodiment of the present invention.

It is worth mentioning that the remote conference can be logged in by a mobile terminal 70, as shown in FIG. 3, wherein the mobile terminal 70 can run the remote conference program and access the corresponding remote conference based on the remote conference program. The mobile terminal 70 is wirelessly connected to the receiving device 20 based on its own projection screen protocol, such that the mobile terminal 70 receives data from the receiving device 20 and takes the recording content as a real-time capture image uploading to the remote conference program. Also, the mobile terminal 70 transmits the data information corresponding to the audio-visual signal thereof to the receiving device 20 based on its own projection protocol, such that the user's mobile terminal 70, such as mobile phone, tablet, and etc., can be used to log in to the remote conference, that substantially improves flexibility and is conducive to ensuring the security of the user's account, wherein the image being uploaded by the mobile terminal 70 to the remote conference can be selected to the image recorded by the camera 50, such that the user is still able to conduct recording of the conference room even using the mobile phone.

In particular, the receiving device 20 further comprises a receiving terminal encoding module 25, which is connected to the camera input terminal 24 and the wireless transceiver module 21 and configured to generate a recording information by encoding and processing the recording content inputted from the camera input terminal 24, wherein the wireless transceiver module 21 is configured to wirelessly transmit the recording information, thereby reducing the amount of data to be wirelessly transmitted by the receiving device 20, that is conducive to enhance the information transmission efficiency of the multi-terminal conference system.

It is appreciated that the transmission equipment 10 further comprises a transmission terminal decoding module 15, which is connected to the communication module 13 and the audio-visual signal transmission end 11 and configured to decode the recording information to obtain the recording content corresponding to the recording information, wherein the audio-visual signal transmission terminal 11 directly transmits the recording content to the network terminal 30, thereby avoiding decoding processing based on the network terminal 30 and installing additional codec processing software on the network terminal 30, so as to ensure the quality of the camera signal, avoid the risk of information leakage produced during the installing of the codec processing software and save the time consumed for installing the codec processing software, that provides the user a good operation experience.

In particular, when the receiving device 20 wirelessly transmits the recording information encoded from the recording content, the mobile terminal 70 running the remote conference program receives the recording information from the receiving device 20 and decodes the recording information into the recording content for uploading to the remote conference program as the real-time capture image.

It is appreciated that when the wireless bandwidth between the receiving device 20 and the transmission device 10 and/or the mobile terminal 70 is sufficient, the receiving device 20 can transmit out the recording content after packaging and processing without encoding, while a higher requirement for the speed of wireless transmission is required.

In particular, the transmission device 10 further comprises an audio recorder module 16, which is connected to the audio-visual signal transmission terminal 11 and configured to record the sound of the scene where the multi-terminal conference system is located. The transmission device 10 is configured to transmit an audio content of the sound corresponding to the sound recorded by the radio module 16 to the network terminal 30 via the audio-visual signal transmission terminal 11, wherein the network terminal 30 takes the audio content as a real-time audio to be uploaded to the corresponding remote conference program. Therefore, the transmission device 10 is capable of working as a microphone for the remote conference, that allows the transmission device 10 to be placed according to the position of the transmission device 10, such as placing in the center of the conference table to improve the audio recording equalization of the radio module 16 to all directions of the conference room, that substantially avoids the use of the microphone of the network terminal 30 while it generally placed near a participant of the remote conference and prevents the shortcoming the voice of that participant is much louder than the voices of other participants of the remote conference.

It is worth mentioning that, under the circumstance that the recording content of the camera 50 includes the audio information of the scene where the multi-terminal conference system is located, while the network terminal 30 is logged in to the remote conference, the network terminal 30 has three optional microphone modules, including the microphone built in the network terminal 30, the audio recorder module 16 of the transmission device 10, and the audio information in the recording content recorded by the camera 50, either of them can be selected as the real-time audio being uploaded to the corresponding remote conference program.

In particular, in some embodiments, the camera 50 may further comprises an audio module, wherein the transmission device 10 is configured to transmit the data information of the audio-visual signal corresponding to the network terminal 30 to the receiving device 20, wherein after the receiving device 20 decodes the data information, the image signal thereof can be transmitted to the display terminal 40 for display, and the audio information thereof is transmitted to a broadcasting module of the camera 50 for broadcasting, or alternatively to the speaker of the display terminal 40 for broadcasting. It is understood that an independent broadcasting device terminal can also be arranged, such as an audio equipment, and connected to the receiving device 20, so that the receiving device 20 transmits the audio signal to the audio equipment for broadcasting.

Figure 6:
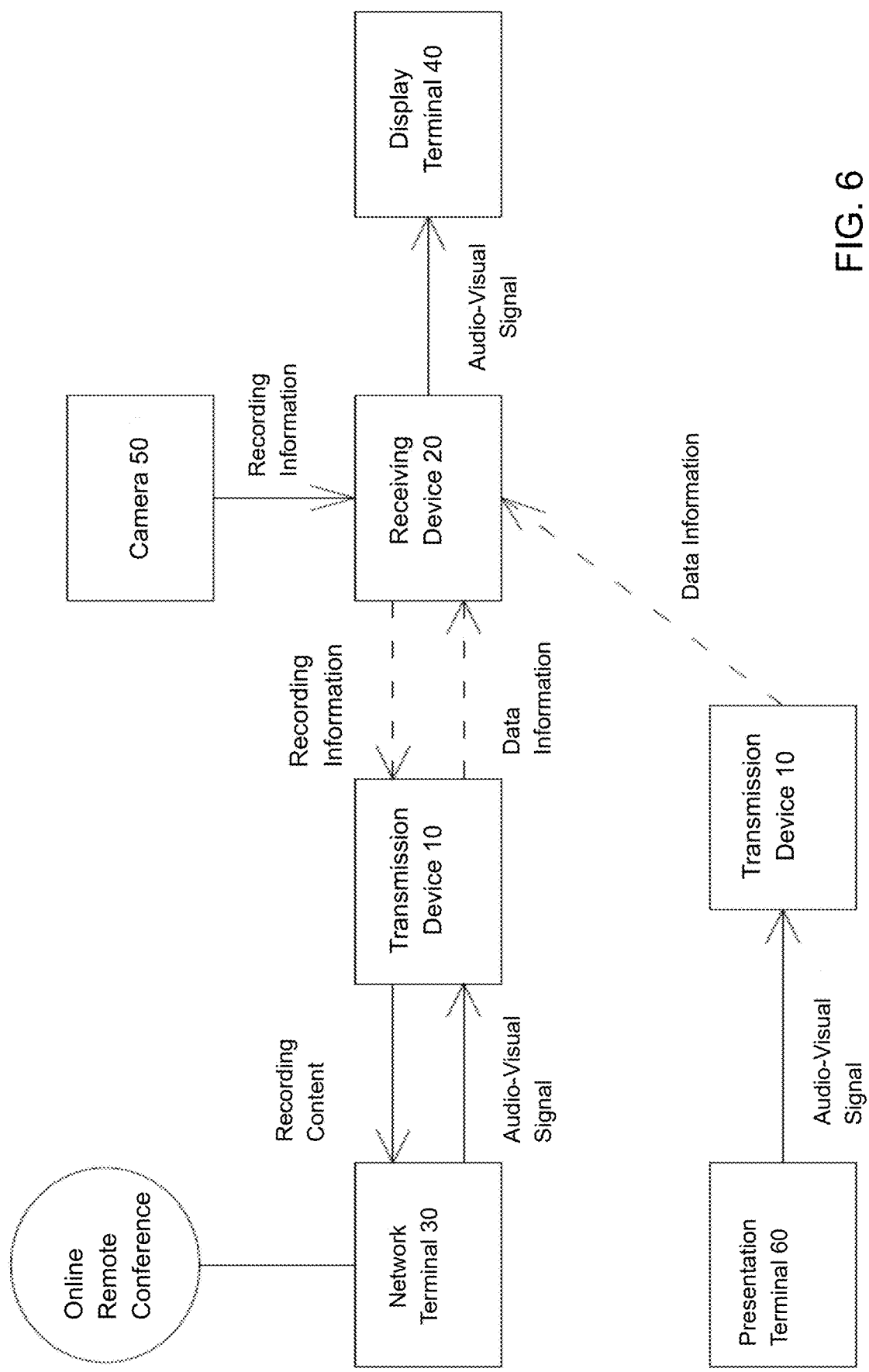
FIG. 6 is a block diagram illustrating the multi-terminal conference system according to the above preferred embodiment of the present invention.

Further, as shown in FIG. 6, the multi-terminal conference system further comprises at least one presentation terminal 60 and at least one other transmission device 10, wherein the audio-visual signal transmission terminal 11 of the other transmission device 10 is configured to be connected with the presentation terminal 60 to input the audio-visual signal of the presentation terminal 60 from the presentation terminal 60, wherein the presentation terminal 60 is configured to display project information discussed in the remote conference, and etc., wherein the encoding module 12 of the other transmission device 10 is configured to encode and process the audio-visual signal inputted via the audio-visual signal transmission terminal 11 to generate a data information, wherein the communication module 13 of the other transmission device 10 is wirelessly connected to the wireless transceiver module 21 of the receiving device 20 and is arranged to transmit the data information in a wireless manner. The wireless transceiver module 21 receives the data information, wherein the decoding module 22 is arranged to decode the data information received by the wireless transceiver module 21 to obtain the audio-visual signal corresponding to the data information of the presentation terminal 60. The audio-visual signal output terminal 23 transmits the audio-visual signal of the network terminal and the audio-visual signal of the presentation terminal 60 to the display terminal 40, so that the display terminal 40 is able to display the corresponding remote conference and presentation content simultaneously while there is no need to run any conference program on the display terminal 40.

In particular, the presentation terminal 60 can also log in to the remote conference to make a presentation content in the remote conference, wherein the receiving device 20 transmits the presentation content of the presentation terminal 60 and the remote conference screen displayed by the network terminal 30 to the display terminal 40. That is, when the remote conference is in progress, the participants of the remote conference can access all the remote conference participants and the presentation content at the same time, without relying on the program support of the remote conference program for the split-screen display. Also, it is not necessary to meet the hardware requirements of the remote conference program to implement the dual-screen output of split-screen display but can be implemented simply by the plug-and-play of the receiving device 20 and the transmission device 10.

Figure 7:
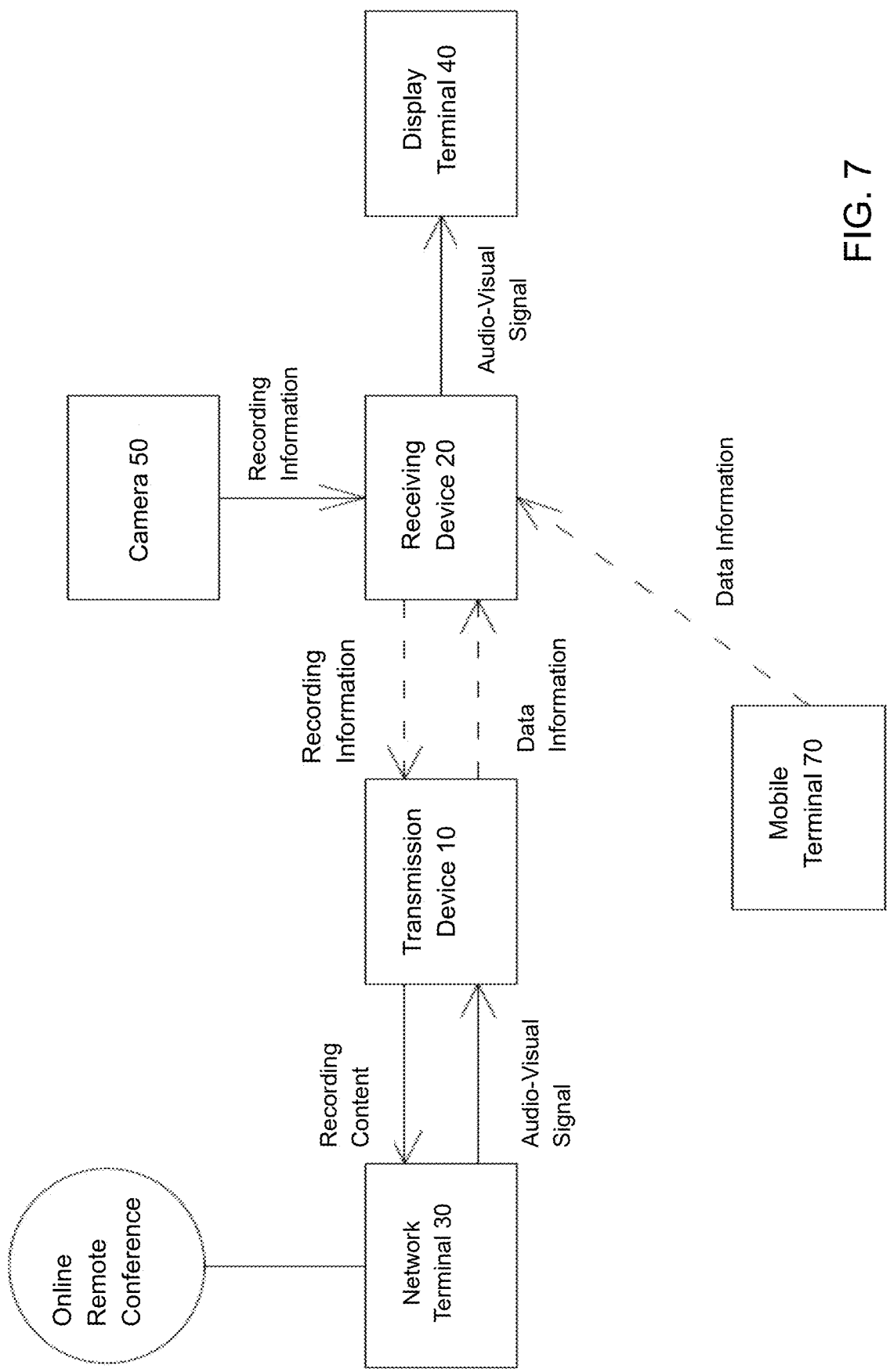
FIG. 7 is a block diagram illustrating the multi-terminal conference system according to the above preferred embodiment of the present invention.

It is worth mentioning that, as shown in FIG. 7, the user is capable of conducting presentation based on his or her own mobile terminal 70 and displaying the presentation on the display terminal 40, wherein the mobile terminal 70 can be the user's mobile phone, tablet, and etc., The mobile terminal 70 is wirelessly connected to the wireless transceiver module 21 of the receiving module 20, wherein the mobile terminal 70 can encode and process the corresponding audio-visual signal thereof and generate corresponding data information which is wirelessly transmitted to the wireless transceiver module 21. The decoding module 22 is arranged to decode the data information received by the wireless transceiver module 21 to obtain the audio-visual signal corresponding to the data information of the mobile terminal 70, wherein the audio-visual signal output terminal 23 transmits the audio-visual signal of the network terminal 30 and the audio-visual signal of the mobile terminal 70 to the display terminal 40, so that the display terminal 40 is able to display the corresponding remote conference and the presentation content simultaneously.

Similarly, the mobile terminal 70 for content presentation can also log in to the remote conference to make content presentation in the remote conference.

Figure 8:
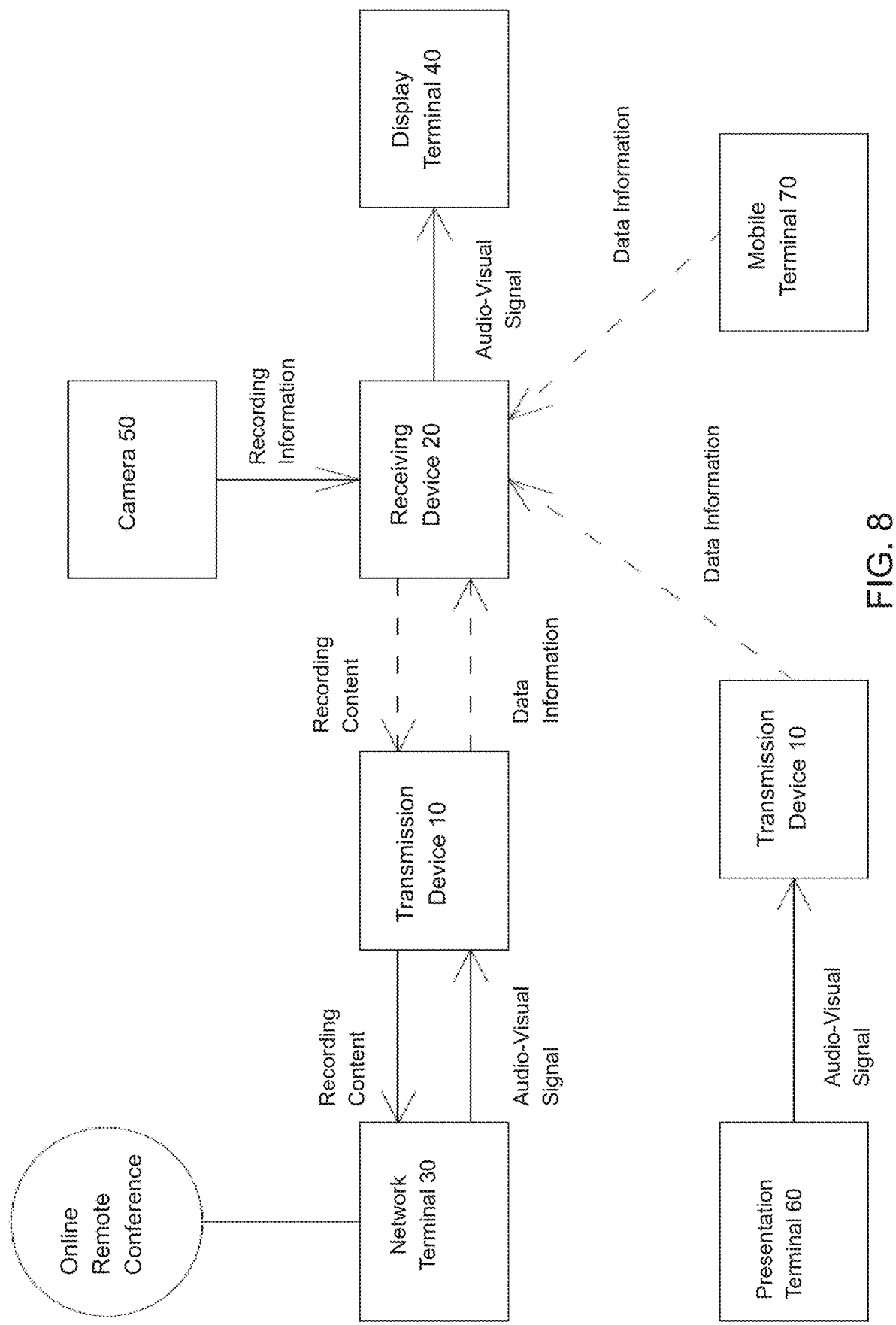
FIG. 8 is a block diagram illustrating the multi-terminal conference system according to the above preferred embodiment of the present invention.
Figure 9:
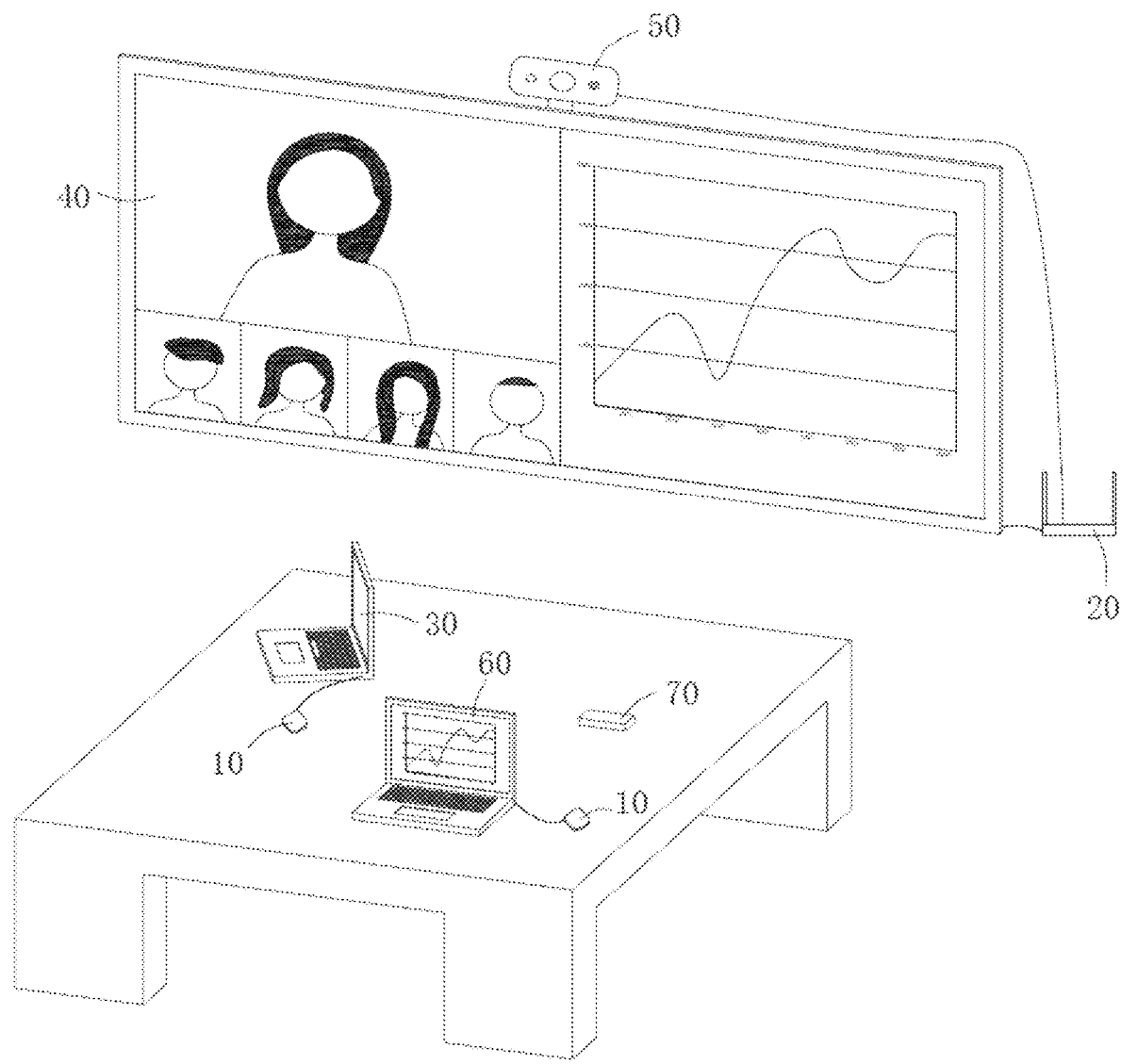
FIG. 9 is a schematic view of an implementation scenario of the multi-terminal conference system according to the above preferred embodiment of the present invention.

In particular, as shown in FIG. 8, the presentation terminal 60 and the mobile terminal 70 can also conduct presentations at the same time, or alternatively conduct presentations at different times. The present invention does not limit to such arrangement.

It is worth mentioning that the transmission device 10 further comprises a control module 14, which is connected to the encoding module 12 and configured to control the encoding module 12 to encode the audio-visual signal, wherein the coder module 12 is dormant by default and arranged that when the control module 14 is operated once, the encoding module 12 begins to encode the audio-visual signal, and that when the control module 14 is operated again, the encoding module 12 switches back to the dormant state and stops encoding, so that the audio-visual signal of the network terminal 30 and the audio-visual signal of the presentation terminal 60 are selectively displayed on the display terminal 40. Thereby, it prevents the transmitting of the information that does not need to be transmitted to avoid information leakage and guarantee the information security.

For example, when there are multiple presentation terminals incorporated in the multi-terminal conference system for conducting presentations separately, during the control module 14 of the transmission device 10 connected with the presentation terminal 60 that is conducting a presentation is operated, the audio-visual signal of the presentation terminal 60 that is conducting the presentation stops displaying on the display terminal 40, and the control module 14 of the transmission device 10 connected with the presentation terminal 60 for a latter presentation is operated and the audio-visual signal of the presentation terminal 60 of the latter presentation begins to be displayed on the display terminal 40 to process presentation.

It is worth mentioning that, based on the operation of the control module 14, the presentation control between the presentation terminal 60 and the mobile terminal 70 can also be implemented. For example, while the presentation terminal 60 is conducting a presentation, an operation of the control module 14 will stop the processing of the presentation of the presentation terminal 60 and switch to process the presentation of the mobile terminal 70, such that based on the operation of the control module 14, the audio-visual signal of the presentation terminal 60 and/or the audio-visual signal of the mobile terminal 70 can be selectively transmitted to the display terminal 40 for casting, so as to allow the presentations of the presentation terminal 60 and the mobile terminal 70 being separately displayed in different times.

In particular, in some embodiments of the present invention, the control module 14 is connected to the communication module 13 to control the communication module 13 to transmit information. That is, the encoding module 12 encodes the audio-visual signal in real time to generate the data information, and the control module 14 controls whether the communication module 13 transmits the data information, so that the user can control whether the communication module 13 transmits information or not, so as to avoid information leakage and ensure information security. The present invention does not limit such arrangement.

It is worth mentioning that in this preferred embodiment of the present invention, the control module 14 is operated in the mode of pressing or touching. If the control module 14 is embodied to comprise a physical control switch, the user is allowed to operate the control module 14 by pressing the control switch or touching the control switch.

Figure 10:
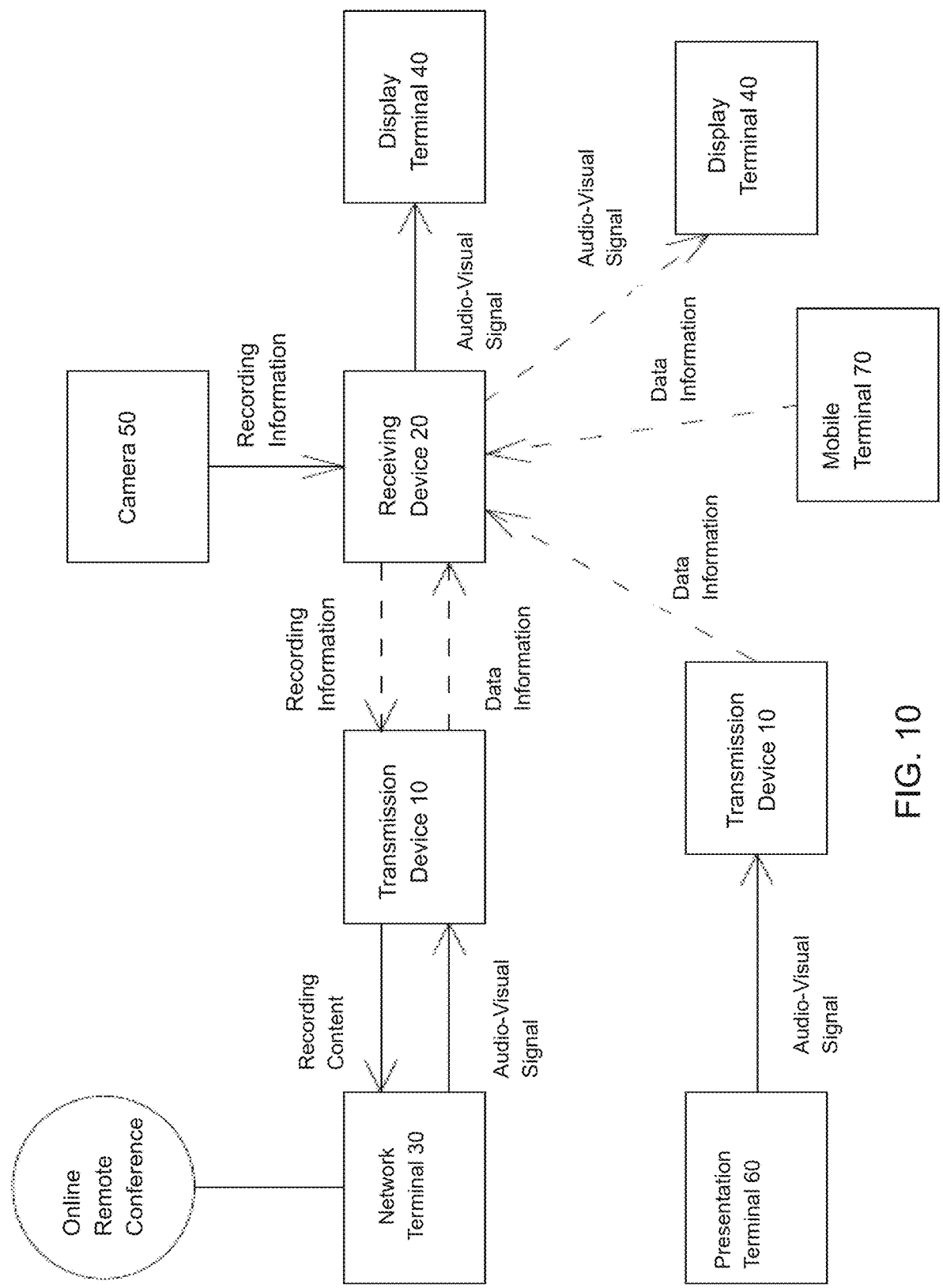
FIG. 10 is a block diagram illustrating the multi-terminal conference system according to the above preferred embodiment of the present invention.
Figure 11:
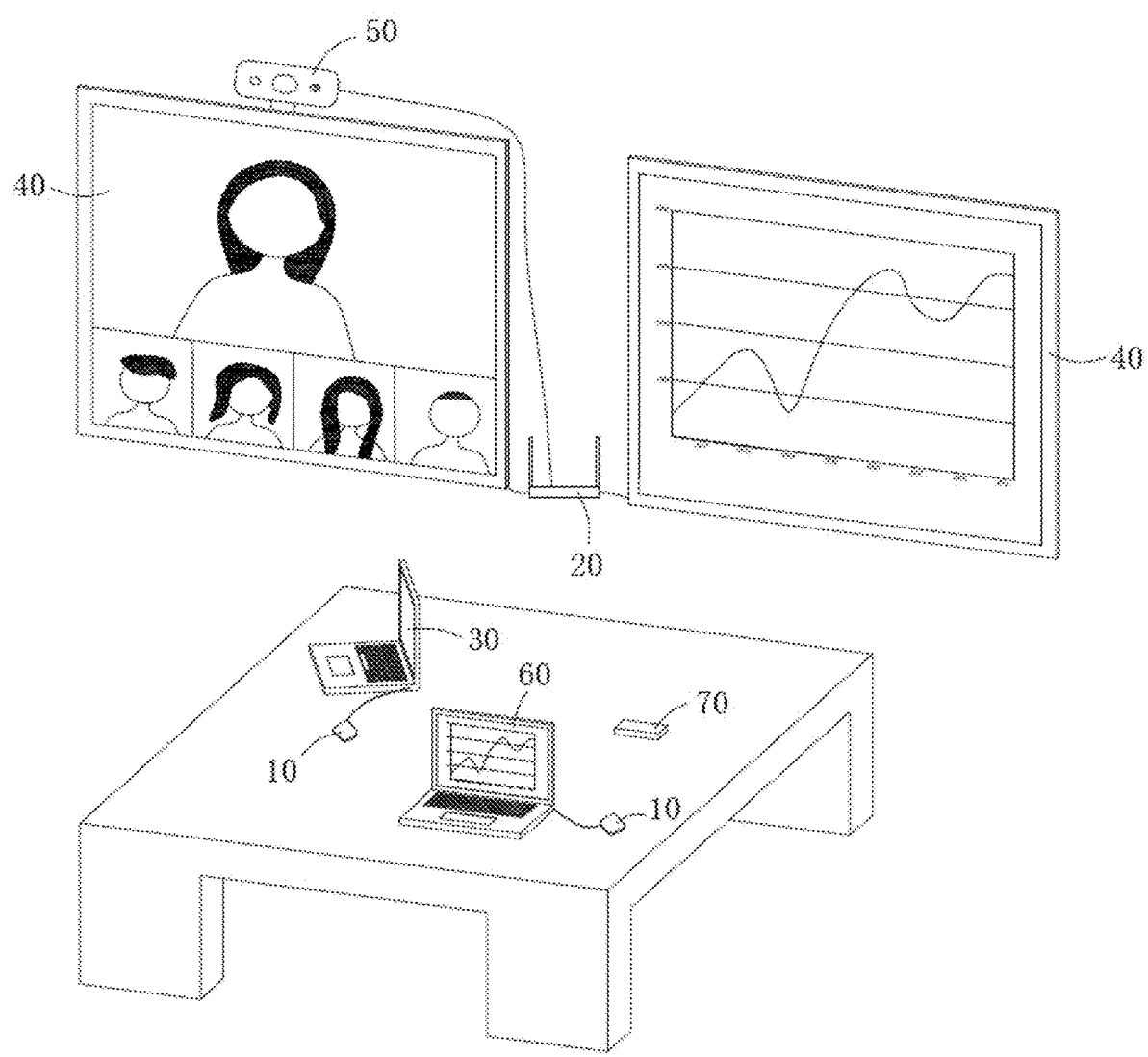
FIG. 11 is a schematic view of an implementation scenario of the multi-terminal conference system according to the above preferred embodiment of the present invention.

Further, referring to FIG. 10 and FIG. 11, the multi-terminal conference system according to the preferred embodiment of the present invention is embodied to comprise at least two display terminals 40, wherein a first display terminal 40 of the two display terminals is arranged for displaying remote conference content without running remote conference program, and a second display terminal 40 of the two display terminals 40 is arranged for displaying the presentation content of the remote conference. Correspondingly, the receiving device 20 comprises two audio-visual signal output terminals 23 which are correspondingly connected with the two display terminals 40 respectively, wherein a first audio-visual signal output terminal 23 of the two audio-visual signal output terminals 23 is arranged to transmit the audio-visual signal of the network terminal 30 to the first display terminal 40, and a second audio-visual signal output terminal 23 of the two audio-visual signal output terminals 23 is arranged to transmit the audio-visual signals of the presentation terminal 60 and/or the audio-visual signals of the mobile terminals 70 to the second display terminal 40.

It is appreciated that, in the scene where the multi-terminal conference system comprises the at least two display terminals 40, by operating the control module 14 of the transmission device 10, the content of the device terminal connected with the audio-visual signal transmission terminal 11 of the transmission device 10 can be selected to display on the display terminal 40, such as operating the control module 14 once, the content of the device terminal connected with the audio-visual signal transmission terminal 11 of the transmission device 10 is controlled to be displayed in one of the two display terminals 40, and operating the control module 14 continuously operated twice in a row, the content of the device terminal connected with the audio-visual signal transmission terminal 11 of the transmission device is controlled to be displayed in the other one of the two display terminals 40.

In order to further understand the present invention, based on the multi-terminal conference system of the present invention, a conference multi-terminal collaboration method can be executed, which comprises steps of:

S1: inputting the recording content of the camera 50 via the camera input terminal 24 of the receiving device 20 from the camera 50;

S2: wirelessly transmitting the corresponding data of the recording content by the wireless transceiver module 21 of the receiving device 20;

S3: receiving the data transmitted by the wireless transceiver module 21 and uploading the recording content as a real-time capture image of the corresponding remote conference;

S4: encoding and processing the audio-visual signal of the remote conference to generate the data information and transmitting the data information wirelessly; and S5: inputting the data information by the wireless transceiver module 21 of the receiving device 20, decoding the data information by the decoding module 22 of the receiving device 20 to obtain the audio-visual signal corresponding to the data information, transmitting the audio-visual signal outputted from the decoding module 22 at the audio-visual signal output terminal 23 of the receiving device 20 to the display terminal 40, and displaying the remote conference on the display terminal 40.

Further, before the step S2, the receiving terminal encoding module 25 of the receiving device 20 encodes the recording content and generates the recording information, wherein in the step S2, the wireless transceiver module 21 wirelessly transmits the data information.

Further, the step S3 comprises steps of:

S31: receiving the recording information by the communication module 13 of the transmission device 10;

S32: decoding the recording information received from the communication module 13 by the encoding module 12 of the transmission device 10 to obtain the recording content corresponding to the recording information;

S33: transmitting the recording content by the audio-visual signal transmission terminal 11 of the transmission device 10 to the network terminal 30; and S34: running a remote conference program by the network terminal 30, inputting the corresponding remote conference based on the remote conference program, and inputting the recording content from the transmission device 10, and using the recording content as a real-time capture image uploading to the remote conference program.

Further, the step S4 comprises steps of:

S41: inputting the audio-visual signal of the network terminal 30 by the audio-visual signal transmission terminal 11 of the transmission device 10 from the network terminal 30;

S42: encoding and processing the audio-visual signal inputted through the audio-visual signal transmission terminal 11 by the encoding module 12 to generate the data information; and S43: transmitting the data information by the communication module 13 in a wireless manner.

In particular, in one embodiment, the remote conference can be logged in through a mobile terminal 70, wherein, specifically, the step S3 comprises steps of:

S31': receiving the recording information by the mobile terminal 70 from the receiving device 20 based on the mobile terminal's 70 own projection protocol;

S32': decoding and processing the recording information by the mobile terminal 70 to obtain the recording content corresponding to the recording information; and S33': operating a remote conference program in the mobile terminal 70, inputting the corresponding remote conference based on the remote conference program, and using the recording content as a real-time capture image uploading to the remote conference program.

In addition, the conference multi-terminal collaboration method further comprises steps of:

S6: inputting the audio-visual signal of the presentation terminal 60 by the audio-visual signal transmission terminal 11 of another transmission device 10 from the presentation terminal 60, coding and processing the audio-visual signal inputted through the audio-visual signal transmission terminal 11 by the encoding module 12 of the another transmission device 10 to generate the data information, and transmitting the data information by the communication module 13 of the another transmission device 10 in a wireless manner; and S7: inputting the data information from the communication module 13 of the another transmission device 10 by the wireless transceiver module 21 of the receiving device 20, decoding the data information received from the wireless transceiver module 21 by the decoding module 22 to obtain the audio-visual signal of the presentation terminal 60 corresponding to the data information, transmitting the audio-visual signal of the network terminal 30 and the audio-visual signal of the presentation terminal 60 to the display terminal 40 by the audio-visual transmission terminal 23, and displaying the corresponding remote conference and the presentation content on the display terminal 40 at the same time.

Further, the step S6 further comprises steps of: when the control module 14 of the transmission device 10 is operated once, beginning to encode the audio-visual signal by the encoding module 12, and when the control module 14 is operated again, switching back the encoding module 12 to a dormant state and stopping encoding.

Further, the conference multi-terminal collaboration method further comprises steps of:

S8: encoding and processing the corresponding audio-visual signal by the mobile terminal 70 which is connected with wireless transceiver module 21 of the receiving device to generate the corresponding data information, and wirelessly transmitting the corresponding data information to the wireless transceiver module 21; and S9: decoding the data information received by the wireless transceiver module 21 by the decoding module 22 of the receiving device 20 to obtain the audio-visual signal of the mobile terminal 70 corresponding to the data information, and transmitting the audio-visual signal of the presentation terminal 60 and the audio-visual signal of the mobile terminal 70 to the display terminal 40, displaying both the corresponding remote conference and the presentation content in the display terminal simultaneously.

In one embodiment, in the step S9, the number of the display terminal 40 is two and the number of the audio-visual signal output terminal 23 of the receiving device 20 is two, wherein the receiving device 20 transmits the audio-visual signal of the network terminal 30 to one of the display terminals 40, and transmits the audio-visual signal of the presentation terminal 60 and/or the audio-visual signal of the mobile terminal 70 to the other display terminal 40.

In one embodiment, in the step S9, the number of the display terminal 40 is two and the number of the audio-visual signal output terminal 23 of the receiving device 20 is two, wherein the receiving device 20 transmits the audio-visual signal of the presentation terminal 60 to one of the display terminals 40, and transmits the audio-visual signal of the mobile terminal 70 to the other display terminal 40.

It is worth mentioning that a smart device such as a smart phone or tablet may be programmed by means of installing a specific APP to function as the network terminal 30 or the transmission device 10 to connect with the network terminal 30 or the presentation terminal 60 and pair with the receiving device 20 wirelessly. It should be considered as within the scope of the present invention.

In order to illustrate the distinctive features and advantageous of the present invention, various applications of the multi-terminal conference system of the present invention are illustrated as follows accompanying with FIG. 12 to FIG. 38 of the drawings.

Figure 12:
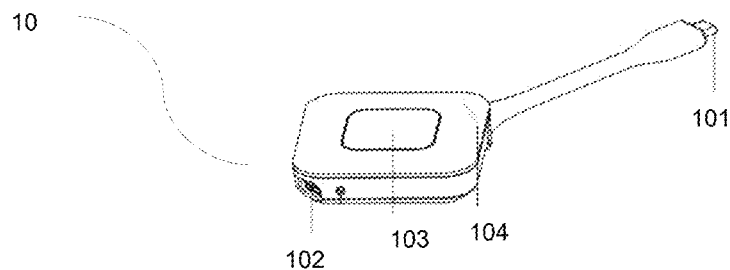
FIG. 12 is a perspective view of the transmission device of the multi-terminal conference system according to the above preferred embodiment of the present invention.

Referring to FIG. 12, according to the preferred embodiment, the transmission device 10 is embodied to have a first port 101 configured for connecting to video sources such as computer, laptop, notebook, smart device, and the like that support Type-C DP, a second port 102, such as Type-C port, configured for connecting to external power adapter to supply power to the video source, a control switch 103 which is a button for controlling and switching between functions, for example, by single click for casting/stop casing to the display terminal 40, long pressing for a predetermined period of time such as 3 seconds for splitting screen on the display terminal 40, and double click for casting to another display terminal 40, and a transmitter indicator 104, such as LED lights, configured for indicating the current status and the detailed status such as "transmitter is booting on", "searching for receiver", "waiting for connection", "connected and start to presenting", "no video input", and etc. with different indicating light colors.

Figure 13A:
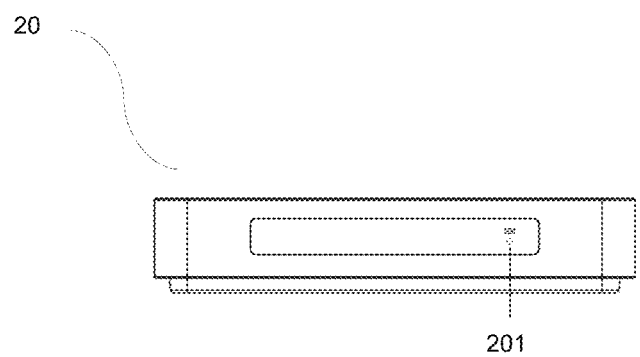
FIG. 13A is a front view of the receiving device of the multi-terminal conference system according to the above preferred embodiment of the present invention.
Figure 13B:
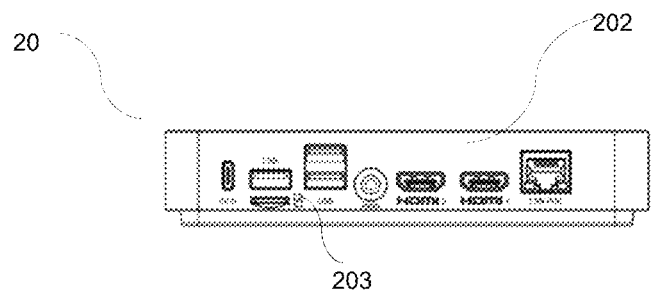
FIG. 13B is a rear view of the receiving device of the multi-terminal conference system according to the above preferred embodiment of the present invention.
Figure 13C:
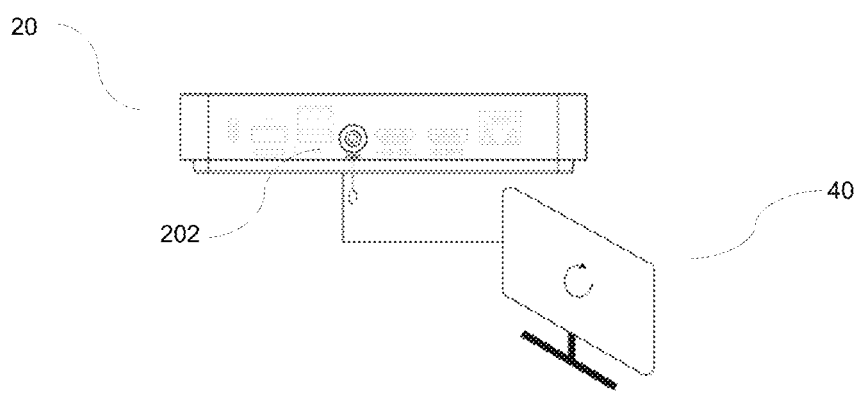
FIG. 13C is a schematic view illustrating the connecting of the receiving device and the display terminal according to the above preferred embodiment of the present invention.

The receiving device 20 is embodied to provide a receiver indicator 201 configured on a front side thereof, as shown in FIG. 13A, for illustrating status of the receiving device 20, including but not limited to "waiting for connection" and "connected", a plurality of outlet ports 202, as shown in FIG. 13B, such as DC 5V port, USB ports, TF card port, HDMI ports, LAN POE port, and a reset button 203 on a rear side thereof. Referring to FIG. 5 and FIGS. 13A-13C, the receiving device 40 is configured to connect with one or more speakers via an audio port 202 and the display terminal 40 via a video port 202.

Figure 14:
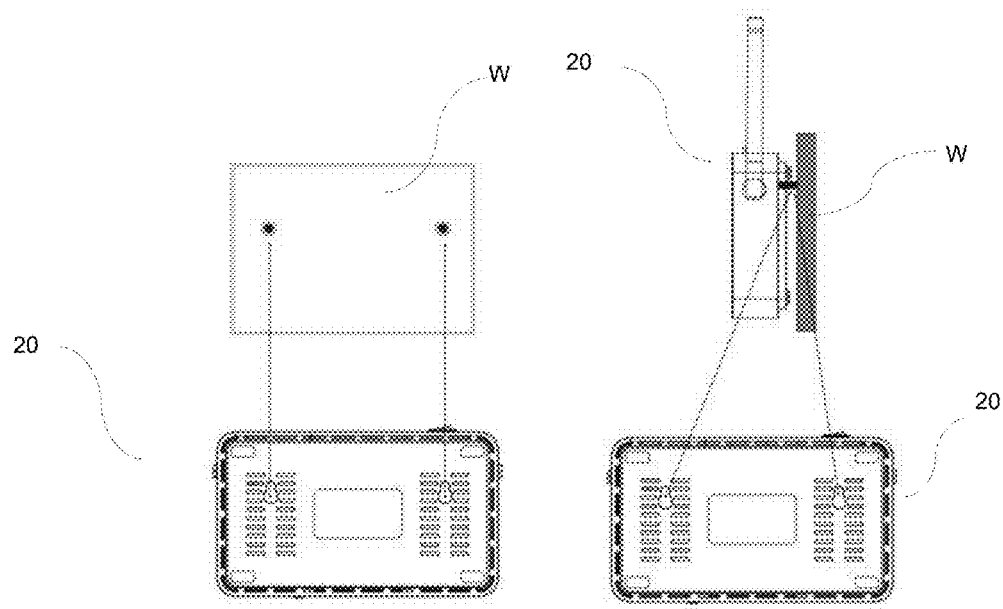
FIG. 14 is a schematic view illustrating the mounting of the receiving device to a wall according to the above preferred embodiment of the present invention.
Figure 15:
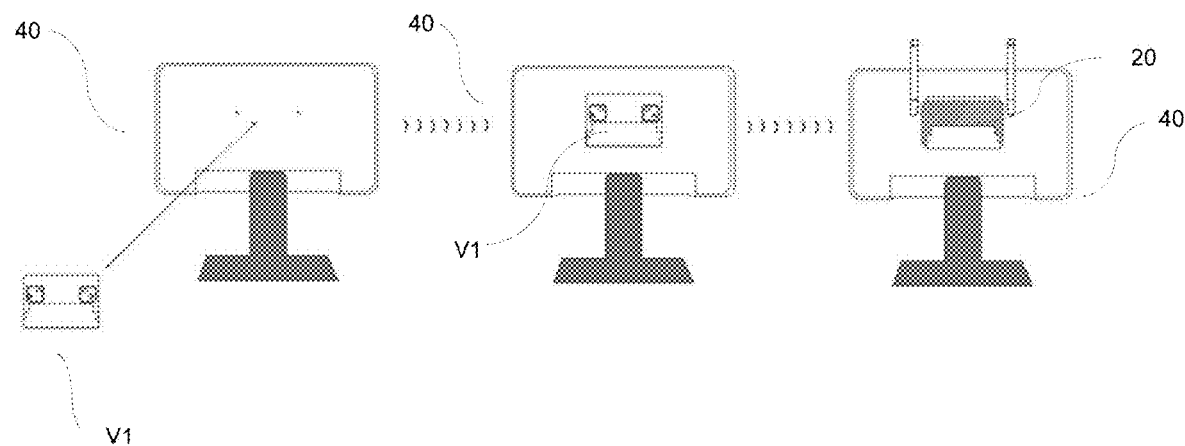
FIG. 15 is a schematic view illustrating steps of attaching the receiving device to the display terminal according to the above preferred embodiment of the present invention.

Referring to FIG. 14, the receiving device 20 is adapted to be placed on a desktop or mounted on a wall W using the wall-mount holes formed in the back of the receiving device 20. Alternatively, referring to FIG. 15, the receiving device 20 can also be used a VESA mount V1 to attach securely to a back of the display terminal 40.

Figure 16:
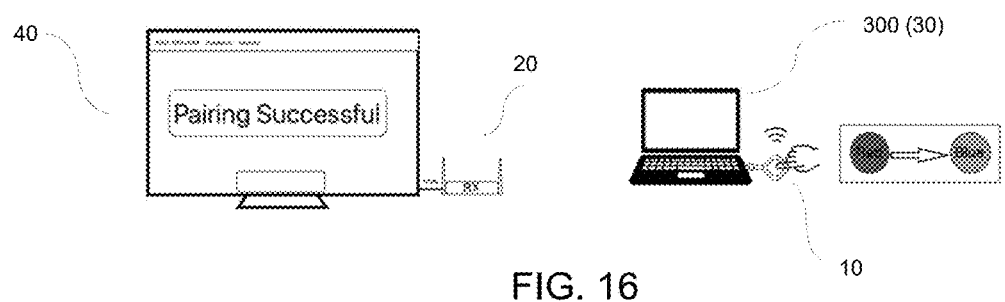
FIG. 16 is a schematic view illustrating the pairing of the transmission device and the receiving device of the multi-terminal conference system according to the above preferred embodiment of the present invention.

The installation of the multi-terminal conference system of the present invention is as simple as connecting the personal conference device 300 embodied as the network terminal 30 to run the remote conference program of each of the conference participants with the transmission device 10, referring to FIG. 16, and connecting the display terminal 40 with the receiving device 20. Generally, the receiving device 20 is arranged to be factory pre-paired with one or more transmission devices 10, so that the conference participants have not need to pair them again. When new transmission device 10 is purchased and used, the user can pair the new transmission device 10 with the receiving device 20 anytime before use, wherein once the transmission device 10 is properly paired with the receiving device 20, the transmitter indicator 104 turned from red color to blue color and a notice of "Pairing Successful" may appear on the display terminal 40 according to the preferred embodiment as shown in FIG. 16.

Figure 17:
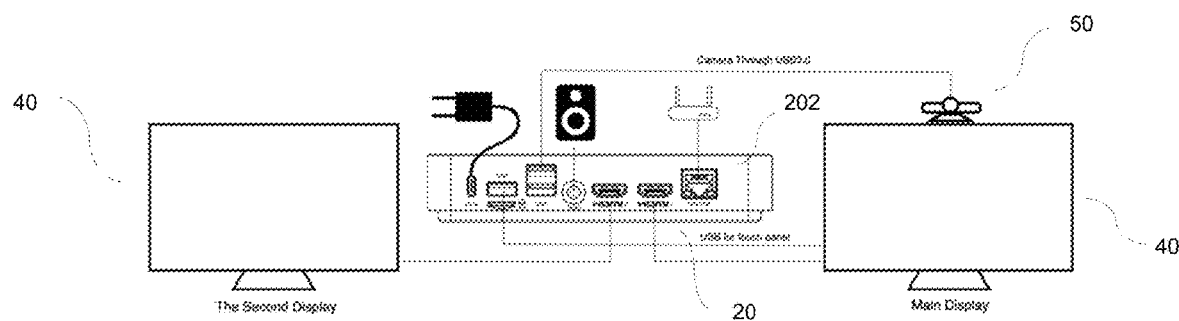
FIG. 17 is a schematic view illustrating the connection of the camera with the display terminals and the receiving device of the multi-terminal conference system according to the above preferred embodiment of the present invention.

Referring to FIG. 17, the camera 50 of the conference room is arranged to connect with the receiving device 20 via the video port 202 thereof so as to connect with the first and second display terminals 40 via the receiving device 20 through, for example, the HDMI ports 202.

Figure 18:
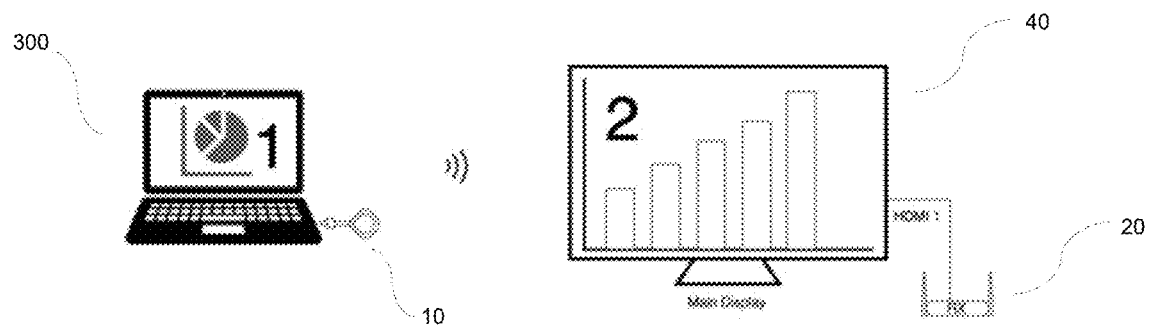
FIG. 18 is a schematic view illustrating an extended desktop feature of the multi-terminal conference system according to the above preferred embodiment of the present invention.

Referring to FIG. 18, the multi-terminal conference system of the present invention is arranged to have an extended desktop feature which allow the user to maximize the utility of both the screen of the computer 300 and the large screen of the display terminal 40 in the conference room. By using this setup, each conference participant can keep his or her presentation notes or other materials on the primary screen of his or her computer 300, ensuring the presentation notes or other materials remain private and are not visible to the audience. This is particularly useful when you need to take notes or reference additional information while simultaneously sharing different content with other conference participants. The extended desktop functionality enhances the ability for the user to manage and present information efficiently, providing a seamless and professional experience during meetings or conferences. The participant user may simply open the Display settings window of his or her computer, scroll down to a "Multiple Displays" section and select "Extend these displays" and then the user is allowed to use both the large screen of the display terminal 40 and the screen of his or her personal computer 300 as one extended desktop.

Figure 19:
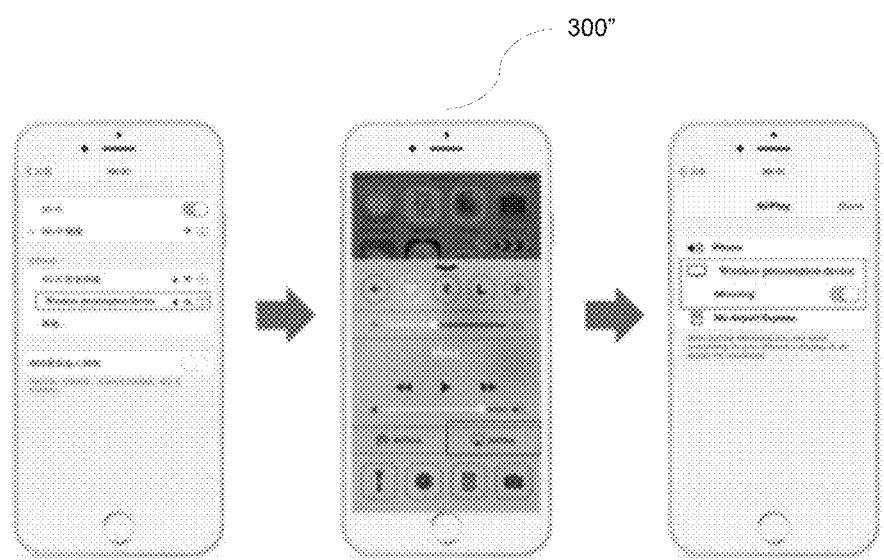
FIG. 19 is a schematic view illustrating steps of setting AirPlay function of the multi-terminal conference system according to the above preferred embodiment of the present invention.

Referring to FIG. 19, AirPlay is a technology developed by Apple Inc., which allows users to wirelessly stream media from their iOS device or computer to an Apple TV, speaker system, or another compatible receiver within the same local Wi-Fi network. The multi-terminal conference system according to the above preferred embodiment supports AirPlay mirroring for a wide range of Apple devices, ensuring seamless integration and a superior user experience. The supported devices include: iPhone; Macbook, iPads. The process of using AirPlay includes:
  connecting an iOS device as the network terminal 30 to the Receiver SSID, which is displayed in the upper corner of the screen of the iOS device, wherein if the receiver is already connected to your office network and the iOS device is on the same network, the user does not need to connect to the receiver SSID; and
  opening the AirPlay function on the iOS device and select the receiver SSID from the list, wherein the screen will then stream to the receiver.

It should be noted that if the iOS device is an older iOS device, the user can improve AirPlay performance by adjusting the video quality settings. Navigate to Settings>Advanced Setup>iPhone Video Quality and select Middle. This adjustment can enhance the smoothness of the AirPlay experience. Also, when connecting an iOS device to the transmission device 10, if the receiver is not connected to the internet, the iOS device will also be unable to access the internet. To ensure the iOS device can access the internet, the receiver must be connected to the network by connecting it to the conference room's router via an Ethernet cable in advance.

Alternatively, Miracast, which is an industry wireless display technology established by the Wi-Fi alliance, allows the user participant to share his or her screen content of his or her personal device, such as personal computer, tablet, smartphone, laptop, TV, set-top box, gaming console, smart watch, and etc. The multi-terminal conference system according to the above preferred embodiment of the present invention is also arranged to support Miracast mirroring for a wide range of devices, ensuring seamless integration and a superior user experience. The supported devices include android phone, android tablet, or some windows PC which support Miracast.

Figure 20:
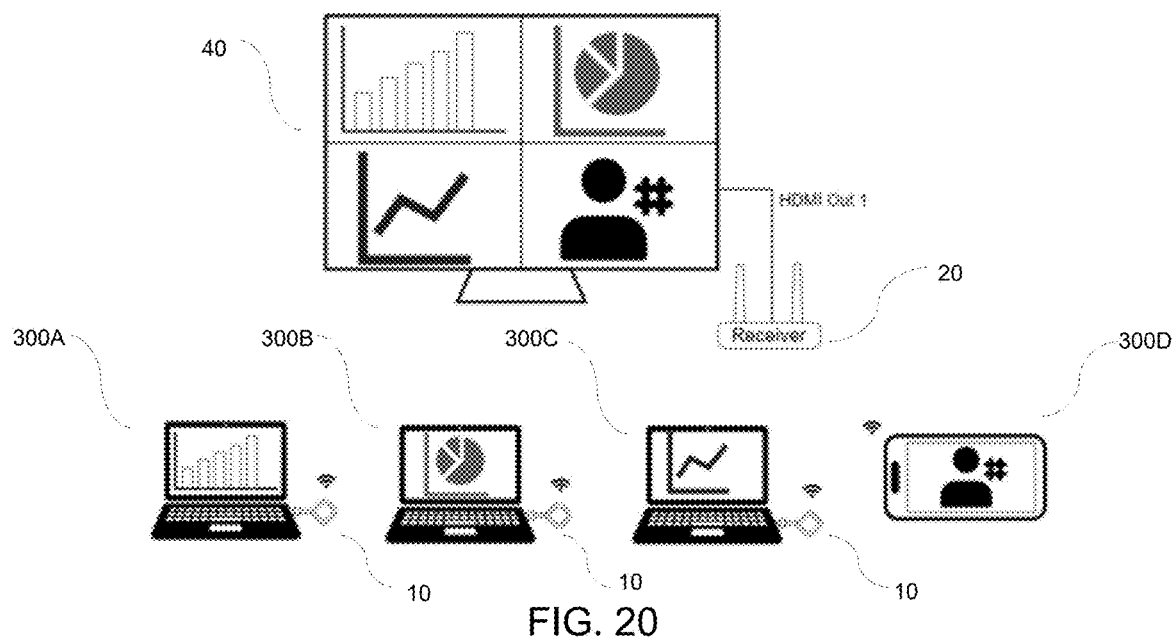
FIG. 20 is a schematic view illustrating the multi-screen split mode of the multi-terminal conference system according to the above preferred embodiment of the present invention.

Referring to FIG. 20, the multi-terminal conference system according to the above preferred embodiment of the present invention provides a multi-screen split mode which allows one or more screens of the personal computers or smart devices 300A, 300B, 300C, 300D to be projected onto a single display such as the screen of the display terminal 40 in a split-screen format so as to enable the conference participants to compare multiple contents on the same screen and enhancing team collaboration and increasing conference efficiency.

In particular, to activate the multi-screen split mode of the multi-terminal conference system for the corresponding transmission devices 10 to be shared, simply pressing and holding the control switch 103 of each of the transmission devices 10 for a predetermined period of time, such as 2 seconds, the multi-screen split mode thereof is activated. In multi-screen split mode, the screens of the devices 300A, 300B, 300C, 300D connected with the activated transmission devices 10 will be displayed in divided windows on the screen of the display terminal 40. For iOS device 300D, in the multi-screen split mode, the iOS devices 300D and the receiving device 20 must be ensured to be connected in the same subnet, wherein by clicking the Airplay, multiple screens can be cast and split to the large screen of the display terminal 40 automatically.

Figure 21:
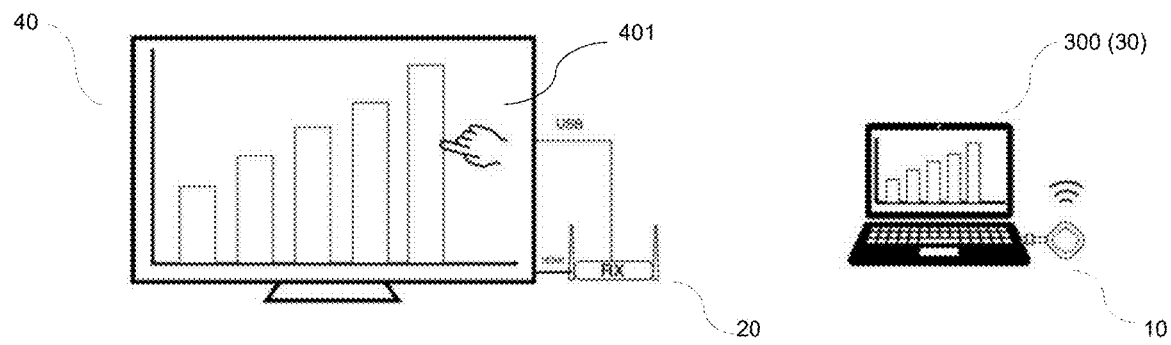
FIG. 21 is a schematic view illustrating the touch panel back control setup of the multi-terminal conference system according to the above preferred embodiment of the present invention.

Referring to FIG. 21, the multi-terminal conference system according to the above preferred embodiment of the present invention is arranged to support a touch panel back control function when the screen of the display terminal 40 is a touch panel 401, wherein the user can touch the large screen 401 to control the personal device 300 easily. eliminating the need for a mouse or clicker. The user can manage data with his or her finger or a specified stylus, ensuring that technical limitations no longer disrupt your meeting flow. With a simple tap, the user can switch slides, open presentations, share emails, or start videos. The user can also access blackboarding or annotation functionalities with ease.

To activate the touch back control function, simply execute the following steps:
  connecting the receiving device 20 to the display terminal 40 with the touch panel 401, and attaching the USB cable (for touch functionality) between the receiving device 20 and the display terminal 40;
  navigating to Settings>Advanced Settings and setting Touch Control to On;
  connecting the transmission device 10 to the personal device 300; and
  clicking and/or touching the touch panel 401 to control the personal device 300.

It is worth mentioning that in the Settings, when mouse or camera mode is selected, the multi-terminal conference system according to the above preferred embodiment of the present invention also supports mouse and camera modes.

Figure 22:
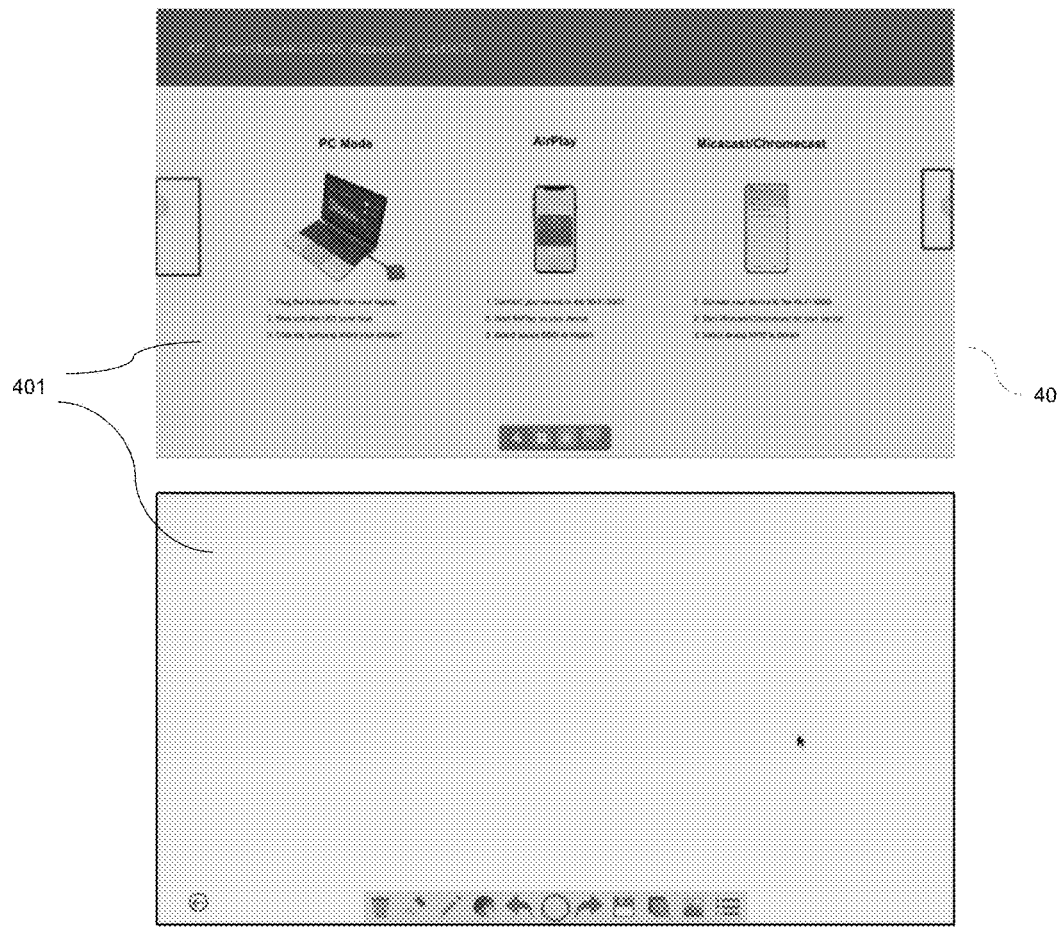
FIG. 22 is a schematic view illustrating a whiteboard and annotation function of the multi-terminal conference system according to the above preferred embodiment of the present invention.

Referring to FIG. 22, the multi-terminal conference system according to the above preferred embodiment of the present invention is arranged to support a whiteboard and annotation function by setting in a whiteboard mode, which provides users with the ability to write and draw freely on a touchscreen 401 of the display terminal 40, significantly enhancing productivity. This feature transforms the screen 401 of the display terminal 40 into a dynamic canvas, allowing for spontaneous brainstorming, idea mapping, and visual communication. By facilitating real-time annotations and illustrations, it supports more interactive and engaging presentations, making it an invaluable tool for collaborative environments and creative sessions. It supports instantly edit, draw and write on the large screen with touch panel 401 of the display terminal 40.

To activate the whiteboard and annotation function, the user may simply execute the following steps:
  clicking a White board icon from a main SmartShare Dual screen on the display terminal 40 connected to the receiving device 20 of the multi-terminal conference system on the main page to enter the white board function; and
  locating the white board function at a left side of the main menu and clicking a pen icon to enter to white board mode. Then, the user can write, draw, edit on the screen 401 of the display terminal 40.

Figure 23:
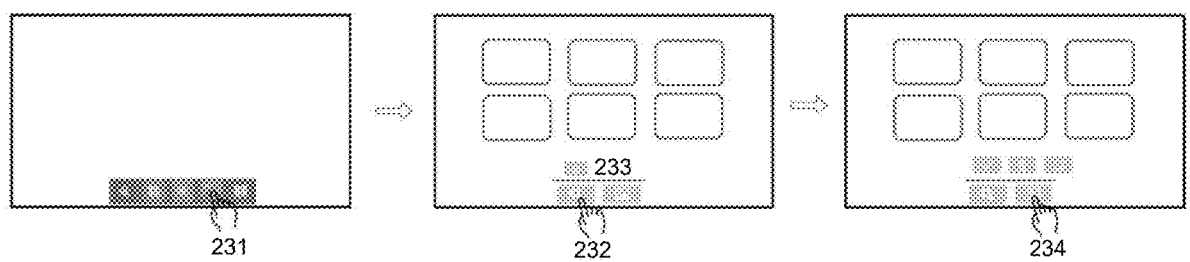
FIG. 23 is a schematic view illustrating the user-customized desktop setup of the multi-terminal conference system according to the above preferred embodiment of the present invention.

Referring to FIG. 23, the multi-terminal conference system offers the users a flexibility to customize their desktop, allowing you to easily replace the default background with their preferred image, to meet individual preferences and workflow needs. By allowing personalization, the multi-terminal conference system supports a more intuitive user experience. To change the desktop image, the user may execute the following steps:
  saving desired images to a USB drive or TF card;
  inserting the USB drive or TF card into the receiving device 20;
  clicking on a corresponding icon 231 in the taskbar and selecting the scan option icon 232;
  displaying all images by the receiving device 20 from the USB drive or TF card on the screen;
  selecting a particular image of the all images the user wishes to use and clicking a download icon 233 to download the selected images to the receiving device 20;
  clicking on a view icon 234 to view all downloaded images in a folder; and
  choosing a preferred image form the downloaded images, that will automatically be set as the desktop background, wherein the user can also delete the image, or press the reset button to restore the default background settings.

Figure 24A:
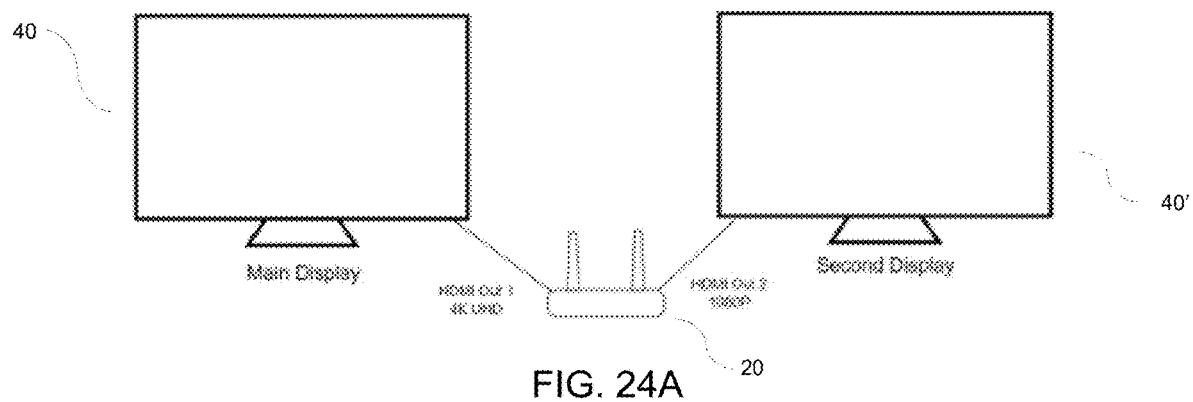
FIG. 24A to FIG. 24C are schematic views illustrating a dual screen mode of the multi-terminal conference system according to the above preferred embodiment of the present invention.
Figure 24B:
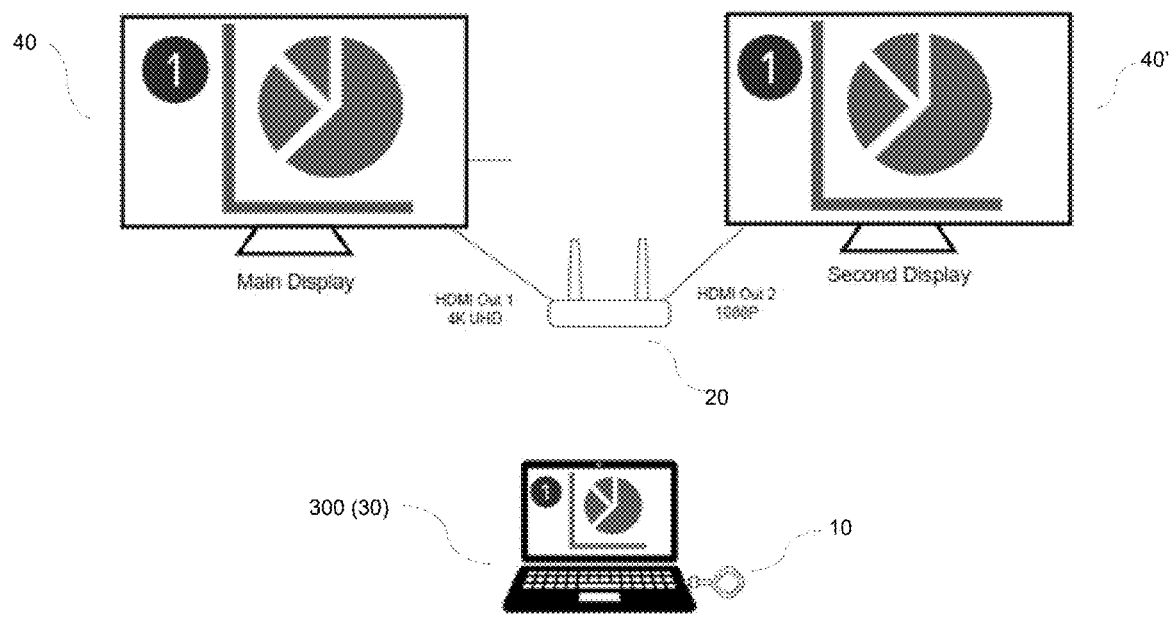
Figure 24C:
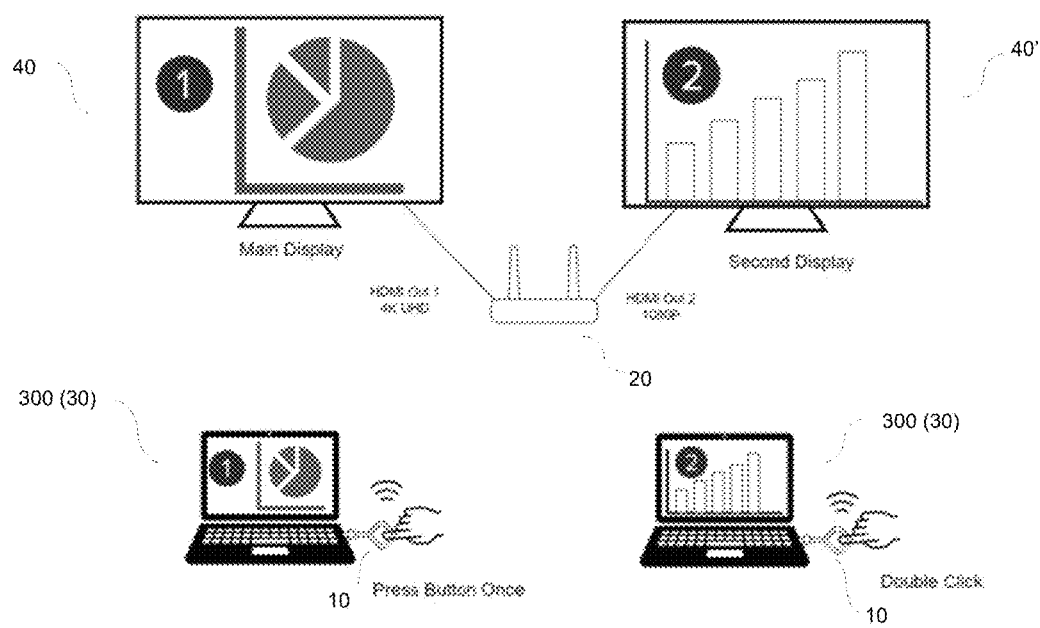

Referring to FIG. 24A to FIG. 24C, the multi-terminal conference system according to the above preferred embodiment of the present invention is arranged to support both dual-screen extended display and dual-screen mirroring mode, wherein in the dual-screen extended mode, two screens of two display terminals 40, 40' display different content, in the dual-screen mirroring mode, two screens of two display terminals 40, 40' display the same content. By default, the receiving device 20 outputs in dual-screen mirroring mode while each of the conference participants may switch to dual-screen extended mode using the control switch 103 of the transmission device 10 connected to his or her personal device 300.

Referring to FIG. 24A, according to the preferred embodiment of the present invention, the first setup step is to connect the receiving device 20 to a HDMI 1 port (e.g. supporting a resolution of up to 4K at 60 Hz) of a first display terminal 40 as a primary screen and to a HDMI 2 port (e.g. supporting a maximum resolution of 1080P at 60 Hz) of a second display terminal 40' as a secondary screen.

Referring to FIG. 24B, the second setup step includes connecting the transmission device 10 to the personal device 300 such as a notebook computer, and shot pressing the control switch 103 of the transmission device 10 to enter the default dual-screen mirroring mode, wherein the display content on the screen of the personal device 300 displays on both the primary screen of the first display terminal 40 and the secondary screen of the second display terminal 40'.

Referring to FIG. 24C, the third setup step of switching to the dual-screen extended mode includes double-clicking a control switch 103 of another transmission device 10 connected to a second personal device 300 to activate the screen of the second personal device 300 is transmit a second display content thereof, such that the display content of the screen of the first personal device 300 is transmitted to display on the primary screen of the first display terminal 40 and the second display content of on the screen of the second personal device 300 is displayed on the secondary screen of the second display terminal 40'.

Figure 25A:
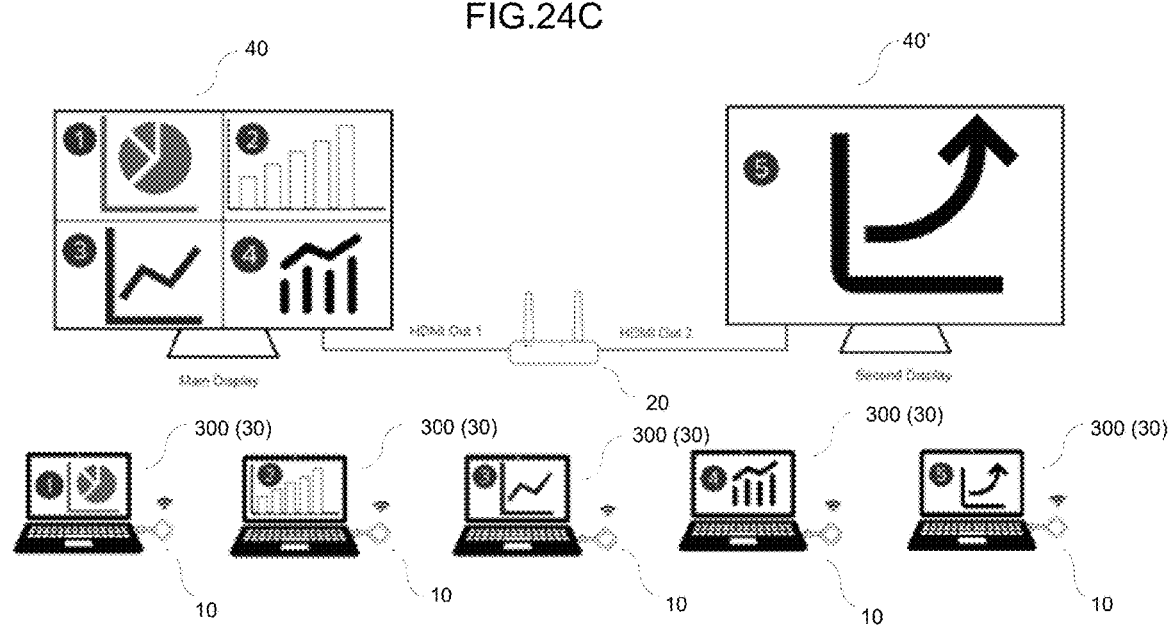
FIG. 25A is a schematic view illustrating the application of dual screen extended mode and the multi-screen split mode of the multi-terminal conference system according to the above preferred embodiment of the present invention.

Referring to FIG. 25A, it is worth noting that if the user has multiple transmission devices 10, the user may choose to split the primary screen of the first display terminal 40 among, for example, one to four transmission devices 10, and select a fifth transmission device 10 to cast to the secondary screen of the second display terminal 40'. In other words, both the dual screen extended mode and the multi-screen split mode of the multi-terminal conference system are applied.

Figure 25B:
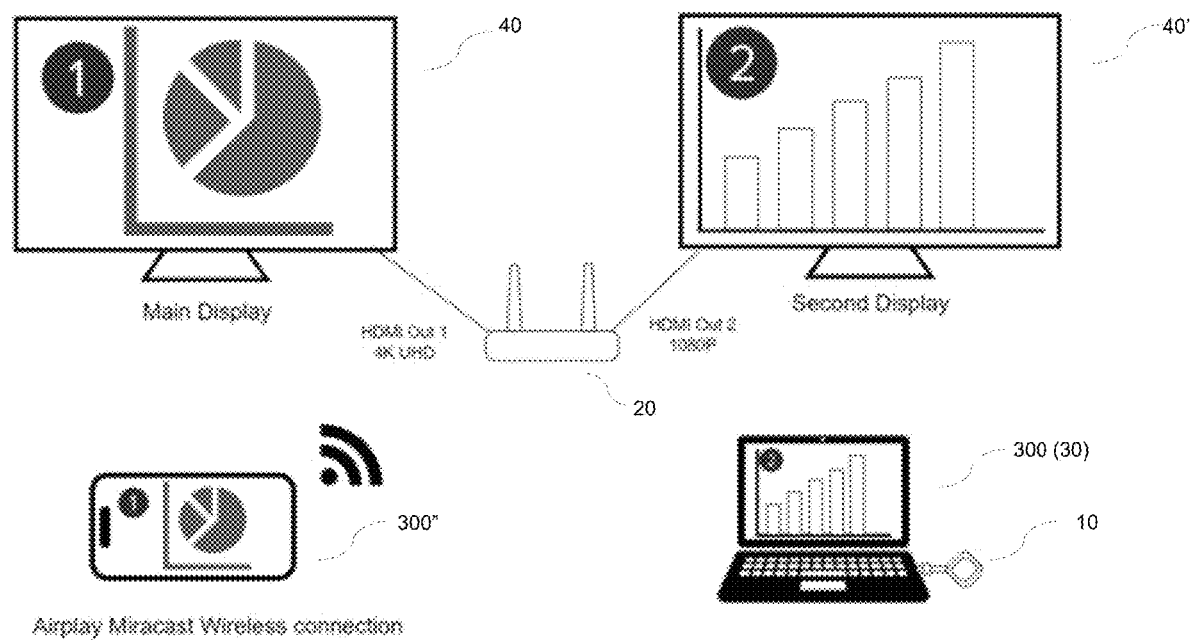
FIG. 25B is a schematic view illustrating the display of a smart device and a personal device connected with the transmission device on two screens of two display terminals respectively according to the preferred embodiment of the present invention.

Referring to FIG. 25B, when the user has one transmission device 10 connected to personal device 300 embodied as the network terminal 30, such as computer and a smart device 300" embodied as the mobile terminal 70, such as mobile phone or tablet, the user may use the dual-screen extended mode to display, for example, the first display content of smart device 300" on the primary screen of the first display terminal 40 and the second display content of the personal device 300 on secondary screen of the second display terminal 40'. When the secondary screen does not support screen splitting or mobile device casting, the transmission device 10 is preferred to cast to the second display terminal 40'.

The multi-terminal conference system of the present invention is a wireless presentation system that seamlessly integrates with third-party video conferencing programs or applications such as ZOOM and TEAMS, enabling remote participants to view and interact with content broadcasted in the display terminal 40 in the conference room via the multi-terminal conference system.

With support for dual-screen mode, the multi-terminal conference system allows video layouts and shared content to be displayed on two separate screens of two display terminals 40. Conference participants can view the gallery or speaker view on one screen of one display terminal 40 while displaying shared content on the other screen of another display terminal 40 or the personal device 300 of the conference participant. This is particularly useful for PowerPoint presentations, as it allows the presenter to conceal his or her notes from other conference participants.

The multi-terminal conference system achieves the above functionality wirelessly, and can also be plug and play, while does not need any software installation, providing a streamlined and efficient solution for modern conferencing needs. Also, the user can easily use video conference function when the receiving device 20 connect to a single screen of one display terminal 40 or dual screens of two display terminals 40.

Figure 26A:
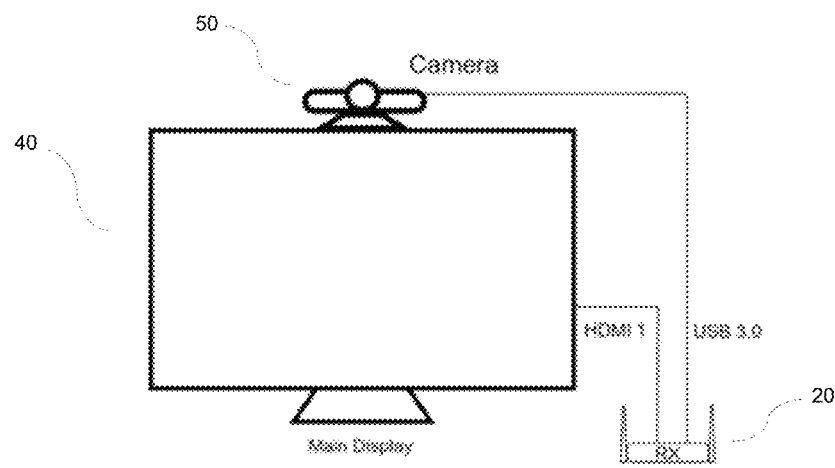
FIG. 26A to FIG. 26D are schematic views illustrating the use of one transmission device for video conference in a single display terminal with one camera according to the preferred embodiment of the present invention.

Referring to FIG. 26A to FIG. 26D, the multi-screen split mode of the multi-terminal conference system according to the above preferred embodiment of the present invention is configured to use one transmission device 10 for video conference in a single display terminal 40 with one camera 50. The operation includes the following steps:

Step 1: Setup the receiving device 20, connect the receiving device 20 to the main display terminal 40, attach the conference camera 50 to the USB 3.0 port 202 of the receiving device 20, as shown in FIG. 26A. For example, go to Settings>Advanced Settings and select camera mode (USB UVC).

Figure 26B:
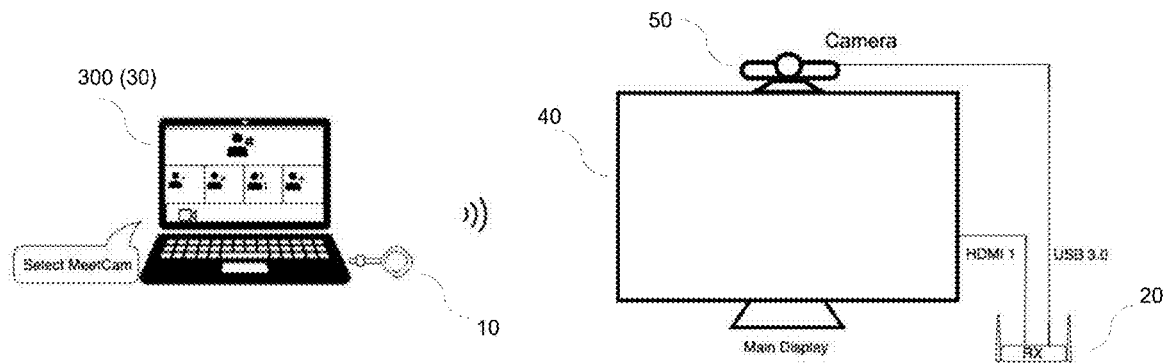
Figure 26C:
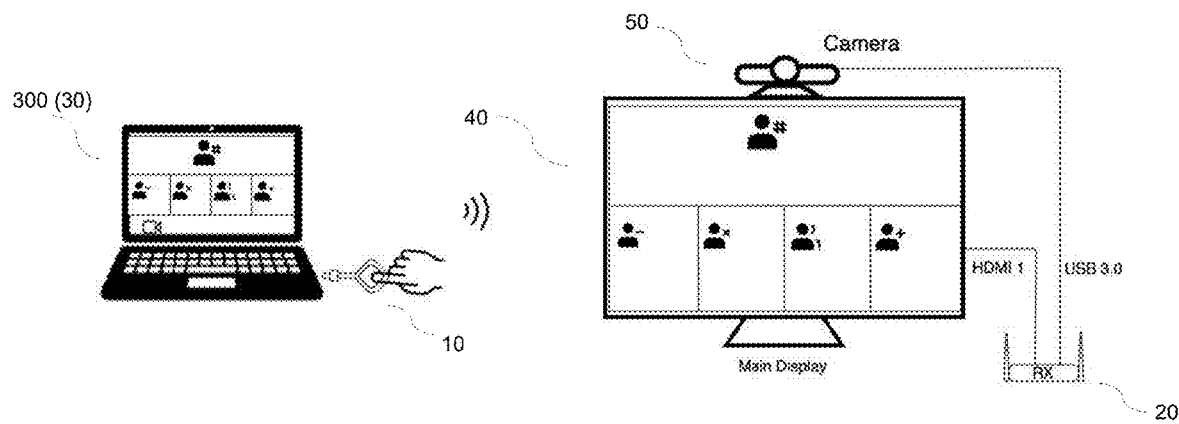

Step 2: Connect the transmission device 10 to each personal device 300 of each participant, launch the video conferencing software (e.g. ZOOM, TEAMS or the like) on the personal device 300, select the conference camera 50 (e.g. camera name: Meetcam) as the video input in the software, as shown in FIG. 26B. The participant should see the camera feed displayed within the software and join the conference or meeting, as shown in FIG. 26C. It is worth noting that if the conference camera 50 has a microphone, the user can choose to use it in the video conferencing program. Alternatively, the user can continue using one or more independent microphones or the microphone of the personal device 300 based on the preference of the users.

Step 3: Press the control switch 103 of the transmission device 20 to send the video conference feed back to the receiving device 10, displaying the content captured by the camera 50 on both the screen of the personal device 300 and the screen of the display terminal 40, as shown in FIG. 26C.

Figure 26D:
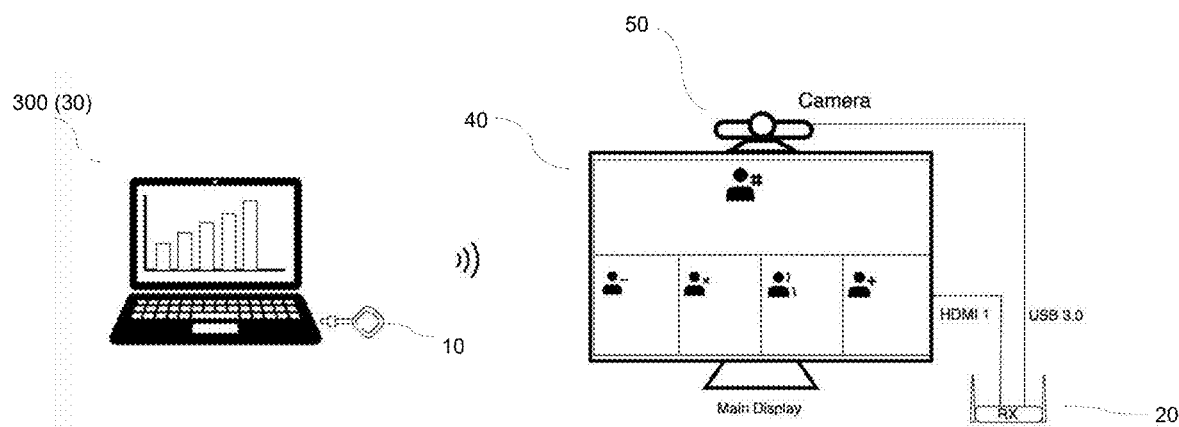

As shown in FIG. 26D, the user can utilize the extended desktop function to display the presentation content, such as presentation notes or other materials, on the screen of the presentation terminal 60, i.e. the personal device 300 of the participant who conducting a presentation while the video content captured by the conference camera 50 is displayed on the screen of the display terminal 40, ensuring each participant who conducts a presentation remains private and hidden from the other audience participants.

Figure 27A:
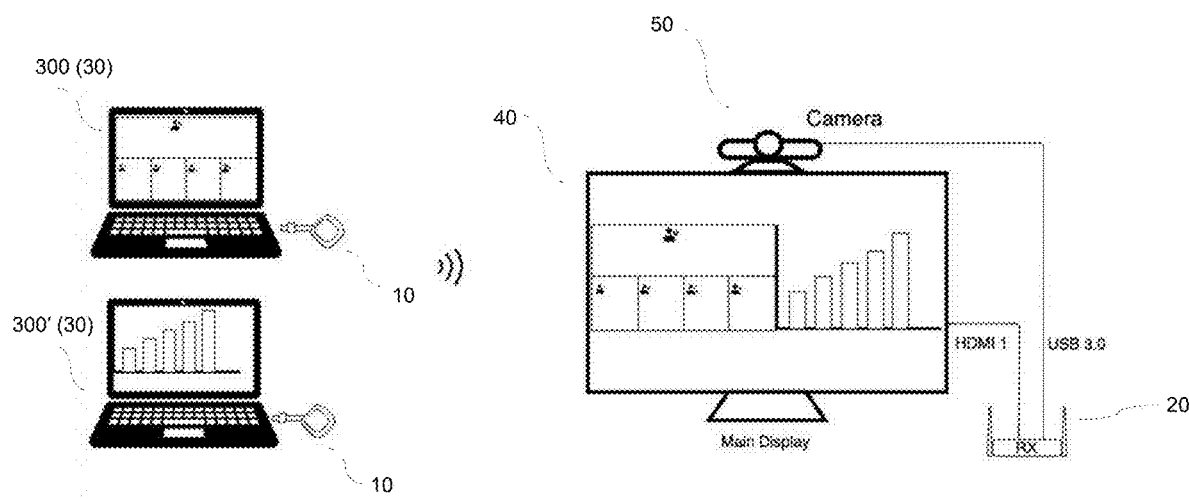
FIG. 27A and FIG. 27B are schematic views illustrating the use of at least two transmission devices for video conference in a single display terminal with one camera according to the preferred embodiment of the present invention.
Figure 27B:
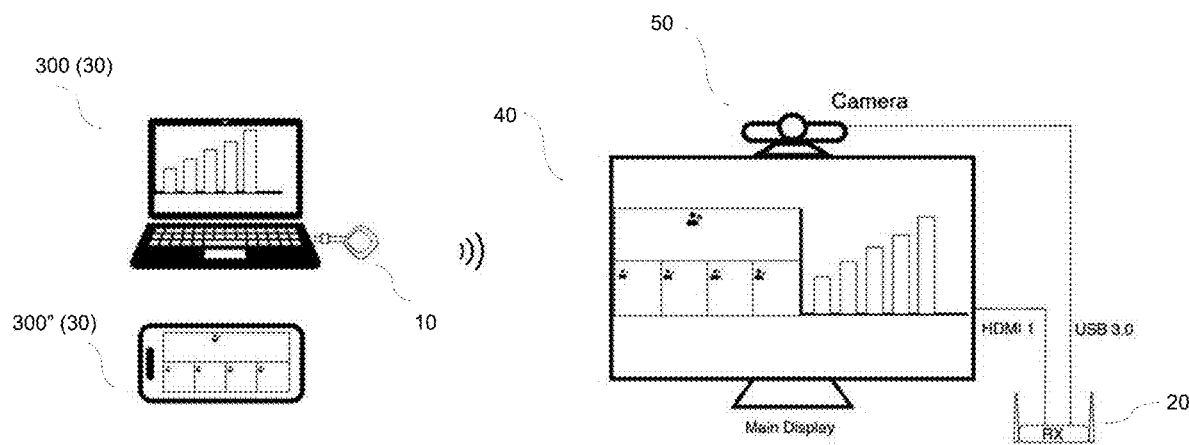

Referring to FIG. 27A to FIG. 27B, the multi-screen split mode of the multi-terminal conference system according to the above preferred embodiment of the present invention is configured to use at least two transmission devices 10 for video conference in a single display terminal 40 with one camera 50, such that the user can display both the video content captured by the conference camera 50 on the screen of one personal device connected to one transmission device 10 and the presentation content, such as presentation notes or other materials, on the screen of another personal device 300 connected with another transmission device 10. The operation includes the following steps:

Step 1: Setup the receiving device 20, connect the receiving device 20 to the main display terminal 40, attach the conference camera 50 to the USB 3.0 port 202 of the receiving device 20, as shown in FIG. 26A. For example, go to Settings>Advanced Settings and select camera mode (USB UVC).

Step 2: Connect a first transmission device 10 to a first personal device 300 and a second transmission device 10' to a second personal device 300', launch the video conference software (e.g. ZOOM, TEAMS or the like)

on the personal devices 300, 300', select the conference camera 50 as the video input in the software on each of the personal devices 300, 300', as shown in FIG. 27A, wherein the participant should see the video content captured by the conference camera 50 being feed displayed within the conference program of the personal devices 300 and be able to join the conference. On both personal devices 300, 300', choose one of the personal devices 300 to display the video content captured by the conference camera 50 and the other personal device 300' to display the shared content of the presentation presented by the participant.

Step 3: Selectively press the control switch 103 of either transmission devices 10 to cast the corresponding content displayed on the personal device 300, 300' connected with the corresponding transmission device 10 to display on the screen of the display terminal 40 or selectively long press the control switch 103 of either transmission devices 10 to cast both contents on the screens of the two personal devices 300, 300' onto the single screen of the display terminal 40 in multi-screen split mode.

Referring to FIG. 27B, if the participant has one personal device 300, such as personal computer, connected with one transmission device 10 and one smart device 300" embodied as the mobile terminal 80, such as a mobile phone, connect the transmission device 10 to the personal device 300 and launch the remote conference program, such as ZOOM, on the personal device 300 and select the conference camera 50 as the video input in the remote conference program on the personal device 300. Then the participant should see the video content captured by the conference camera 50 being fed displayed within the remote conference program and be able to join the conference.

Also, join the same remote conference on the smart device 300" as the mobile terminal 70, on the personal device 300 and the smart device 300", choose one of them to display the video content captured by the conference camera 50 and the other to display the shared content of the presentation terminal 60, that is the personal device 300 of the participant conducting the presentation. Similarly, long press the control switch 103 of the transmission device 10 connected to the personal device 300 to cast the content display on the screen of the personal device 300 onto the large screen of the display terminal 40 in multi-screen split mode while the participant may also cast the screen of the smart device 300" to the large screen of the display terminal 40 by using AirPlay or Chromecast.

It is worth mentioning that the users can opt to use the screen extension mode for video conferencing and touchback control is not supported in video conference mode. If the conference camera 50 has a microphone, the user can choose to use it in the video conferencing program. Alternatively, the user can use one or more independent microphones or the microphone of each of the personal devices 300 and smart devices 300' based on the preference of the users.

Referring to FIG. 28A to FIG. 29B, the multi-terminal conference system according to the above preferred embodiment of the present invention is configured to perform video conference in dual display terminals 40, which allows video content captured by the conference camera 50 and the shared content of the participant conducting the presentation to be displayed on two screens of two separate display terminals 40, 40' respectively. Accordingly, the conference participants in the conference room can view the gallery of all participants or the speaker view on one screen of one of the display terminals 40 and the shared content on the screen of another display terminal 40, which is particularly useful for PPT presentations and concealing notes from participants and can greatly improve the conference or meeting efficiency.

Figure 28A:
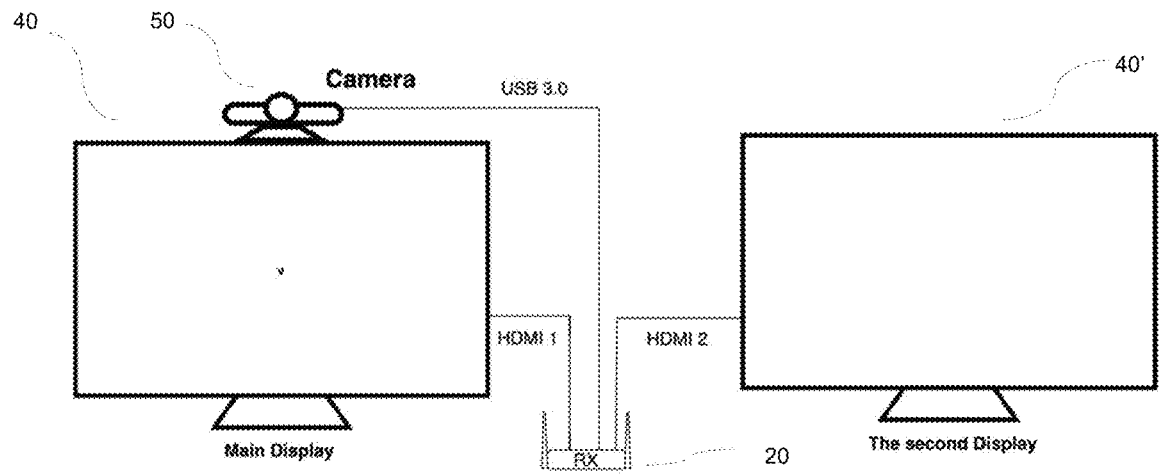
FIG. 28A to FIG. 28C are schematic views illustrating dual display functions of the multi-terminal conference system according to the above preferred embodiment of the present invention.
Figure 28B:
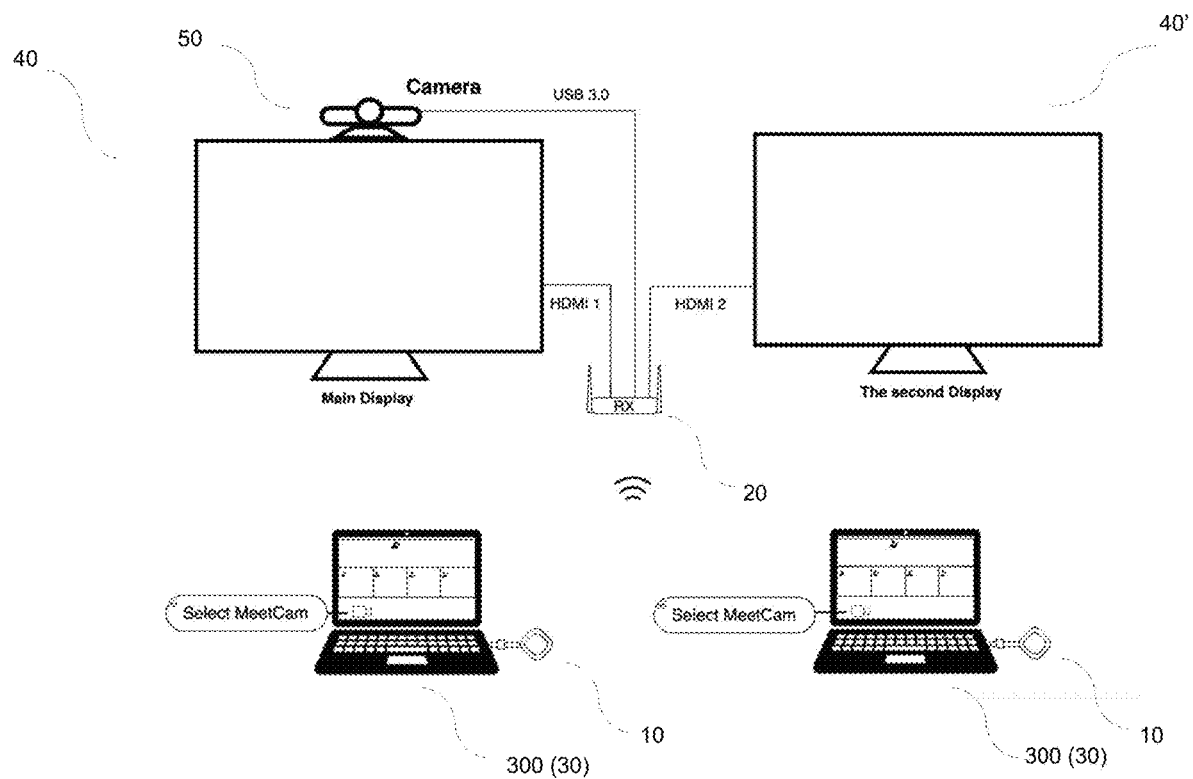
Figure 28C:
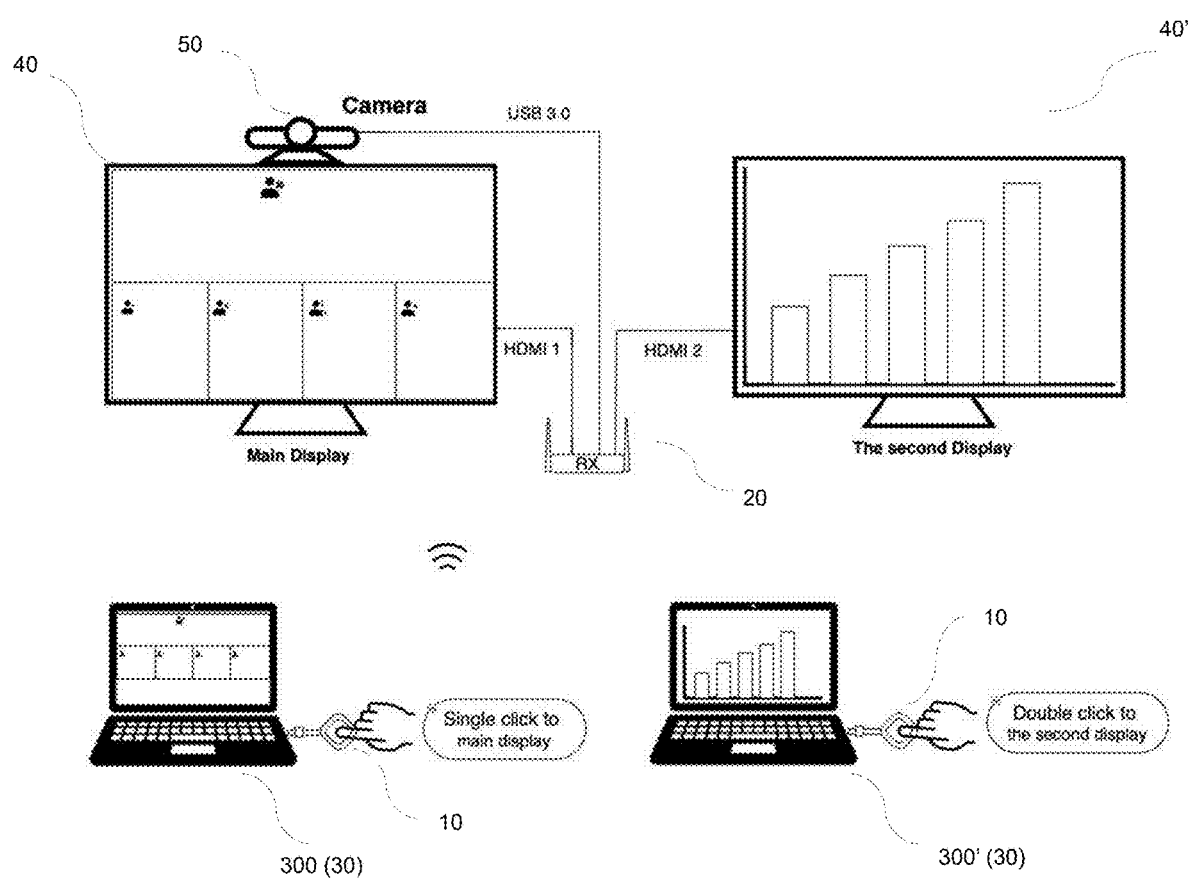

As shown in FIG. 28A to FIG. 28C, the above dual display function can be achieved by using two transmission devices 10 by the following steps:

Step 1: Setup the receiving device 20, connect the receiving device 20 to the main display terminal 40 and the second display terminal 40', connect the conference camera 50 to the receiving device 20 by attaching to a USB 3.0 port thereof, as shown in FIG. 28A. Then, go to Settings>Advanced Settings and select video conference mode (USB UVC).

Step 2: Connect one transmission device 10 to a first personal device 300 and another transmission device 10 to a second personal device 300', launch the remote conferencing program (e.g. ZOOM, TEAMS or the like) on both personal devices 300, such as notebook computer, select the conference camera 50 (for example camera name: Meetcam) as the video input in the remote conference program. Then, the participant should see the video content of the conference camera 50 being fed displayed within the remote conference program on both personal devices 300 and join the conference or meeting, as shown in FIG. 28B. Similarly, if the conference camera 50 has a microphone, the participant can choose to use it in the remote conferencing program. Alternatively, the user can also use an independent microphone or the microphone of the personal device 300 based on the preference of the users.

Step 3: Referring to FIG. 28C, configure outputs of the display contents by:
  on the two personal devices 300, choose one of the two personal devices 300 to display the video content captured by the conference camera 50 or provided by the remote conference program and the other personal device 300 as the presentation terminal 60 to display the shared content of the participant conducting the presentation;
  short-pressing the control switch 103 of one of the transmission devices 10 connected to the first personal device 300 to cast the display content of the screen of the first personal device 300 to feed to the primary screen of the main display terminal 40; and
  double-clicking the control switch 103 of other transmission device 10 connected to the second personal device 300' to cast the display content of the screen of the second personal device 300' to feed to the secondary screen of the second display terminal 40'.

Figure 29A:
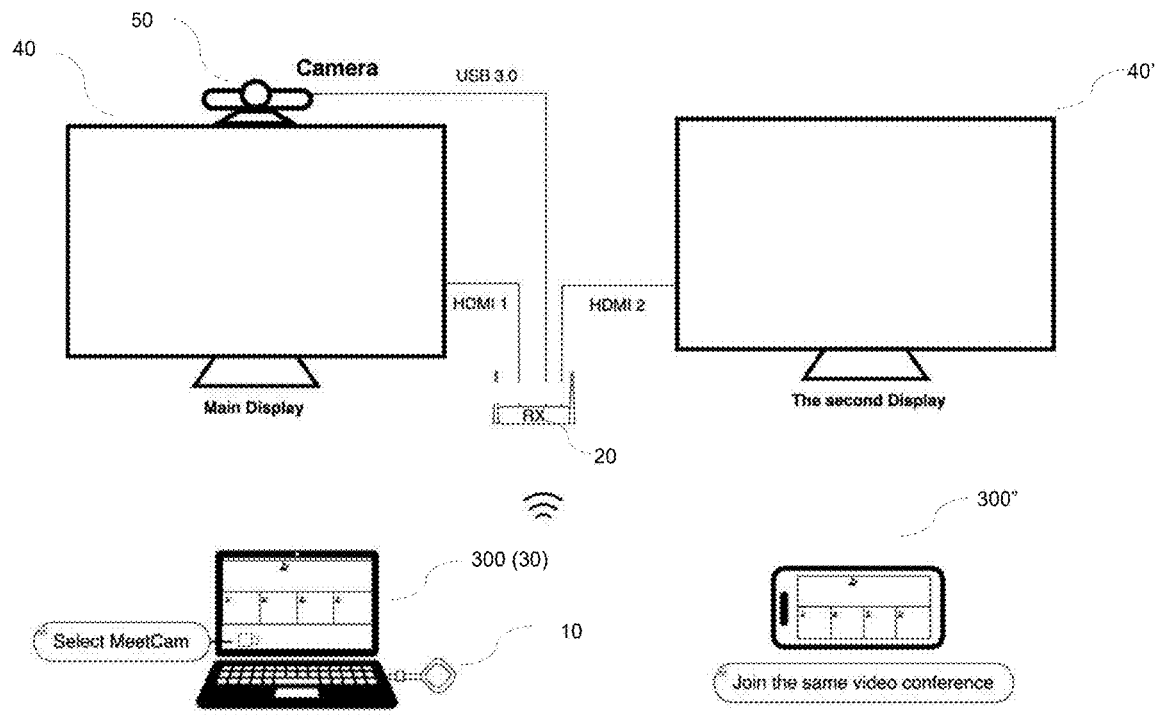
FIG. 29A to FIG. 29B are schematic views illustrating alternative du8al display functions of the multi-terminal conference system according to the above preferred embodiment of the present invention.

Referring to FIG. 29A, the above dual display function can be achieved by using one transmission device 10 and one smart device 300", which allow the video content captured by the conference camera 50 and the shared content of the participant conducting the presentation on two screens of two display terminals 40, 40', including the following steps:

Step 1: Setup the receiving device 20, connect the receiving device 20 to the main display terminal 40 and the second display terminal 40', connect the conference camera 50 to the receiving device 20 by attaching to a USB 3.0 port thereof, as shown in FIG. 28A. Then, go to Settings>Advanced Settings and select video conference mode (USB UVC).

Step 2: Connect the transmission device 10 to the personal device 300, launch the remote conferencing program (e.g. ZOOM, TEAMS or the like on the personal device 300, select the conference camera 50 (for example camera name: Meetcam) as the video input in the remote conference program. Then, the user should see the video content captured by the conference camera 50 being fed displayed within the remote conference program on both the personal device 300 and join the conference or meeting.

Step 3: Join the same remote conference on the smart device 300", such as a mobile phone or a tablet. It should be noted that if the conference camera has a microphone, the user can choose to use it in the remote conference program. Alternatively, the user can use an independent microphone or the microphone of the personal device 300 or the smart device 300" based on the preference of the users.

Figure 29B:
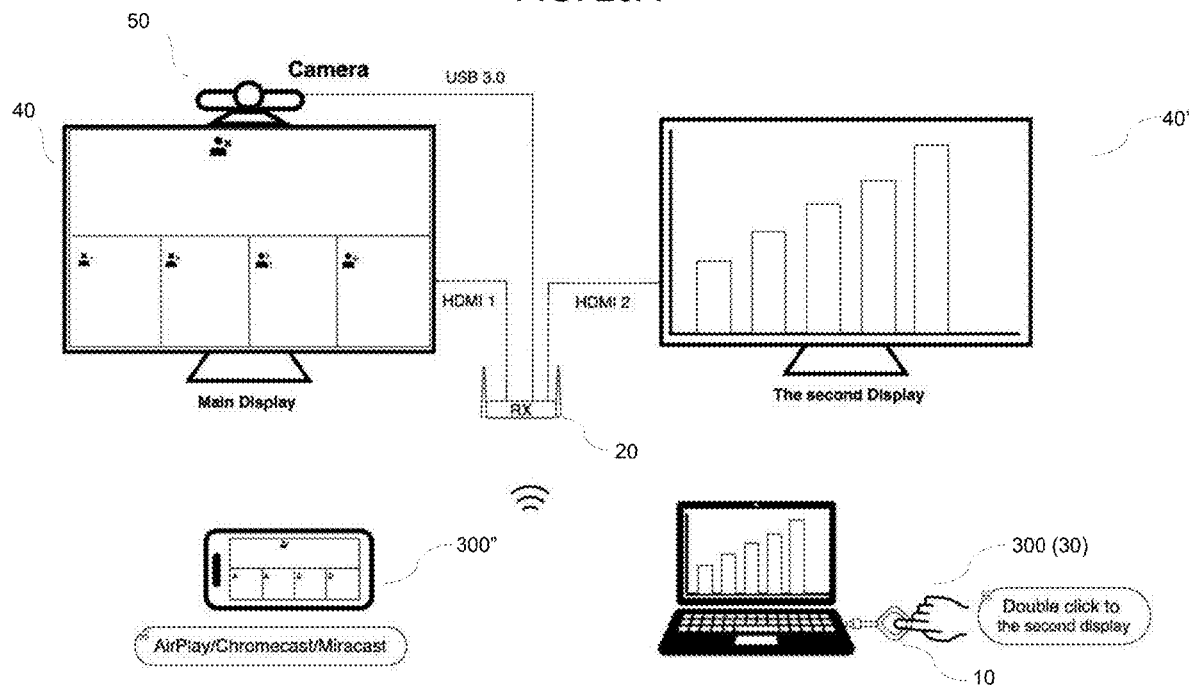

Referring to FIG. 29B, to configure the outputs of the display contents, on the personal device 300 and smart device 300", choose one of the personal device 300 and the smart device 300" to display the video content captured by the conference camera 50 and the other one of the personal device 300 and the smart device 300" to display the shared content of the participant conducting the presentation. Then, double press the control switch 103 of the transmission device 10 to cast the display content on the screen of the personal device 300 to feed to the second screen of the second display terminal 40'. Also, cast the display content on the screen of the smart device 300' to the first screen of the main display terminal 40 by AirPlay/Miracast/Chromecast. It is worth mentioning that, in this mode, when the smart device 300" only casts to main display terminal 40, the transmission device 10 is preferred to cast to second screen of the second display terminal 40'.

Figure 30A:
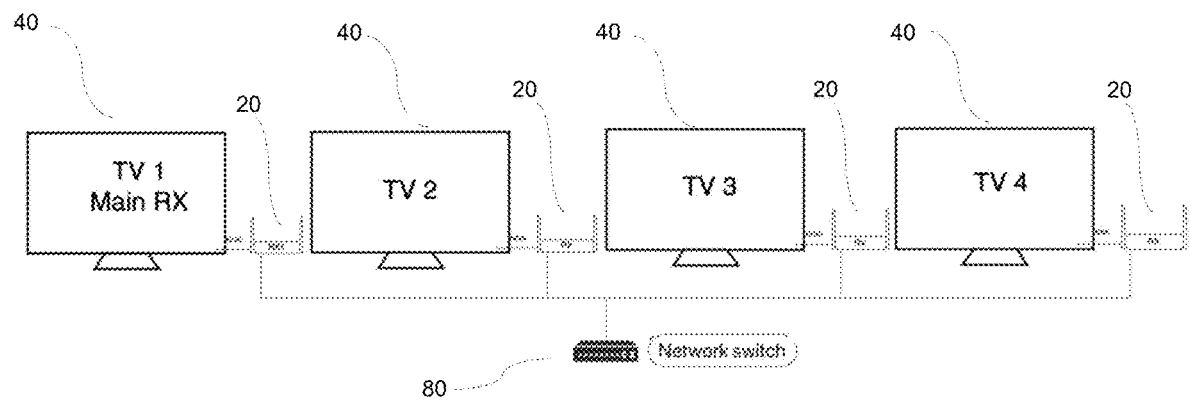
FIG. 30A to FIG. 30C are schematic views illustrating the setup of a group mode of the multi-terminal conference system according to the above preferred embodiment of the present invention.
Figure 30B:
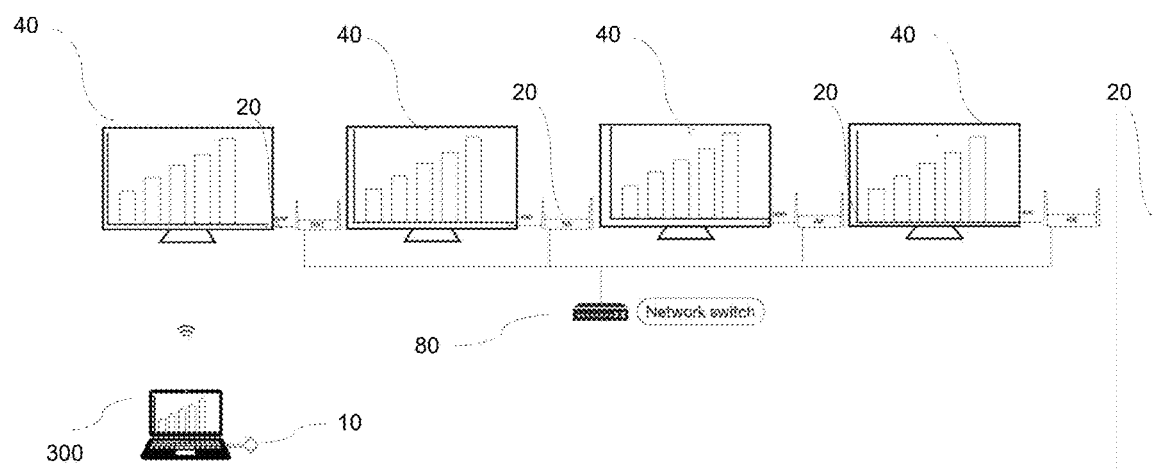
Figure 30C:
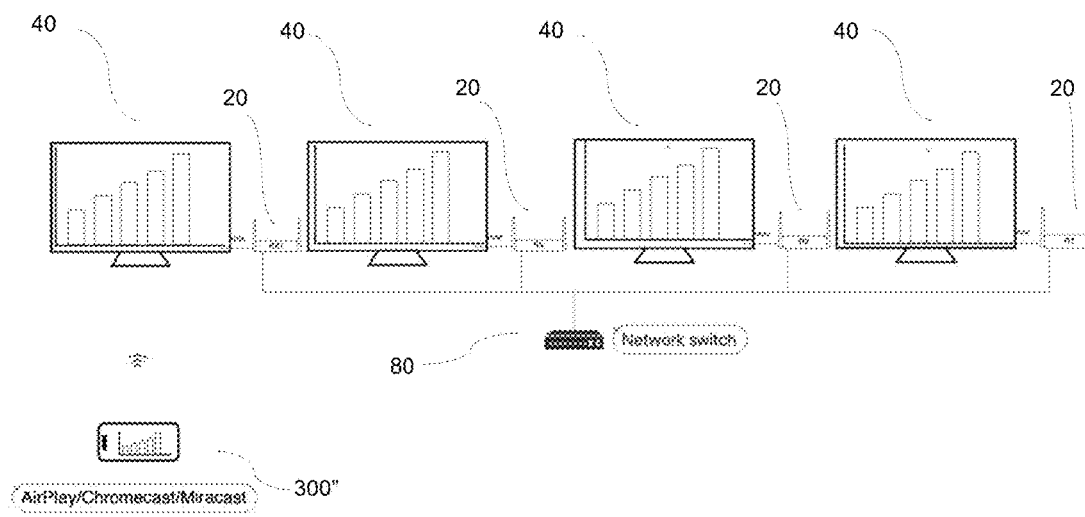

Referring to FIG. 30A to FIG. 30C, the multi-terminal conference system according to the above preferred embodiment of the present invention supports a group mode function which allows video transmission from a single transmission device 10 to be simultaneously addressed to two or more receiving devices 20. This feature is particularly convenient for users who need to display content across multiple screens at once. Whether the users are conducting a large meeting, presenting in a conference room, or sharing multimedia in a collaborative workspace, the group mode ensures that all participants can view the same content in real-time, enhancing communication and collaboration. This capability makes it an ideal solution for environments that require synchronized display across several terminal devices 40.

Referring to FIG. 30A, the setup process of the group mode includes the steps of:

Step 1: Connect two or more receiving devices 20 with a network switch 80 to make sure the different receiving devices 20 in the same subnet.

Step 2: Navigate to the settings on one of the receiving devices 20 as a main receiving device 20 and enable a Display Group feature. Once activated, all receiving devices 20 within the same subnet appear in the Device List. Select the desire receiving devices 20 by the user to include in the display group and confirm the selection. The screen content will then be streamed from the main receiving device 20 to the selected receiving devices 20.

Step 3: Connect the transmission device 10, as shown in FIG. 30B, which is already paired with the main receiving device 20, to the personal device 300. Press the control switch 103 of the transmission device 10, and the screen of the personal device 300 will be streamed to the screens of all connected display terminals 40.

As shown in FIG. 30C, the user can also stream content from his or her smart device 300" as the mobile terminal 70 to the main receiving device 20 using AirPlay, Miracast, or Chromecast. The screen of the smart device 300" will then be streamed to all connected display terminals 40.

It is worth mentioning that the receiving device 20 of the multi-terminal conference system of the present invention can be equipped with a professional-grade media player that supports the latest H.265 decoding, enabling the users to play 4K60 high-definition videos or high quality audio seamlessly. Additionally, the users can customize playback settings, including sequential and loop playback, to suit their presentation needs.

Also, the user may utilize the receiving device 20 for video playback follow the following steps:

transferring the desired video or audio files to a USB drive or TF card and inserting the USB drive or TF card into the receiving device 20;

clicking on the applications icon in the taskbar of the receiving device 20;

selecting the media player; and opening the contents of the USB drive or TF card to begin playback.

Alternatively, users may also copy the files from the USB drive or TF card to the receiving device 20 before playing them.

Figure 31:
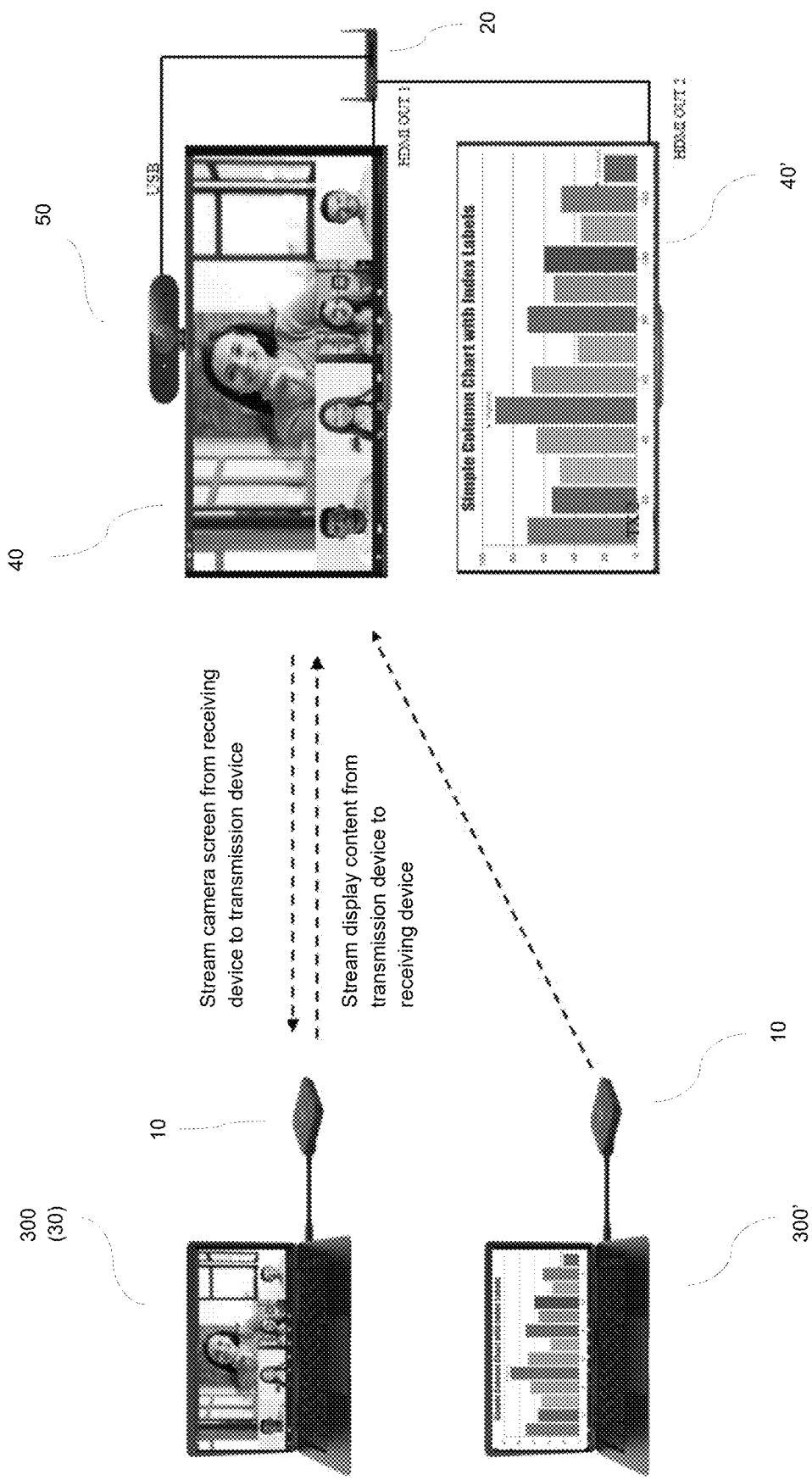
FIG. 31 is a schematic view illustrating a first application of using two transmission devices connected with a first personal device and a second personal device of the multi-terminal conference system according to the above preferred embodiment of the present invention.
Figure 32:
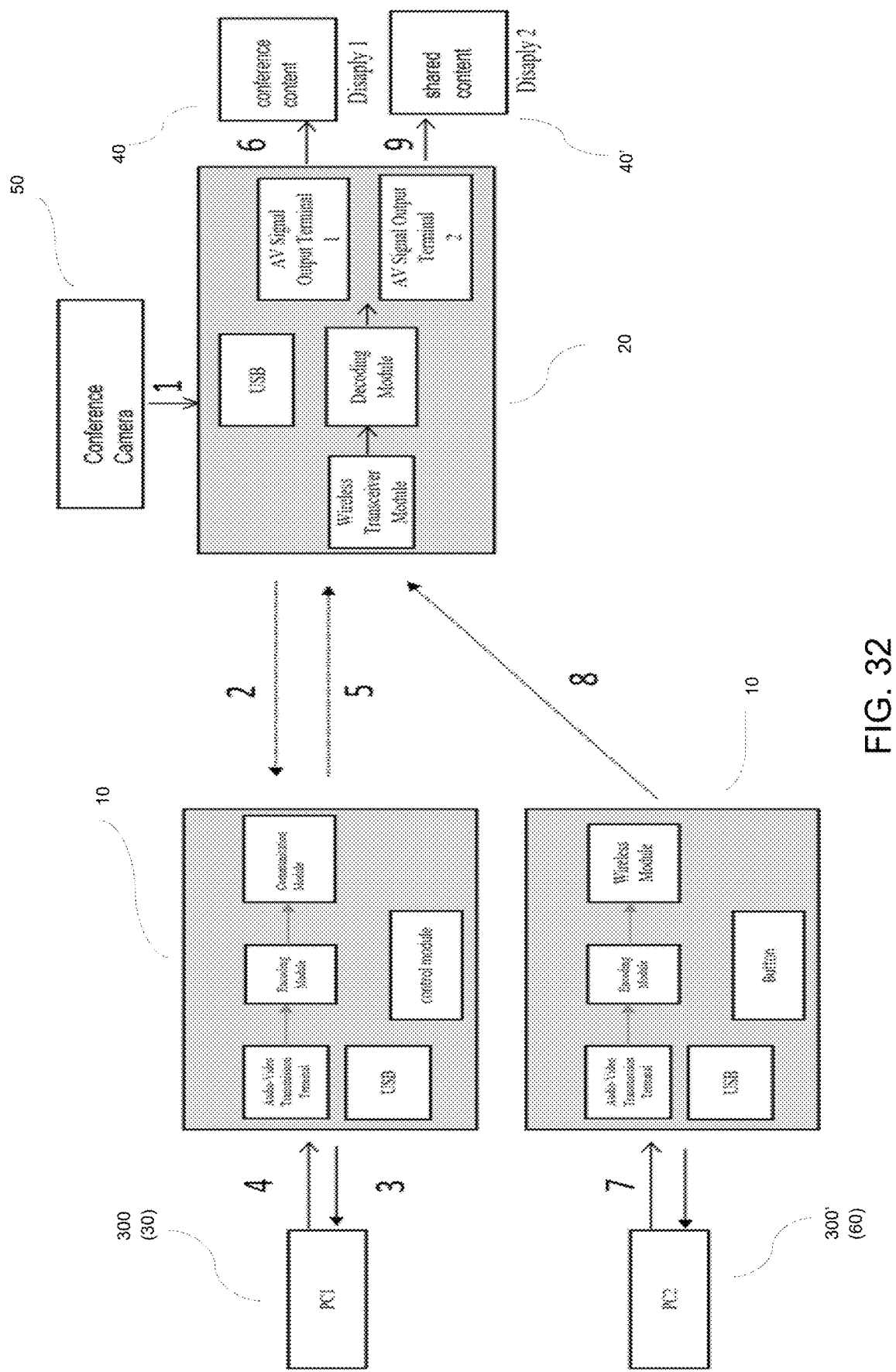
FIG. 32 is a bock diagram illustrating the first application of using two transmission devices connected with the first personal device and the second personal device of the multi-terminal conference system according to the above preferred embodiment of the present invention.

Referring to FIG. 31 and FIG. 32, an application of using two transmission devices 10 connected with a first personal device 300 functioned as the network terminal 30 and a second personal device 300' as the presentation terminal 60 is illustrated, wherein the conference camera 50 is connected to the receiving device 20 which is connected to a main display terminal 40 and a second display terminal 40'. The camera content captured by the conference camera 50 is transmitted wirelessly from the receiving device 20 to the first personal device 300 through the transmission device 10, wherein the first personal device 300 has logged in the remote conference program and joined the remote conference thereof such that the transmission device 10 is recognized by the remote conference program as a simulated camera and the camera content of the conference camera is streamed from the receiving device 20 to the transmission device 10 and uploading to the remote conference program. The conference content displayed on the screen of the first personal device 300 can be streamed and transmitted wirelessly by the transmission device to the receiving device 20 to display on the screen of the main display terminal 40. The shared content of the second personal device 300' can be wirelessly streamed and transmitted by second the transmission device 10 to be displayed on the screen of the second display terminal 40' through the receiving device 20.

As shown in FIG. 32, the receiving device 20 of the multi-terminal conference system is configured to support two video outputs for connecting to the main display terminal 40 and the second display terminal 40' and the two transmission devices 10 of the multi-terminal conference system are connected with the first and second personal devices 300, 300' respectively, wherein the two transmission devices 10 are paired and wirelessly connected with the receiving device 20 automatically. A transmitting method of the multi-terminal conference system includes steps of:

(1) Connect the conference camera 50 to the USB port 202 of the receiving device 20.

(2) Transmit the camera content captured by the conference camera 50 to the first transmission device 10 by the receiving device 20 wirelessly.
(3) Receive the camera content from the receiving device 20 in the first transmission device 10 and simulate the first transmission device 10 as a video camera to transmit the camera content to the first personal device 300 through a data interface thereof.
(4) Open a remote conference program in the first personal device 300, join a remote conference of the remote conference program, select the simulated video camera (i.e. the first transmission device 10), and import the camera content of the conference camera 50 into the remote conference program.
(5) Transmit the conference content displayed on the screen of the first personal device 300 wirelessly to the receiving device 20 when single clicking the control switch 103 of the first transmission device 10.
(6) Receive the conference content by the receiving device and transmit to the screen of the main display terminal 40.
(7) Connect the second transmission device 10 to the second personal device 300' which has joined the same remote conference of the remote conference program.
(8) Select one of the first personal device 300 and the second personal device 300' to display the conference content and the shared content respectively, for example the first personal device 300 displaying the conference content and the second personal device displaying the shared content, and transmit the shared content displayed on the screen of the second personal device 300' from the second transmission device 10 to the receiving device 20 to display the shared content on the screen of the second display terminal when double-clicking the control switch 103 of the second transmission device 10.

In particular, the transmission device 10 and the receiving device 20 have built-in the operation mode, such as by actuating (e.g. clicking or pressing) the control switch 13 of the transmission device 10 once, the display content of the screen of the personal device 300 connected with that transmission device 10 will be transmitted to the main display terminal 40 to display, and by double actuating (e.g. double clicking or pressing) the control switch 13 of the transmission device 10, the display content of the screen of the personal device 300 connected with that transmission device 10 will be transmitted to the second display terminal 40' to display.

Figure 33:
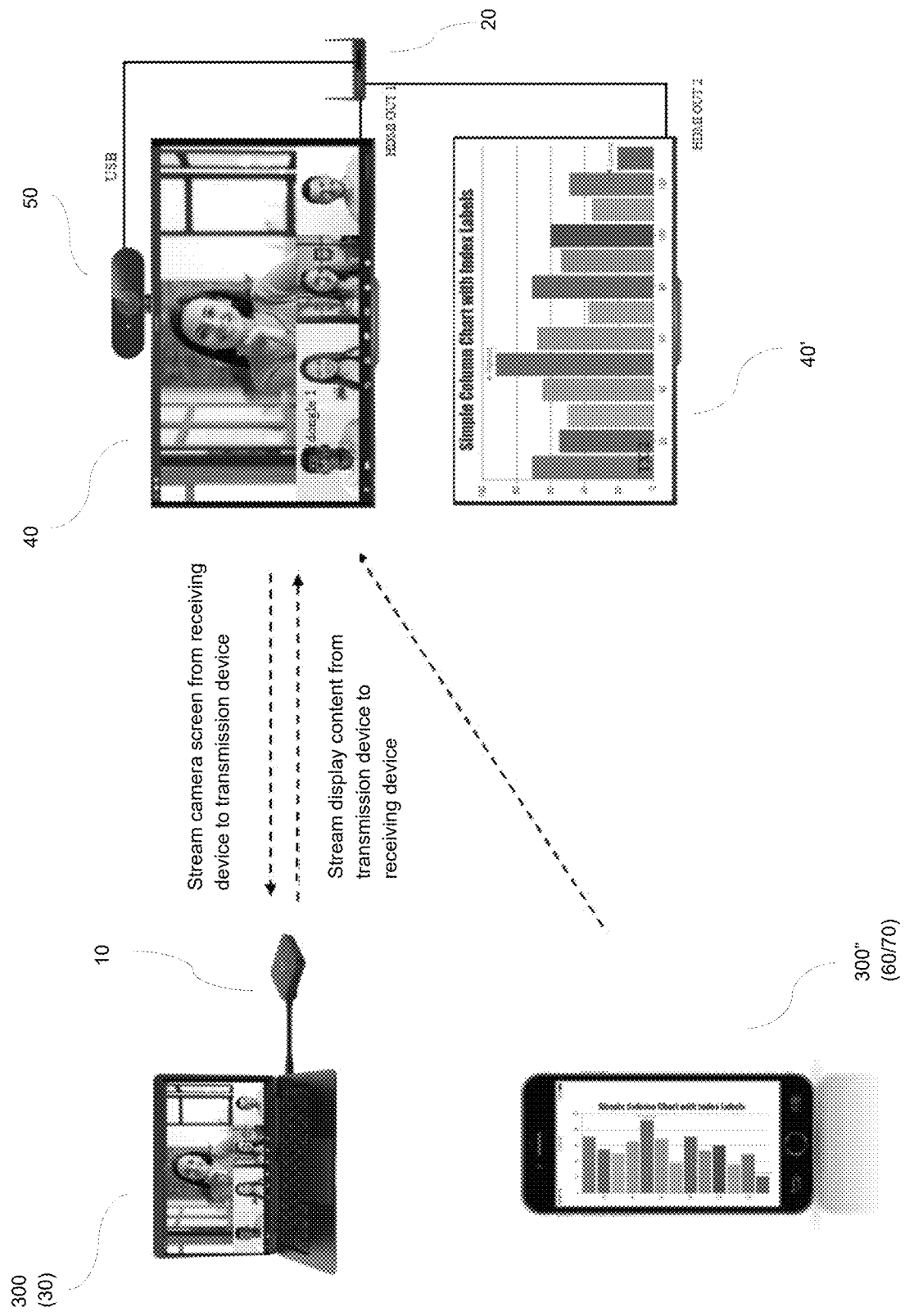
FIG. 33 is a schematic view illustrating a second application of using two transmission devices connected with a first personal device and a second personal device of the multi-terminal conference system according to the above preferred embodiment of the present invention.
Figure 34:
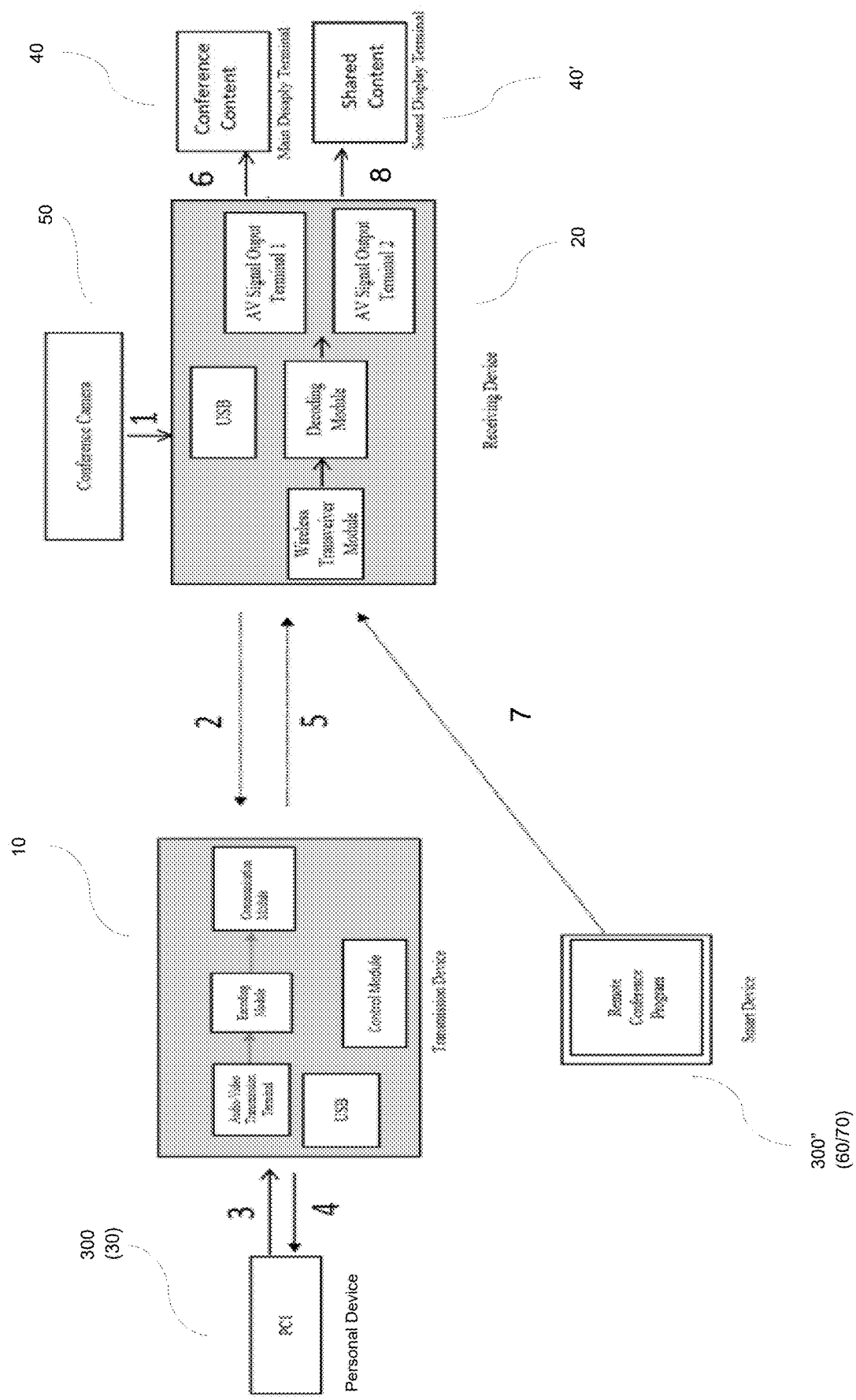
FIG. 34 is a block diagram illustrating the second application of using two transmission devices connected the a first personal device and the second personal device of the multi-terminal conference system according to the above preferred embodiment of the present invention.

Referring to FIG. 33 and FIG. 34, another application of using only one transmission device 10 connected with one personal device 300, such as a personal computer, functioned as the network terminal 30 and a smart device 300" such as a smart phone or a tablet functioned as the mobile terminal 70 or the presentation terminal 60 is illustrated, wherein the conference camera 50 is connected to the receiving device 20 which is connected to a main display terminal 40 and a second display terminal 40'. The camera or recording content captured by the conference camera 50 is transmitted wirelessly from the receiving device 20 to the personal device 300 through the transmission device 10, wherein the personal device 300 has logged in the remote conference program and joined the remote conference thereof such that the transmission device 10 is recognized by the remote conference program as a simulated camera and the camera content of the conference camera is streamed from the receiving device 20 to the transmission device 10 and imported to the remote conference program. The conference content displayed on the screen of the personal device 300 can be streamed and transmitted wirelessly by the transmission device 10 to the receiving device 20 to display on the screen of the main display terminal 40. The shared content of the mobile device 300" can be wirelessly streamed and transmitted to the receiving device 20 or directly to the second display terminal 40' via AirPlay, Chromcast or the like.

Referring to FIG. 34, the receiving device 20 of the multi-terminal conference system is configured to support two video outputs for connecting to the main display terminal 40 and the second display terminal 40' and the transmission device 10 of the multi-terminal conference system is connected with the personal devices 300, wherein the transmission device 10 is paired and wirelessly connected with the receiving device 20 automatically. A transmitting method of the multi-terminal conference system includes steps of:

(1) Connect the conference camera 50 to the USB port 202 of the receiving device 20.
(2) Transmit the camera content captured by the conference camera 50 to the transmission device 10 by the receiving device 20 wirelessly.
(3) Receive the camera content from the receiving device 20 in the transmission device 10 and simulate the transmission device 10 as a video camera to transmit the camera content to the personal device 300 through a data interface thereof.
(4) Open a remote conference program in the personal device 300, join a remote conference of the remote conference program, select the simulated video camera (i.e. the first transmission device 10), and import the camera content of the conference camera 50 into the remote conference program.
(5) Transmit the conference content displayed on the screen of the personal device 300 wirelessly to the receiving device 20 when single clicking the control switch 103 of the first transmission device 10.
(6) Receive the conference content by the receiving device and transmit to the screen of the main display terminal 40.
(7) Connect the smart device 300" to the receiving device 20 wirelessly, for example via AirPlay or Chromcast, to send the shared content displayed on the screen of the smart device 300" to the receiving device 20.
(8) Transmit the shared content from the smart device 300" to the second display terminal 40' to display the shared content on the screen of the second display terminal 40'.

Select one of the first personal device 300 and the second personal device 300' to display the conference content and the shared content respectively, for example the first personal device 300 displaying the conference content and the second personal device displaying the shared content, and transmit the shared content displayed on the screen of the second personal device 300' from the second transmission device 10 to the receiving device 20 to display the shared content on the screen of the second display terminal when double-clicking the control switch 103 of the second transmission device 10.

According to the preferred embodiment of the present invention, the transmitting method further comprises a step of:

selecting one of the personal device 300 and the smart device 300" to display the conference content and the shared content respectively, for example the personal device 300 displaying the conference content and the smart device displaying the shared content, and wirelessly transmit the shared content displayed on the screen of the smart device 300' to the receiving device 20 to display the shared content on the screen of the second display terminal when single-clicking the control switch 103 of the transmission device, wherein when double-clicking, for example, the control switch 103 of the transmission device 10, the receiving device 20 can be programmed to transmit the conference content from the transmission device 10 to display on both the screens of the main display terminal 40 and the second display terminal 40', or that when long-clicking or pressing, for example, the control switch 103 of the transmission device 10, the multi-screen split mode is activate to transmit both the conference content and the shared content to display on each of the screens of the main display terminal 40' and the second display terminal 40' in split windows.

Figure 35:
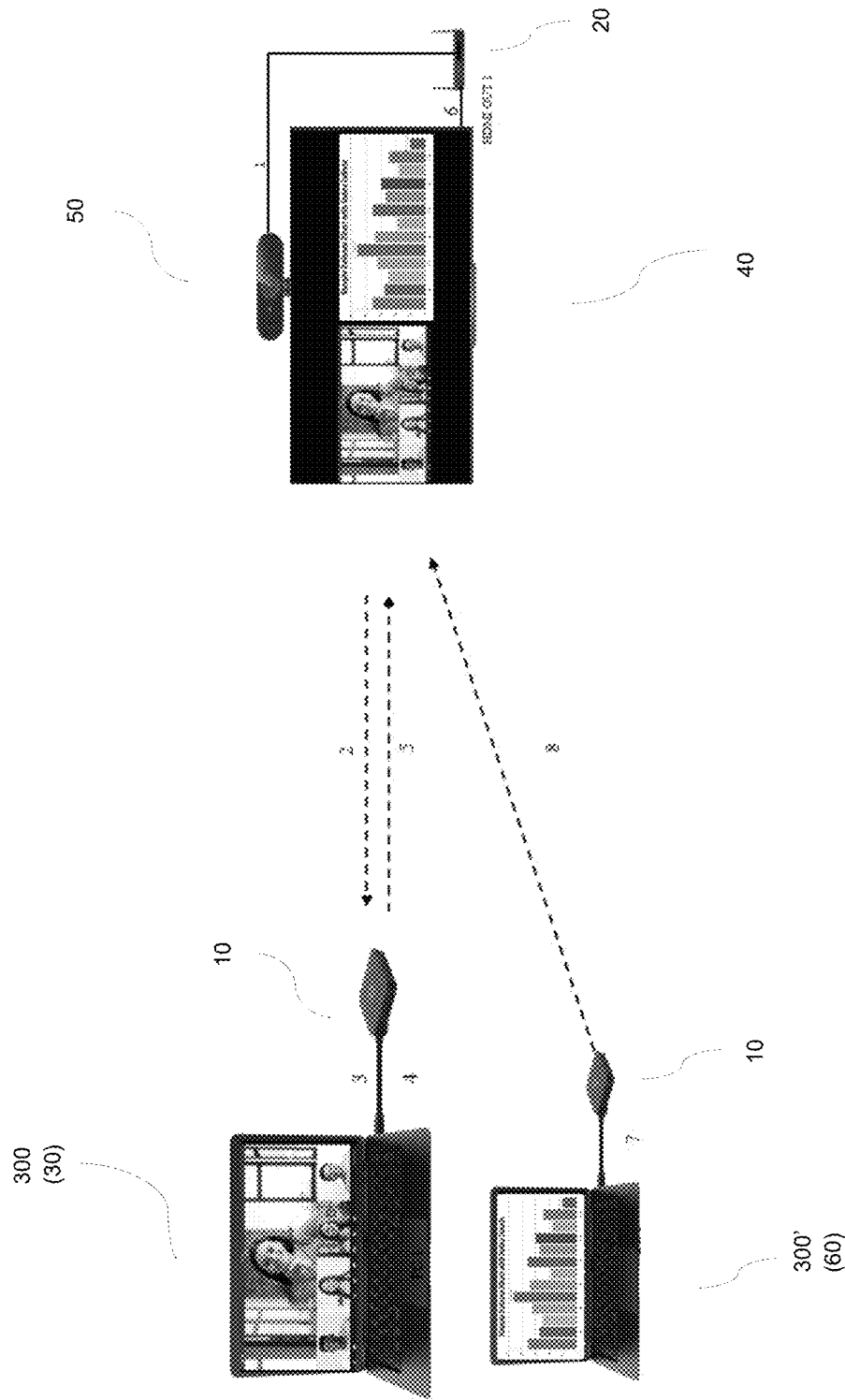
FIG. 35 is a schematic view illustrating a third application of using two transmission devices connected with a first personal device and a second personal device of the multi-terminal conference system according to the above preferred embodiment of the present invention.
Figure 36:
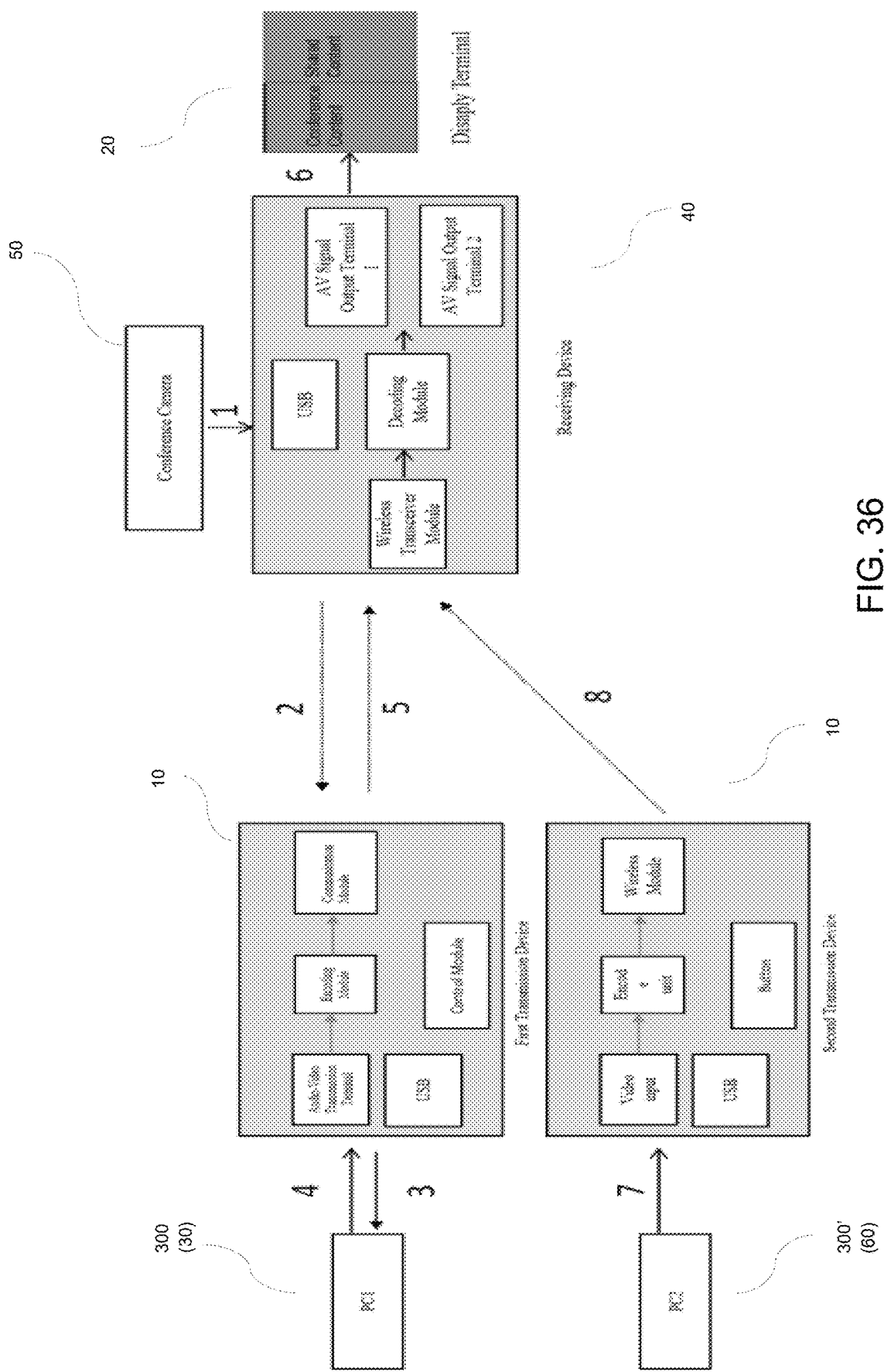
FIG. 36 is a block diagram illustrating the third application of using two transmission devices connected with the first personal device and the second personal device of the multi-terminal conference system according to the above preferred embodiment of the present invention.

Referring to FIG. 35 and FIG. 36, another application of the multi-terminal conference system is illustrated, wherein two transmission devices 10 are used to connected with a first personal device 300 to function as a networking terminal 30 to launch the remote conference program and a second personal device 300' to function as a presentation terminal 60, and one receiving device 20 is used to connect with the conference camera 50 and the display terminal 40. The camera content captured by the conference camera 50 is transmitted wirelessly from the receiving device 20 to the first personal device 300 through the first transmission device 10, wherein the first personal device 300 has launched on the remote conference program and joined the remote conference thereof such that the transmission device 10 is recognized by the remote conference program as a simulated camera and the camera content of the conference camera is streamed from the receiving device 20 to the first transmission device 10 and importing to the remote conference program. The conference content displayed on the screen of the first personal device 300 can be streamed and transmitted wirelessly by the transmission device 10 to the receiving device 20 to display on the screen of the display terminal 40. The shared content of the second personal device 300' can be wirelessly streamed and transmitted by second the transmission device 10 to be also displayed on the screen of the display terminal 40 through the receiving device 20.

The receiving device 20 of the multi-terminal conference system is configured to connect to the display terminal 40, and the two transmission devices 10 are paired and wirelessly connected with the receiving device 20 automatically. A transmitting method of the multi-terminal conference system includes steps of:

(1) Connect the conference camera 50 to the USB port 202 of the receiving device 20.
(2) Transmit the camera content captured by the conference camera 50 to the first transmission device 10 by the receiving device 20 wirelessly.
(3) Receive the camera content from the receiving device 20 in the first transmission device 10 and simulate the first transmission device 10 as a video camera to transmit the camera content to the first personal device 300 through a data interface thereof.
(4) Open a remote conference program in the first personal device 300, join a remote conference of the remote conference program, select the simulated video camera (i.e. the first transmission device 10), and import the camera content of the conference camera 50 into the remote conference program.
(5) Transmit the conference content displayed on the screen of the first personal device 300 wirelessly to the receiving device 20 when single clicking the control switch 103 of the first transmission device 10.
(6) Receive the conference content by the receiving device and transmit to the screen of the main display terminal 40.
(7) Connect the second transmission device 10 to the second personal device 300' which has joined the same remote conference of the remote conference program.
(8) Select one of the first personal device 300 and the second personal device 300' to display the conference content and the shared content respectively, for example the first personal device 300 displaying the conference content and the second personal device displaying the shared content, and transmit the shared content displayed on the screen of the second personal device 300' from the second transmission device 10 to the receiving device 20 to display the shared content on the screen of the second display terminal when clicking the control switch 103 of the second transmission device 10.

Figure 37:
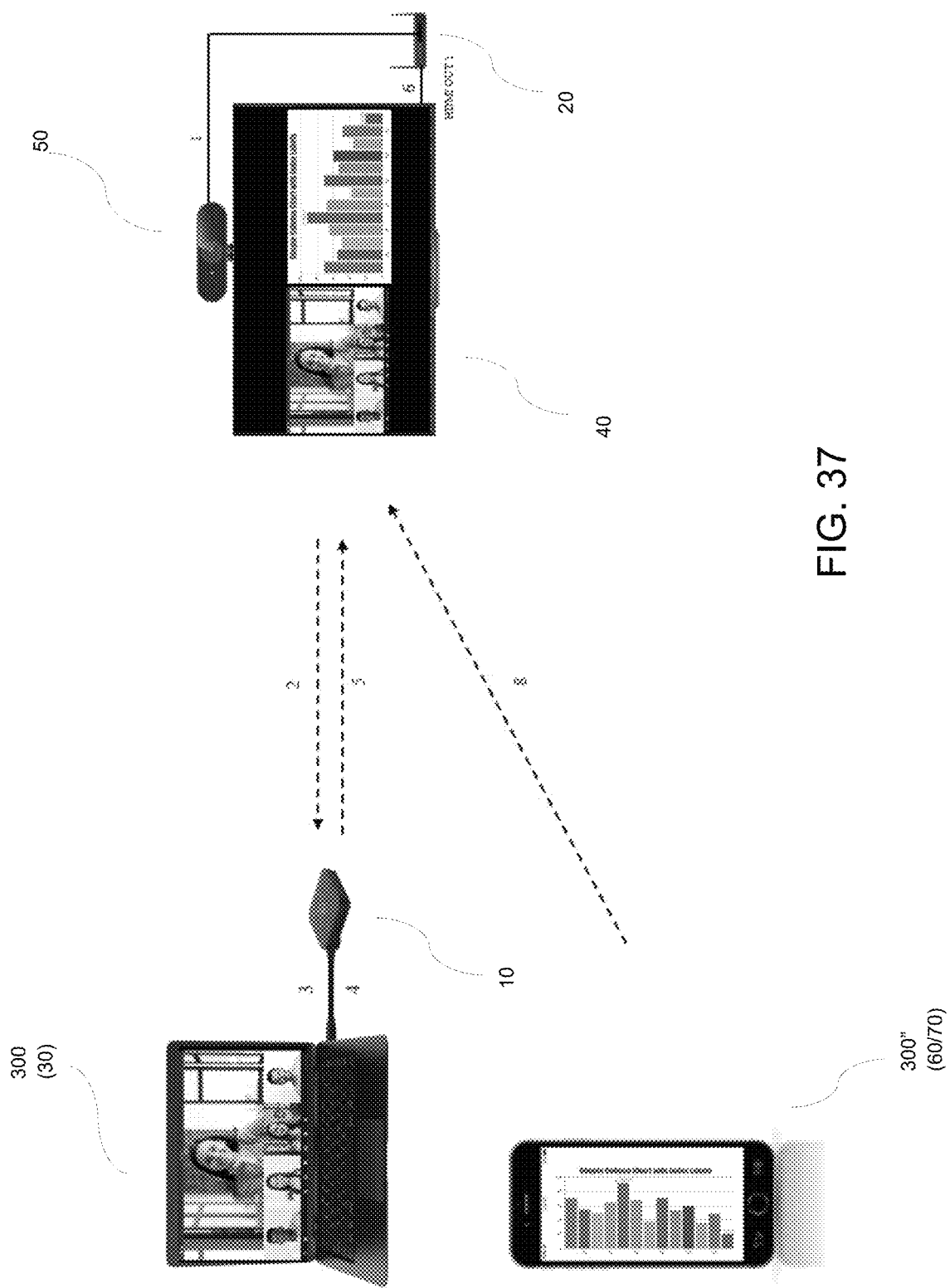
FIG. 37 is a schematic view illustrating a fourth application of using two transmission devices connected with a first personal device and a second personal device of the multi-terminal conference system according to the above preferred embodiment of the present invention.
Figure 38:
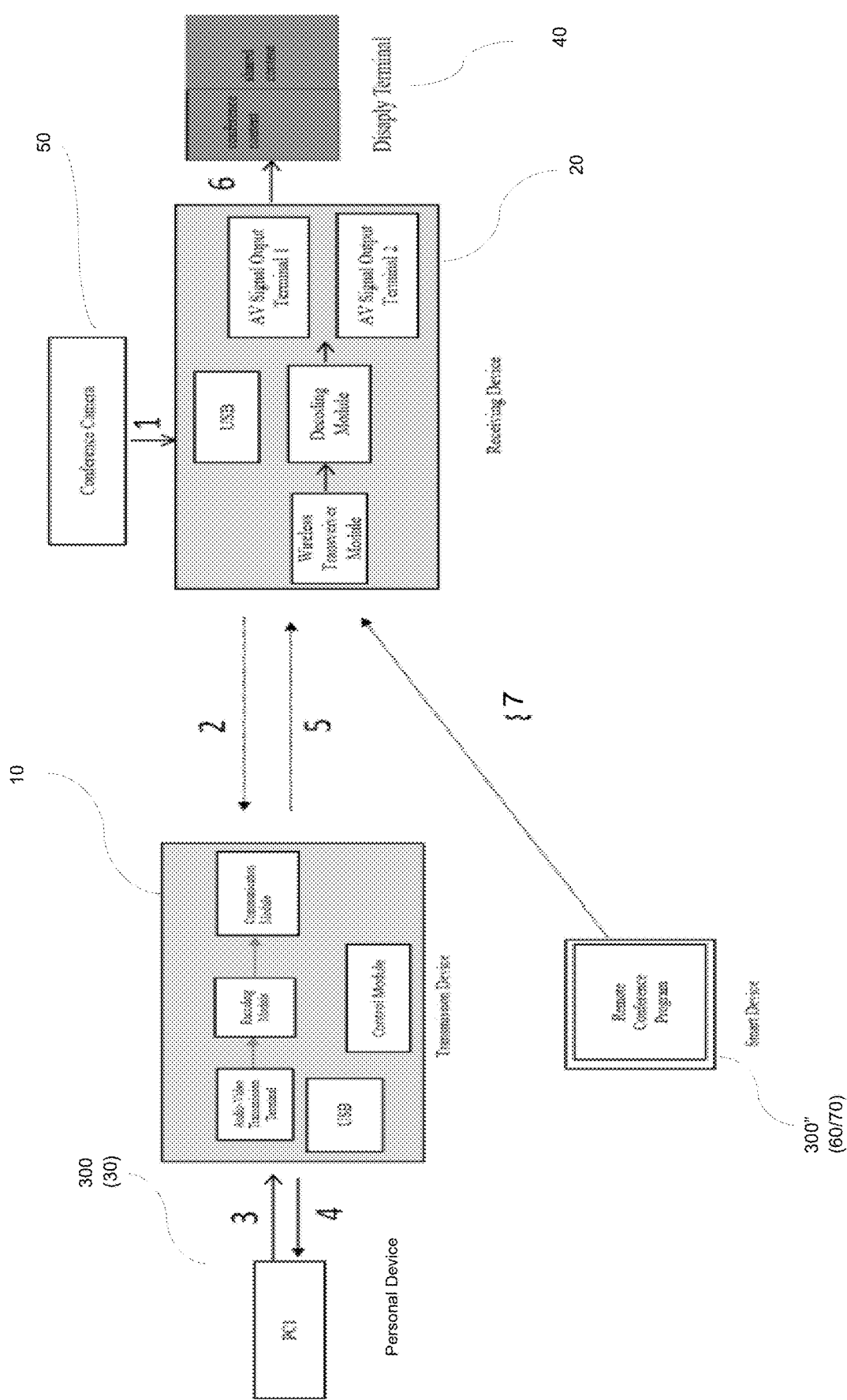
FIG. 38 is a block diagram illustrating the fourth an application of using two transmission devices connected with the first personal device and the second personal device of the multi-terminal conference system according to the above preferred embodiment of the present invention.

Referring to FIG. 37 and FIG. 38, another application of the multi-terminal conference system is illustrated, wherein only one transmission device 10 is used to connect with one personal device 300, such as a personal computer, functioned as the network terminal 30 and a smart device 300" such as a smart phone or a tablet functioned as the mobile terminal 70 or the presentation terminal 60, and only one receiving device 20 is used one display terminal 40 and the conference camera 50. The camera or recording content captured by the conference camera 50 is transmitted wirelessly from the receiving device 20 to the personal device 300 through the transmission device 10, wherein the personal device 300 has logged in the remote conference program and joined the remote conference thereof such that the transmission device 10 is recognized by the remote conference program as a simulated camera and the camera content of the conference camera is streamed from the receiving device 20 to the transmission device 10 and imported to the remote conference program. The conference content displayed on the screen of the personal device 300 can be streamed and transmitted wirelessly by the transmission device 10 to the receiving device 20 to display on the screen of the display terminal 40. The shared content of the smart device 300" can be wirelessly streamed and transmitted to the receiving device 20 or directly to the second display terminal 40' via AirPlay, Chromcast or the like.

The receiving device 20 of the multi-terminal conference system is configured to connect to the display terminal 40 and the transmission device 10 of the multi-terminal conference system is connected with the personal devices 300, wherein the transmission device 10 is paired and wirelessly connected with the receiving device 20 automatically. A transmitting method of the multi-terminal conference system includes steps of:

(1) Connect the conference camera 50 to the USB port 202 of the receiving device 20.
(2) Transmit the camera content captured by the conference camera 50 to the transmission device 10 by the receiving device 20 wirelessly and automatically.
(3) Receive the camera content from the receiving device 20 in the transmission device 10 and simulate the transmission device 10 as a video camera to transmit the camera content to the personal device 300 through a data interface thereof.

(4) Open a remote conference program in the personal device 300, join a remote conference of the remote conference program, select the simulated video camera (i.e. the first transmission device 10), and import the camera content of the conference camera 50 into the remote conference program.

(5) Transmit the conference content displayed on the screen of the personal device 300 wirelessly to the receiving device 20 when clicking the control switch 103 of the first transmission device 10.

(6) Receive the conference content by the receiving device and transmit to the screen of the display terminal 40.

(7) Connect the smart device 300" to the receiving device 20 wirelessly, for example via AirPlay or Chromcast, to send the shared content displayed on the screen of the smart device 300" to the receiving device 20, wherein the shared content of the smart device 300" is selected to transmit to the display terminal 40, such that both the conference content from the personal device 300 via the transmission device 10 and the shared content from the smart device 300" are displayed on the screen of the display terminal 40 at the same time in multi-screen split mode.

It is worth mentioning that the user is allowed to select one of the personal device 300 and the smart device 300" to display the conference content and the shared content respectively, for example the personal device 300 displaying the conference content and the smart device displaying the shared content, and wirelessly transmit the shared content displayed on the screen of the smart device 300' to the receiving device 20 to display the shared content on the screen of the second display terminal when single-clicking the control switch 103 of the transmission device, wherein when double-clicking, for example, the control switch 103 of the transmission device 10, the receiving device 20 can be programmed to transmit the conference content from the transmission device 10 to display on both the screens of the main display terminal 40 and the second display terminal 40', or that when long-clicking or pressing, for example, the control switch 103 of the transmission device 10, the multi-screen split mode is activate to transmit both the conference content and the shared content to display on each of the screens of the main display terminal 40' and the second display terminal 40' in split windows.

It is appreciated that, according to the multi-terminal conference system and conference multi-terminal collaboration method of the present invention, the transmission device 10 and the receiving device 20 of the multi-terminal conference system are arranged to be plug-and-play without the need to install any driver software to both the display terminal 40, the network terminal 30, the presentation terminal 60 and the mobile terminal 70 for using the conference camera 50 and the display terminal 40 in the conference room in order to attend the remote conference. The conference participants do not require to upload any information to the display terminal 40 nor connect any equipment, such as their own personal device 300, smart device 300", flash memory, or the like with the display terminal 40 and the conference camera 50. The multi-terminal conference system and the conference multi-terminal collaboration method of the present invention allow the user to log in the remote conference according to his or her own device terminal, such as network terminal 30, presentation terminal 60 and mobile terminal 70, so that commercial information security can be guaranteed. The multi-terminal conference system and the conference multi-terminal collaboration method of the present invention also allow each participant to wirelessly share content from his or her conference device, such as personal computer, laptop, notebook, smart device, and etc., to a display terminal such as television, display screen, projector screen, and the like without the need for APPs, setup, or cables.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A multi-terminal conference system, adapted for conducting a remote conference with at least one network terminal, running a remote conference program, using at least one camera and at least one display terminal, comprising:

at least one receiving device, comprising a wireless transceiver module, a decoding module, at least one audio-visual signal output terminal, a camera input terminal, and a receiving terminal encoding module, wherein the wireless transceiver module is connected to the decoding module, the audio-visual signal output terminal and the camera input terminal, wherein the camera input terminal is configured for connecting with the at least one camera to input a recording content from the at least one camera and transmit the recording content wirelessly through the wireless transceiver module, so as to use the recording content as a real-time capture image uploading to the remote conference program, wherein the wireless transceiver module is configured to receive a data information of the audio-visual signal corresponding to the remote conference, wherein the decoding module is arranged to decode the data information received by the wireless transceiver module to obtain the audio-visual signal corresponding to the data information, wherein the audio-visual signal output terminal is configured for connecting with the display terminal to transmit the audio-visual signal to the display terminal so as for displaying the remote conference on the display terminal, wherein the receiving terminal encoding module is connected to the camera input terminal and the wireless transceiver module and configured to encode and process the recording content inputted from the camera input terminal to generate a recording information, wherein the wireless transceiver module transmits the recording information; and a transmission device, wherein while the network terminal is arranged to run the remote conference program and input the remote conference based on the remote conference program, the transmission device comprises an audio-visual signal transmission terminal, an encoding module, a communication module, and a transmitting terminal decoding module, wherein the audio-visual signal transmission terminal is configured for connecting with the network terminal, and the encoding module is connected to the audio-visual signal transmission terminal and the communication module, wherein the wireless transceiver module is wirelessly connected with the communication module, wherein the communication module of the transmission device is configured to input the data information wirelessly transmitted by the wireless transceiver module, wherein the data information is inputted by the network terminal from the audio-visual signal transmission terminal while the recording content is used as the real-time capture image uploading to the remote conference program, wherein the transmission device inputs the audio-visual signal of the network terminal from the network terminal at the audio-visual signal transmission terminal, wherein the encoding module encodes and processes the audio and video signal inputted by the audio and video signal transmission terminal and generates the data information, wherein the communication module transmits the data information in a wireless mode and the wireless transceiver module receives the data information, wherein the transmitting terminal decoding module is connected to the communication module and the audio-visual signal transmission terminal and configured to decode the recording information to obtain the recording content corresponding to the recording information, wherein the audio-visual signal transmission terminal transmits the recording content to the network terminal.

2. The multi-terminal conference system, as recited in claim 1, further comprising:

a mobile terminal, which is configured to run the remote conference program and input the remote conference based on the remote conference program, wherein the mobile terminal is wirelessly connected to the wireless transceiver module of the receiving device based on a screen projection protocol of the mobile terminal to receive the data information transmitted by the wireless transceiver module while the recording content is used as the real-time capture image uploading to the remote conference program, wherein the mobile terminal transmits the data information corresponding to its audio-visual signal to the receiving device based on the screen projection protocol of the mobile terminal.

3. A multi-terminal conference system, adapted for conducting a remote conference with at least one network terminal, running a remote conference program, using at least one camera and at least one display terminal, comprising:

at least one receiving device, comprising a wireless transceiver module, a decoding module, at least one audio-visual signal output terminal, a camera input terminal, a receiving terminal encoding module, wherein the wireless transceiver module is connected to the decoding module, the audio-visual signal output terminal and the camera input terminal, wherein the camera input terminal is configured for connecting with the at least one camera to input a recording content from the at least one camera and transmit the recording content wirelessly through the wireless transceiver module, so as to use the recording content as a real-time capture image uploading to the remote conference program, wherein the wireless transceiver module is configured to receive a data information of the audio-visual signal corresponding to the remote conference, wherein the decoding module is arranged to decode the data information received by the wireless transceiver module to obtain the audio-visual signal corresponding to the data information, wherein the audio-visual signal output terminal is configured for connecting with the display terminal to transmit the audio-visual signal to the display terminal so as for displaying the remote conference on the display terminal, wherein the receiving terminal encoding module is connected to the camera input terminal and the wireless transceiver module, and configured to encode and process the recording content inputted from the camera input terminal to generate a recording information, wherein the wireless transceiver module wirelessly transmits the recording information;

a transmission device, wherein while the network terminal is arranged to run the remote conference program and input the remote conference based on the remote conference program, the transmission device comprises an audio-visual signal transmission terminal, an encoding module and a communication module, wherein the audio-visual signal transmission terminal is configured for connecting with the network terminal, and the encoding module is connected to the audio-visual signal transmission terminal and the communication module, wherein the wireless transceiver module is wirelessly connected with the communication module, wherein the communication module of the transmission device is configured to input the data information wirelessly transmitted by the wireless transceiver module, wherein the data information is inputted by the network terminal from the audio-visual signal transmission terminal while the recording content is used as the real-time capture image uploading to the remote conference program, wherein the transmission device inputs the audio-visual signal of the network terminal from the network terminal at the audio-visual signal transmission terminal, wherein the encoding module encodes and processes the audio and video signal inputted by the audio and video signal transmission terminal and generates the data information, wherein the communication module transmits the data information in a wireless mode and the wireless transceiver module receives the data information; and a mobile terminal, which is configured to run the remote conference program and input the remote conference based on the remote conference program, wherein the mobile terminal is wirelessly connected to the wireless transceiver module of the receiving device based on a screen projection protocol of the mobile terminal to receive the data information transmitted by the wireless transceiver module while the recording content is used as the real-time capture image uploading to the remote conference program, wherein the mobile terminal transmits the data information corresponding to its audio-visual signal to the receiving device based on the screen projection protocol of the mobile terminal, wherein the mobile terminal receives the recording information and decodes the recording information to obtain the recording content corresponding to the recording information.

4. A multi-terminal conference system, adapted for conducting a remote conference with at least one network terminal, running a remote conference program, using at least one camera and at least one display terminal, comprising:

at least one receiving device, comprising a wireless transceiver module, a decoding module, at least one audio-visual signal output terminal, and a camera input terminal, wherein the wireless transceiver module is connected to the decoding module, the audio-visual signal output terminal and the camera input terminal, wherein the camera input terminal is configured for connecting with the at least one camera to input a recording content from the at least one camera and transmit the recording content wirelessly through the wireless transceiver module, so as to use the recording content as a real-time capture image uploading to the remote conference program, wherein the wireless transceiver module is configured to receive a data information of the audio-visual signal corresponding to the remote conference, wherein the decoding module is arranged to decode the data information received by the wireless transceiver module to obtain the audio-visual signal corresponding to the data information, wherein the audio-visual signal output terminal is configured for connecting with the display terminal to transmit the audio-visual signal to the display terminal so as for displaying the remote conference on the display terminal;

a transmission device, wherein while the network terminal is arranged to run the remote conference program and input the remote conference based on the remote conference program, the transmission device comprises an audio-visual signal transmission terminal, an encoding module and a communication module, wherein the audio-visual signal transmission terminal is configured for connecting with the network terminal, and the encoding module is connected to the audio-visual signal transmission terminal and the communication module, wherein the wireless transceiver module is wirelessly connected with the communication module, wherein the communication module of the transmission device is configured to input the data information wirelessly transmitted by the wireless transceiver module, wherein the data information is inputted by the network terminal from the audio-visual signal transmission terminal while the recording content is used as the real-time capture image uploading to the remote conference program, wherein the transmission device inputs the audio-visual signal of the network terminal from the network terminal at the audio-visual signal transmission terminal, wherein the encoding module encodes and processes the audio and video signal inputted by the audio and video signal transmission terminal and generates the data information, wherein the communication module transmits the data information in a wireless mode and the wireless transceiver module receives the data information; and at least one presentation terminal and at least one other transmission device, wherein an audio-visual transmission terminal of the other transmission device is configured to connect with the presentation terminal to input the audio-visual signal for the presentation terminal from the presentation terminal, wherein the encoding module of the other transmission device is configured to be able to encode and process the audio-visual signal inputted through the audio-visual signal transmission terminal to generate the data information, wherein the communication module of the another transmitting device is wirelessly connected to the wireless transceiver module of the receiving device and is arranged to transmit the data information in a wireless manner, wherein the wireless transceiver module receives the data information, and the decoding module is arranged to decode the data information received by the wireless transceiver module to obtain the audio-visual signal of the presentation terminal corresponding to the data information, wherein the audio-visual signal output terminal transmits the audio-visual signal of the network terminal and the audio-visual signal of the presentation terminal to the display terminal, thereby the display terminal displays both the corresponding remote conference and the presentation content at the same time.

5. The multi-terminal conference system, as recited in claim 4, further comprising at least one mobile terminal, which is wirelessly connected to the wireless transceiver module of the receiving device and configured to encode and process the audio-visual signal thereof to generate the data information, and to wirelessly transmit to the wireless transceiver module, wherein the decoding module is arranged to decode the data information received by the wireless transceiver module to obtain the audio-visual signal of the at least one mobile terminal corresponding to the data information, wherein the audio-visual signal output terminal is adapted to transmit the audio-visual signal of the at least one mobile terminal to the display terminal, thereby the display terminal displays the presentation content corresponding to the at least one mobile terminal, wherein by operating the control module of the other transmission device, the audio-visual signal of the presentation terminal and/or the audio-visual signal of the mobile terminal is able to be selectively displayed to the display terminal.

6. The multi-terminal conference system, as recited in claim 4, further comprising at least one mobile terminal, which is wirelessly connected to the wireless transceiver module of the receiving device and configured to encode and process corresponding audio-visual signals thereof to generate the data information, and to wirelessly transmit to the wireless transceiver module, wherein the decoding module is arranged to decode the data information received by the wireless transceiver module to obtain the audio-visual signal of the at least one mobile terminal corresponding to the data information, wherein the audio-visual signal output terminal transmits the audio-visual signal of the network terminal and the audio-visual signal of the mobile terminal to the display terminal, thereby the display terminal displays the remote conference and presentation content simultaneously.

7. The multi-terminal conference system, as recited in claim 5, wherein the receiving device further comprises another audio-visual signal output terminal connected with another display terminal, wherein the receiving device transmits the audio-visual signal of the network terminal to the display terminal and transmits the audio-visual signal of the presentation terminal and/or the audio-visual signal of the mobile terminal to the another display terminal.

8. The multi-terminal conference system, as recited in claim 5, wherein the receiving device further comprises another audio-visual signal output terminal connected with another display terminal, wherein the receiving device transmits the audio-visual signal of the network terminal to the display terminal and transmits the audio-visual signal of the mobile terminal to the other display terminal.

9. The multi-terminal conference system, as recited in claim 6, wherein the receiving device further comprises another audio-visual signal output terminal connected with another display terminal, wherein the receiving device transmits the audio-visual signal of the network terminal to the display terminal and transmits the audio-visual signal of the presentation terminal and/or the audio-visual signal of the mobile terminal to the another display terminal.

10. The multi-terminal conference system, as recited in claim 6, wherein the receiving device further comprises another audio-visual signal output terminal connected with another display terminal, wherein the receiving device transmits the audio-visual signal of the network terminal to the display terminal and transmits the audio-visual signal of the mobile terminal to the other display terminal.

11. A multi-terminal conference system, adapted for conducting a remote conference with at least one network terminal, running a remote conference program, using at least one camera and at least one display terminal, comprising:
- at least one receiving device, comprising a wireless transceiver module, a decoding module, at least one audio-visual signal output terminal, and a camera input terminal, wherein the wireless transceiver module is connected to the decoding module, the audio-visual signal output terminal and the camera input terminal, wherein the camera input terminal is configured for connecting with the at least one camera to input 1 recording content from the at least one camera and transmit the recording content wirelessly through the wireless transceiver module, so as to use the recording content as a real-time capture image uploading to the remote conference program, wherein the wireless transceiver module is configured to receive a data information of the audio-visual signal corresponding to the remote conference, wherein the decoding module is arranged to decode the data information received by the wireless transceiver module to obtain the audio-visual signal corresponding to the data information, wherein the audio-visual signal output terminal is configured for connecting with the display terminal to transmit the audio-visual signal to the display terminal so as for displaying the remote conference on the display terminal; and
- a transmission device, wherein while the at least one network terminal is arranged to run the remote conference program and input the remote conference based on the remote conference program, the transmission device comprises an audio-visual signal transmission terminal, an encoding module and a communication module, wherein the audio-visual signal transmission terminal is configured for connecting with the network terminal, and the encoding module is connected to the audio-visual signal transmission terminal and the communication module, wherein the wireless transceiver module is wirelessly connected with the communication module, wherein the communication module of the transmission device is configured to input the data information wirelessly transmitted by the wireless transceiver module, wherein the data information is inputted by the network terminal from the audio-visual signal transmission terminal while the recording content is used as the real-time capture image uploading to the remote conference program, wherein the transmission device inputs the audio-visual signal of the network terminal from the network terminal at the audio-visual signal transmission terminal, wherein the encoding module encodes and processes the audio and video signal inputted by the audio and video signal transmission terminal and generates the data information, wherein the communication module transmits the data information in a wireless mode and the wireless transceiver module receives the data information, wherein the transmission device further comprises a control module, which is connected to the encoding module and used to control the encoding module to encode the audio-visual signal, wherein the encoding module is in a dormant state by default and is arranged in such a manner that, when the control module is operated once, the encoding module begins to encode the audio-visual signal, and when the control module is operated again, the encoding module switches back to the dormant state and stops encoding, thereby the audio-visual signal of the network terminal and the audio-visual signal of the presentation terminal are selectively transmitted to the display terminal.

* * * * *